Figure 1:
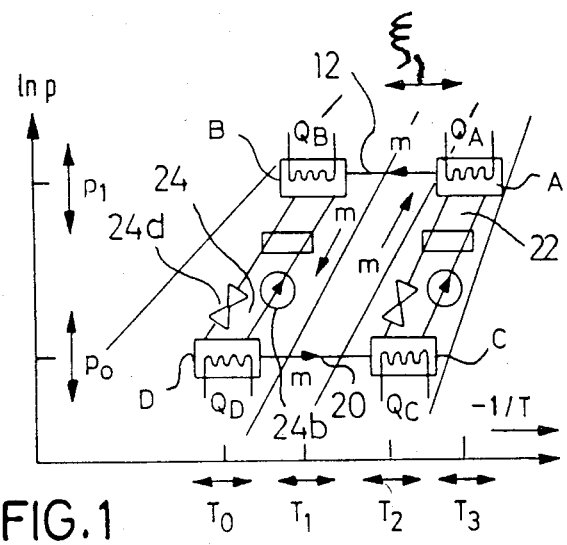

United States Patent [19]

Alefeld

[11] Patent Number: 4,531,374
[45] Date of Patent: Jul. 30, 1985

[54] MULTI-STAGE APPARATUS HAVING WORKING-FLUID AND ABSORPTION CYCLES, AND METHOD OF OPERATION THEREOF

[76] Inventor: Georg Alefeld, Josef-Raps-Strasse 3, D-8000 Munich 40, Fed. Rep. of Germany

[21] Appl. No.: 417,118

[22] PCT Filed: Mar. 24, 1982

[86] PCT No.: PCT/EP82/00063
§ 371 Date: Sep. 2, 1982
§ 102(e) Date: Sep. 2, 1982

[87] PCT Pub. No.: WO82/03448
PCT Pub. Date: Oct. 14, 1982

[30] Foreign Application Priority Data

| Mar. 24, 1981 | [DE] | Fed. Rep. of Germany | 3111552 |
| Apr. 28, 1981 | [DE] | Fed. Rep. of Germany | 3116788 |
| Jun. 19, 1981 | [DE] | Fed. Rep. of Germany | 3124007 |
| Aug. 17, 1981 | [DE] | Fed. Rep. of Germany | 3132461 |
| Feb. 12, 1982 | [DE] | Fed. Rep. of Germany | 3204902 |
| Feb. 18, 1982 | [DE] | Fed. Rep. of Germany | 3205872 |

[51] Int. Cl.$^3$ .............................................. F25B 7/00
[52] U.S. Cl. .................................... 62/79; 62/101; 62/238.6; 62/335; 62/476
[58] Field of Search ............... 62/238.6, 476, 335, 62/79, 101

[56] References Cited

U.S. PATENT DOCUMENTS

| 2,027,610 | 1/1936 | Nesselmann et al. | 62/238.3 |
| 3,015,940 | 1/1962 | Harwich | 62/335 X |
| 3,483,710 | 12/1969 | Bearint | 62/79 |
| 3,651,655 | 3/1972 | Dyre | 62/103 |
| 3,824,804 | 7/1974 | Sandmark | 62/335 X |
| 4,402,795 | 9/1983 | Erickson | 203/25 |

FOREIGN PATENT DOCUMENTS 1501141 11/1971 Fed. Rep. of Germany.

Primary Examiner—Lloyd L. King
Attorney, Agent, or Firm—Frishauf, Holtz, Goodman & Woodward

[57] ABSTRACT

Multi-stage apparatuses are described, which operate with absorption cycles, can be used for harnessing heat energy and/or work and are distinguished by high efficiency and/or high adaptability. The apparatuses operate with a working fluid which can be absorbed in an absorbent and include as their primary components so-called exchange units, and possibly at least one pressure machine in addition. The term "exchange unit" is intended to encompass absorbers, condensers, resorbers, evaporators, desorbers and absorbers such as are conventional in absorber and resorber machines; the term "pressure machines" is intended to encompass compressors and expansion machines. Preferred forms of embodiment of the present apparatus are heat pumps, which can be adapted over wide ranges to variable outdoor temperatures and variable heat requirements.

45 Claims, 109 Drawing Figures

FIG.3 ( Part 1 )
Class
$A_1 \times B_1$ 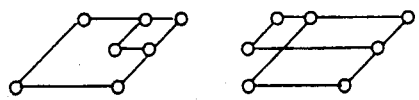
$A_1 \times B_2$ 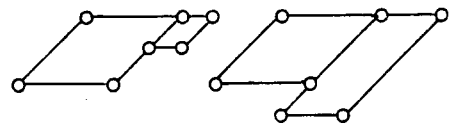
$A_1 \times B_3$ 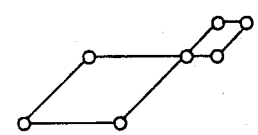
$A_1 \times B_4$ 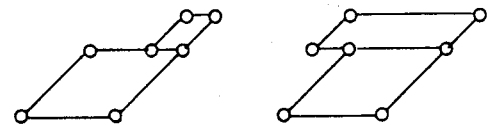
$A_2 \times B_1$ 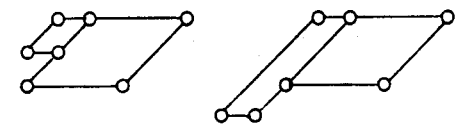
$A_2 \times B_2$ 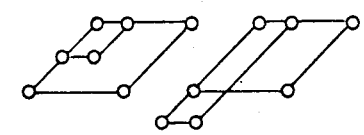
$A_2 \times B_3$ 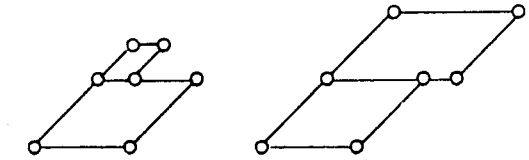
$A_2 \times B_4$ 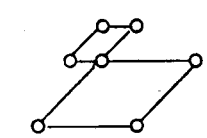
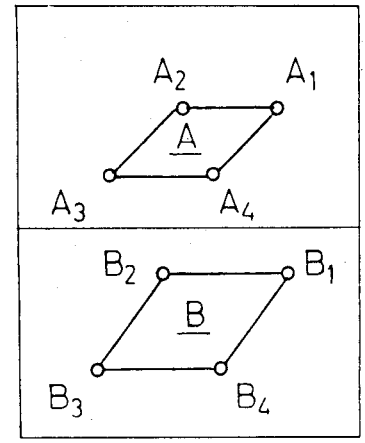

FIG.3 ( Part 2 )
Class
$A_3 \times B_1$ 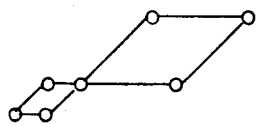
$A_3 \times B_2$ 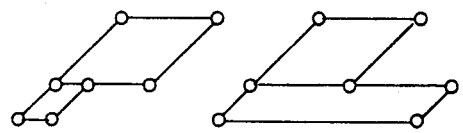
$A_3 \times B_3$ 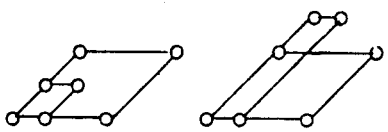
$A_3 \times B_4$ 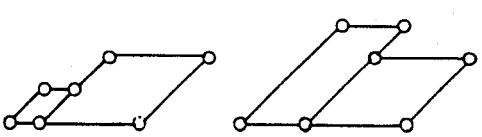
$A_4 \times B_1$ 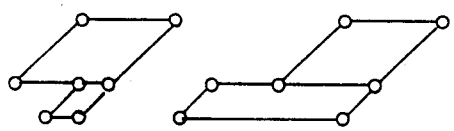
$A_4 \times B_2$ 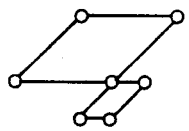
$A_4 \times B_3$ 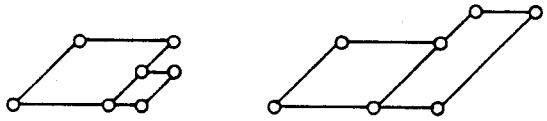
$A_4 \times B_4$ 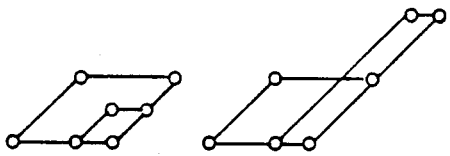

FIG.4
Class
$A_1 \times K_1$ 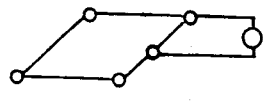 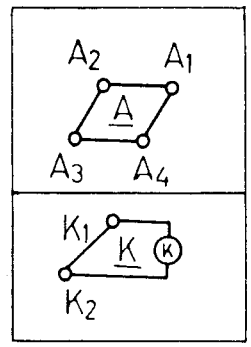
$A_1 \times K_2$ 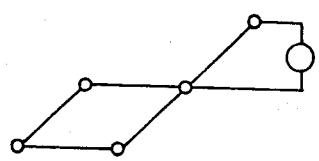
$A_2 \times K_1$ 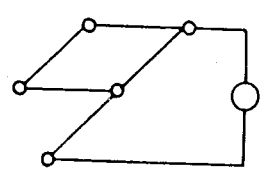
$A_2 \times K_2$ 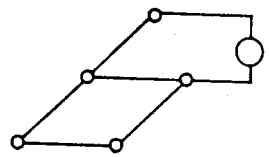
$A_3 \times K_1$ 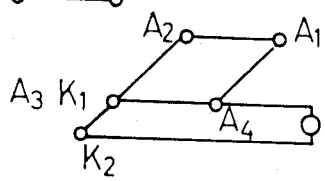
$A_3 \times K_2$ 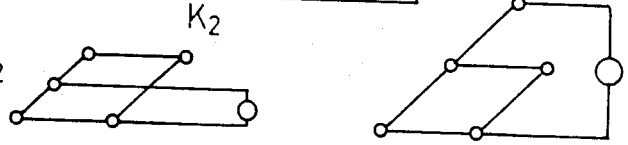
$A_4 \times K_1$ 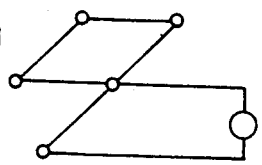
$A_4 \times K_2$ 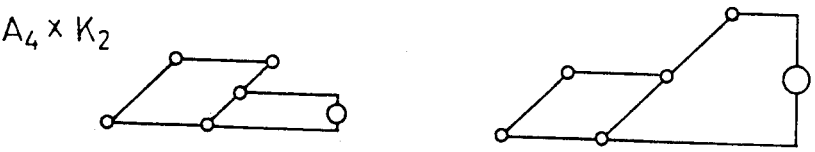

Fig. 12a ( Part 1 )

LIST IN TABLE FORM OF POSSIBILITIES FOR INTERNAL HEAT EXCHANGE

SYSTEMS HAVING TWO ABSORPTION CYCLES A, B

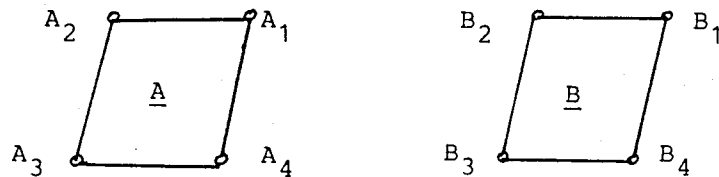

Coupling Type $A_1 \times B_1$

Heat exchange in one temperature range
(additionally to the common exchange unit $A_1 = B_1$ )

| $B_1A_1$ (+−) | $B_2A_2$ (+−) | $B_3A_2$ (++) | $B_4A_2$ (+−) |
|---|---|---|---|
| | $B_2A_3$ (++) | $B_3A_3$ (+−) | $B_4A_3$ (++) |
| | $B_2A_4$ (+−) | $B_3A_4$ (++) | $B_4A_4$ (+−) |
| | $B_2A_2A_4$ (+−−) | $B_3A_2A_4$ (+++) | $B_4A_2A_4$ (+−−) |
| | $A_2B_2B_4$ (+−−) | $A_3B_2B_4$ (+++) | $A_4B_2B_4$ (+−−) |

Heat exchange in two temperature ranges

| | |
|---|---|
| $B_1A_1$ (+−) and $B_2A_2$ (+−) | $B_1A_1$ (+−) and $B_2A_2A_4$ (+−−) |
| $B_1A_1$ (+−) and $B_2A_4$ (+−) | $B_1A_1$ (+−) and $A_2B_2B_4$ (−++) |
| $B_1A_1$ (+−) and $B_3A_3$ (+−) | $B_1A_1$ (+−) and $B_4A_2A_4$ (+−−) |
| $B_1A_1$ (+−) and $B_4A_2$ (+−) | $B_1A_1$ (+−) and $A_4B_2B_4$ (−++) |
| $B_1A_1$ (+−) and $B_4A_4$ (+−) | |

Fig. 12a ( Part 2 )

Coupling Type $A_1 \times B_2$ ( or $A_2 \times B_1$ )
___

Heat exchange in one temperature range

| $B_2\ A_1\ (++)$ | $B_3\ A_2\ (++)$<br>$B_3\ A_3\ (+-)$<br>$B_3\ A_4\ (++)$ | $B_4\ A_1\ (++)$<br>$B_4\ A_2\ (+-)$<br>$B_4\ A_3\ (++)$<br>$B_4\ A_4\ (+-)$ |
|---|---|---|
| $B_2\ A_1 B_4\ (+++)$ | $B_3\ A_2\ A_4\ (+++)$ | $B_4\ A_2\ A_4\ (+--)$ |

Heat exchange in two temperature ranges

| $B_2\ A_1\ (++)$ and $B_3\ A_2\ (++)$<br>$B_2\ A_1\ (++)$ and $B_3\ A_4\ (++)$<br>$B_2\ A_1\ (++)$ and $B_4\ A_3\ (++)$<br><br>$B_3\ A_3\ (+-)$ and $B_4\ A_2\ (+-)$<br>$B_3\ A_3\ (+-)$ and $B_4\ A_4\ (+-)$ | $B_2\ A_1\ (++)$ and $B_3\ A_2\ A_4\ (+++)$<br>$B_3\ A_2\ (++)$ and $B_4\ A_1\ B_2\ (+++)$<br>$B_3\ A_4\ (++)$ and $B_4\ A_1\ B_2\ (+++)$<br><br>$B_2\ A_1\ B_4\ (+++)$ and $B_3\ A_2\ A_4\ (+++)$ |
|---|---|

Coupling Type $A_1 \times B_3$
___

| $A_1\ B_3\ (++)$ |
|---|

Fig. 12a(Part 3)

Coupling Type $A_1 \times B_4$

---

Heat exchange in one temperature range

| $B_2$ $A_1$ (++) | $B_3$ $A_2$ (++) | $B_4$ $A_1$ (++) |
| $B_2$ $A_2$ (+-) | $B_3$ $A_3$ (+-) | |
| $B_2$ $A_3$ (++) | $B_3$ $A_4$ (++) | |
| $B_2$ $A_4$ (+-) | | |
| $B_2$ $B_4$ $A_1$ (+++) | $B_3$ $A_2$ $A_4$ (+++) | $B_2$ $A_2$ $A_4$ (+--) |

Heat exchange in two temperature ranges

| $B_4$ $A_1$ (++) and $B_2$ $A_3$ (++) | $B_2$ $A_1$ (++) and $B_3$ $A_2$ (++) |
| $B_4$ $A_1$ (++) and $B_3$ $A_2$ (++) | $B_2$ $A_1$ (++) and $B_3$ $A_4$ (++) |
| $B_4$ $A_1$ (++) and $B_3$ $A_4$ (++) | $B_2$ $A_2$ (+-) and $B_3$ $A_3$ (+-) |
| | $B_2$ $A_4$ (+-) and $B_3$ $A_3$ (+-) |

| $B_4$ $A_1$ (++) and $B_3$ $A_2$ $A_4$ (+++) |
| $B_2$ $A_1$ (++) and $B_3$ $A_2$ $A_4$ (+++) |

| $B_2$ $B_4$ $A_1$ (+++) and $B_3$ $A_2$ $A_4$ (+++) |

Fig. 12a ( Part 4 )

Coupling Type $A_2 \times B_2$

---

Heat exchange in one temperature range

| $B_1\ A_1\ (+-)$ $B_1\ A_4\ (++)$ | $B_2\ A_2\ (+-)$ $B_2\ A_4\ (+-)$ | $B_3\ A_3\ (+-)$ $B_3\ A_4\ (++)$ | $B_4\ A_1\ (++)$ $B_4\ A_2\ (+-)$ $B_4\ A_3\ (++)$ $B_4\ A_4\ (+-)$ |

| $B_2\ A_2\ A_4\ (+-)$ | $B_2\ A_2\ B_4\ (+-)$ | $B_2\ A_2\ B_4\ A_4\ (+-+-)$ |

Heat exchange in two temperature ranges

| $B_2\ A_2\ (--)$ and $B_1\ A_1\ (+-)$ $B_2\ A_2\ (+-)$ and $B_2\ A_4\ (+-)$ $B_2\ A_2\ (+-)$ and $B_3\ A_3\ (+-)$ $B_2\ A_2\ (+-)$ and $B_4\ A_4\ (+-)$ | $B_1\ A_1\ (+-)$ and $B_2\ A_2\ B_4\ (+-+)$ $B_3\ A_3\ (+-)$ and $B_2\ A_2\ B_4\ (+-+)$ $B_1\ A_1\ (+-)$ and $B_2\ A_2\ A_4\ (+--)$ $B_3\ A_3\ (+-)$ and $B_2\ A_2\ A_4\ (+--)$ |

| $B_1\ A_4\ (++)$ and $B_4\ A_3\ (++)$ $B_3\ A_4\ (++)$ and $B_4\ A_1\ (++)$ |

Fig. 12a ( Part 5 )

Coupling Type $A_2 \times B_3$
___

Heat exchange in one temperature range

| $B_1\ A_1\ (+-)$ $B_1\ A_4\ (++)$ | $B_2\ A_1\ (++)$ $B_2\ A_4\ (+-)$ | $B_3\ A_2\ (++)$ $B_3\ A_4\ (++)$ | $B_4\ A_1\ (++)$ $B_4\ A_4\ (+-)$ |
|---|---|---|---|

| $B_3\ A_2\ A_4\ (+++)$ | $B_2\ A_1\ B_4\ (+++)$ | $B_2\ A_4\ B_4\ (+-+)$ |
|---|---|---|

Heat exchange in two temperature ranges

| $B_3\ A_2\ (++)$ | and | $B_1\ A_4\ (++)$ |
| $B_3\ A_2\ (++)$ | and | $B_2\ A_1\ (++)$ |
| $B_3\ A_2\ (++)$ | and | $B_4\ A_1\ (++)$ |

| $B_1\ A_1\ (+-)$ | and | $B_2\ A_4\ (+-)$ |
| $B_1\ A_1\ (+-)$ | and | $B_4\ A_4\ (+-)$ |

| $B_2\ A_1\ (++)$ | and | $B_3\ A_2\ A_4\ (+++)$ |
| $B_4\ A_1\ (++)$ | and | $B_3\ A_2\ A_4\ (+++)$ |
| $B_3\ A_2\ (++)$ | and | $B_2\ A_1\ B_4\ (+++)$ |
| $B_3\ A_4\ (++)$ | and | $B_2\ A_1\ B_4\ (+++)$ |
| $B_1\ A_1\ (+-)$ | and | $B_2\ A_4\ B_4\ (+-+)$ |

| $B_2\ A_1\ B_4\ (+++)$ and $B_3\ A_2\ A_4\ (+++)$ |

Fig. 12a ( Part 6 )

Coupling Type $A_2 \times B_4$

---

Heat exchange in one temperature range

| $B_1\ A_1\ (+-)$<br>$B_1\ A_4\ (++)$ | $B_2\ A_1\ (++)$<br>$B_2\ A_2\ (+-)$<br>$B_2\ A_3\ (++)$<br>$B_2\ A_4\ (+-)$ | $B_3\ A_3\ (+-)$<br>$B_3\ A_4\ (++)$ | $B_4\ A_2\ (+-)$<br>$B_4\ A_4\ (+-)$ |
|---|---|---|---|
| $B_4\ A_2\ B_2\ (+-+)$ | $B_4\ A_2\ A_4\ (+--)$ | $B_4\ A_2\ B_2\ A_4\ (+-+-)$ | |

Heat exchange in two temperature ranges

| $B_4\ A_2\ (+-)$ and $B_3\ A_3\ (+-)$<br>$B_4\ A_2\ (+-)$ and $B_2\ A_4\ (+-)$<br>$B_4\ A_2\ (+-)$ and $B_1\ A_1\ (+-)$ | $B_1\ A_1\ (+-)$ and $B_2A_2\ B_4$<br>$B_1\ A_1\ (+-)$ and $B_4A_2\ A_4$<br>$B_3\ A_3\ (+-)$ and $B_2A_2\ B_4$<br>$B_3\ A_3\ (+\ )$ and $B_4A_2\ A_4$ |
|---|---|

| $B_1\ A_4\ (++)$ and $B_2\ A_3\ (++)$<br>$B_2\ A_1\ (++)$ and $B_3\ A_4\ (++)$ |
|---|

Fig. 12a (Part 7)

Coupling Type $A_3 \times B_3$

---

Heat exchange in one temperature range

| $B_1\ A_1\ (+-)$ $B_1\ A_2\ (++)$ $B_1\ A_4\ (++)$ | $B_2\ A_1\ (++)$ $B_2\ A_2\ (+-)$ $B_2\ A_4\ (+-)$ | $B_3\ A_3\ (+-)$ | $B_4\ A_1\ (++)$ $B_4\ A_2\ (+-)$ $B_4\ A_4\ (+-)$ |
|---|---|---|---|
| $B_1\ A_2\ A_4\ (+++)$ $A_1\ B_2\ B_4\ (+++)$ | $B_2\ A_2\ A_4\ (+--)$ $A_2\ B_2\ B_4\ (+--)$ | $B_4\ A_2\ A_4\ (+--)$ $A_4\ B_2\ B_4\ (+--)$ | |

Heat exchange in two temperature ranges

| | | |
|---|---|---|
| $B_3\ A_3\ (+-)$ | and | $B_1\ A_1\ (+-)$ |
| $B_3\ A_3\ (+-)$ | and | $B_2\ A_2\ (+-)$ |
| $B_3\ A_3\ (+-)$ | and | $B_2\ A_4\ (+-)$ |
| $B_3\ A_3\ (+-)$ | and | $B_4\ A_2\ (+-)$ |
| $B_3\ A_3\ (+-)$ | and | $B_4\ A_4\ (+-)$ |
| $B_3\ A_3\ (+-)$ | and | $B_2\ A_2\ A_4\ (+--)$ |
| $B_3\ A_3\ (+-)$ | and | $A_2\ B_2\ B_4\ (-++)$ |
| $B_3\ A_3\ (+-)$ | and | $B_4\ A_2\ A_4\ (+--)$ |
| $B_3\ A_3\ (+-)$ | and | $A_4\ B_2\ B_4\ (-++)$ |

Fig. 12a ( Part 8 )

Coupling Type $A_3 \times B_4$

---

Heat exchange in one temperature range

| $B_1\ A_1\ (+-)$ $B_1\ A_2\ (++)$ $B_1\ A_4\ (++)$ | $B_2\ A_1\ (++)$ $B_2\ A_2\ (+-)$ $B_2\ A_3\ (++)$ $B_2\ A_4\ (+-)$ | $B_4\ A_3\ (++)$ |
|---|---|---|
| $B_1\ A_2\ A_4\ (+++)$ | $B_2\ A_2\ A_4\ (+--)$ | $B_2\ B_4\ A_3\ (+++)$ |

Heat exchange in two temperature ranges

| |
|---|
| $B_4\ A_3\ (++)$ and $B_1\ A_2\ (++)$ <br> $B_4\ A_3\ (++)$ and $B_1\ A_4\ (++)$ <br> $B_4\ A_3\ (++)$ and $B_2\ A_1\ (++)$ |
| $B_1\ A_1\ (+-)$ and $B_2\ A_2\ (+-)$ <br> $B_1\ A_1\ (+-)$ and $B_2\ A_4\ (+-)$ |
| $B_4\ A_3\ (++)$ and $B_1\ A_2\ A_4\ (+++)$ <br> $B_1\ A_2\ (++)$ and $B_2\ A_3\ B_4\ (+++)$ <br> $B_1\ A_4\ (++)$ and $B_2\ A_3\ B_4\ (+++)$ |
| $B_1\ A_2\ A_4\ (+++)$ and $B_2\ B_4\ A_3\ (+++)$ |

Fig. 12a ( Part 9 )

Coupling Type $A_4 \times B_4$

---

Heat exchange in one temperature range

| $B_1\ A_1\ (+-)$  $B_1\ A_2\ (++)$ | $B_2\ A_1\ (++)$  $B_2\ A_2\ (+-)$  $B_2\ A_3\ (++)$  $B_2\ A_4\ (+-)$ | $B_3\ A_2\ (++)$  $B_3\ A_3\ (+-)$ | $B_4\ A_2\ (+-)$  $B_4\ A_4\ (+-)$ |
|---|---|---|---|
| $B_2\ B_4\ A_4\ (++-)$ | | $B_4\ A_2\ A_4\ (+--)$ | $B_4\ A_4\ B_2\ A_2\ (+-+-)$ |

Heat exchange in two temperature ranges

| | |
|---|---|
| $B_4\ A_4\ (+-)$ and $B_1\ A_1\ (+-)$  $B_4\ A_4\ (+-)$ and $B_2\ A_2\ (+-)$  $B_4\ A_4\ (+-)$ and $B_3\ A_3\ (+-)$ | $B_1\ A_1\ (+-)$ and $B_2\ B_4\ A_4\ (++-)$  $B_1\ A_1\ (+-)$ and $B_4\ A_2\ A_4\ (+--)$  $B_3\ A_3\ (+-)$ and $B_2\ B_4\ A_4\ (+--)$  $B_3\ A_3\ (+-)$ and $B_4\ A_2\ A_4\ (+--)$ |

| |
|---|
| $B_1\ A_2\ (++)$ and $B_2\ A_3\ (++)$  $B_2\ A_1\ (++)$ and $B_3\ A_2\ (++)$ |

Fig. 12b ( Part 1 )

List in Table Form of the Possibility for Internal Heat Exchange

Systems having one absorption cycle and one pressure machine cycle

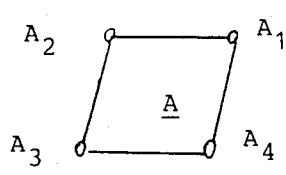
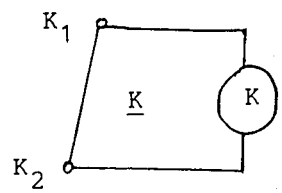

Coupling Type $A_1 \times K_1$

---

Heat exchange in one temperature range

| | |
|---|---|
| $K_1\ A_1\ (++)$ | $K_2\ A_2\ (++)$ |
| | $K_2\ A_3\ (+-)$ |
| | $K_2\ A_4\ (++)$ |
| $K_2\ A_2\ A_4\ (+++)$ | |

Heat exchange in two temperature ranges

| | | |
|---|---|---|
| $K_1\ A_1\ (++)$ | and | $K_2\ A_2\ (++)$ |
| $K_1\ A_1\ (++)$ | and | $K_2\ A_4\ (++)$ |
| $K_1\ A_2\ (++)$ | and | $K_2\ A_2\ A_4\ (+++)$ |

Fig. 12b ( Part 2 )

Coupling Type $A_1 \times K_2$

| $K_2\ A_1\ (+-)$ |

Coupling Type $A_2 \times K_1$

Heat exchange in one temperature range

| $K_1\ A_2\ (+-)$     $K_2\ A_3\ (+-)$ |
| $K_1\ A_4\ (+-)$     $K_2\ A_4\ (++)$ |

| $K_1\ A_2\ A_4\ \ (+--)$ |

Heat exchange in two temperature ranges

| $K_1\ A_2\ (+-)$  and  $K_2\ A_3\ (+-)$ |
| $K_2\ A_3\ (+-)$  and  $K_1\ A_2\ A_4\ (+--)$ |

Coupling Type $A_2 \times K_2$

Heat exchange in one temperature range

| $K_1\ A_1\ (++)$ | $K_2\ A_2\ (++)$ |
| $K_1\ A_4\ (+-)$ | $K_2\ A_4\ (++)$ |

| $K_2\ A_2\ A_4\ (+++)$ |

Fig. 12b ( Part 3 )

Heat exchange in two temperature ranges

| $K_2\ A_2\ (++)$ and $K_1\ A_1\ (++)$ |
| $K_1\ A_1\ (++)$ and $K_2\ A_2\ A_4\ (+++)$ |

Coupling Type $A_3 \times K_1$

---

| $A_3\ K_1\ (++)$ |

Coupling Type $A_3 \times K_2$

---

Heat exchange in one temperature range

| $K_1\ A_2\ (+-)$<br>$K_1\ A_4\ (+-)$<br>$K_1\ A_1\ (++)$ | $K_2\ A_3\ (+-)$ |
| $K_1\ A_2\ A_4\ (+--)$ ||

Heat exchange in two temperature ranges

| $K_2\ A_3\ (+-)$ and $K_1\ A_2\ (+-)$<br>$K_2\ A_3\ (+-)$ and $K_1\ A_4\ (+-)$ |
| $K_2\ A_3\ (+-)$ and $K_1 A_2\ A_4\ (+--)$ |

Fig. 12b ( Part 4 )

Coupling Type $A_4 \times K_1$

---

Heat exchange in one temperature range

| $K_1$ $A_2$ (+-) | $K_2$ $A_2$ (++) |
| $K_1$ $A_4$ (+-) | $K_2$ $A_3$ (+-) |

| $K_1$ $A_2$ $A_4$ (+--) |

Heat exchange in two temperature ranges

| $K_1$ $A_4$ (+-)  and  $K_2$ $A_3$ (+-) |
| $K_2$ $A_3$ (+-)  and  $K_1$ $A_2$ $A_4$ (+--) |

Fig. 12b ( Part 5 )

Coupling Type $A_4 \times K_2$

---

Heat exchange in one temperature range $K_1 \ A_2 \ (+-)$     $K_2 \ A_2 \ (++)$
$K_1 \ A_1 \ (++)$     $K_2 \ A_4 \ (++)$ $K_2 \ A_2 \ A_4 \ (+++)$ Heat exchange in two temperature ranges $K_2 \ A_4 \ (++)$   and   $K_1 \ A_1 \ (++)$
$K_1 \ A_1 \ (++)$   and   $K_2 \ A_2 \ A_4 \ (+++)$ $A_1 \times B_1$ 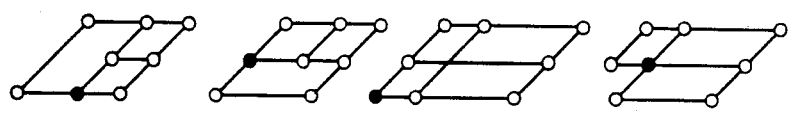
$A_1 \times B_2$ 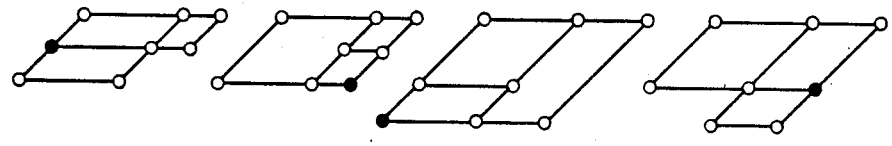
$A_1 \times B_3$ 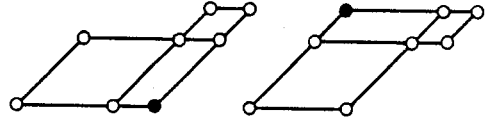
$A_1 \times B_4$ 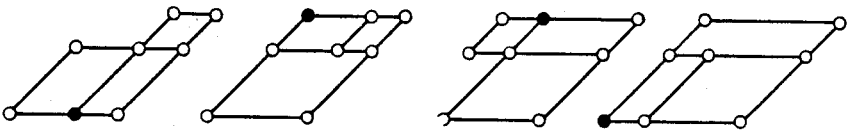
$A_2 \times B_1$ as $A_1 \times B_2$
$A_2 \times B_2$ 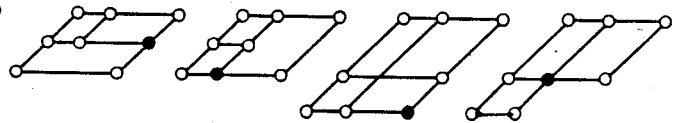
$A_2 \times B_3$ 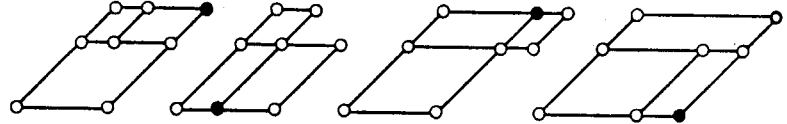
$A_2 \times B_4$ 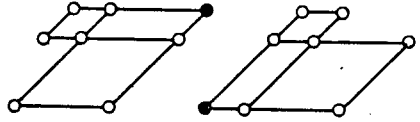
$A_3 \times B_3$ 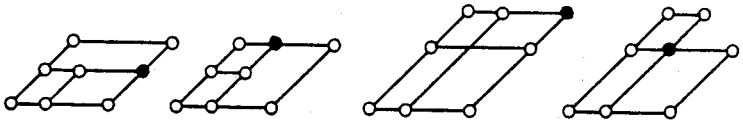
$A_3 \times B_4$ 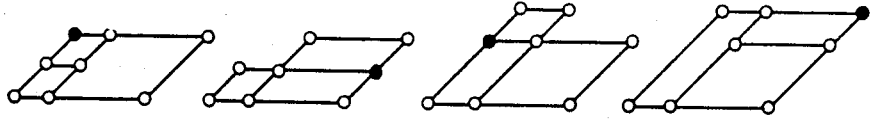
$A_4 \times B_4$ 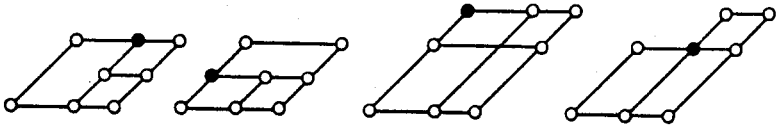
FIG. 13

FIG. 15 (Part 1)

Figure 15:
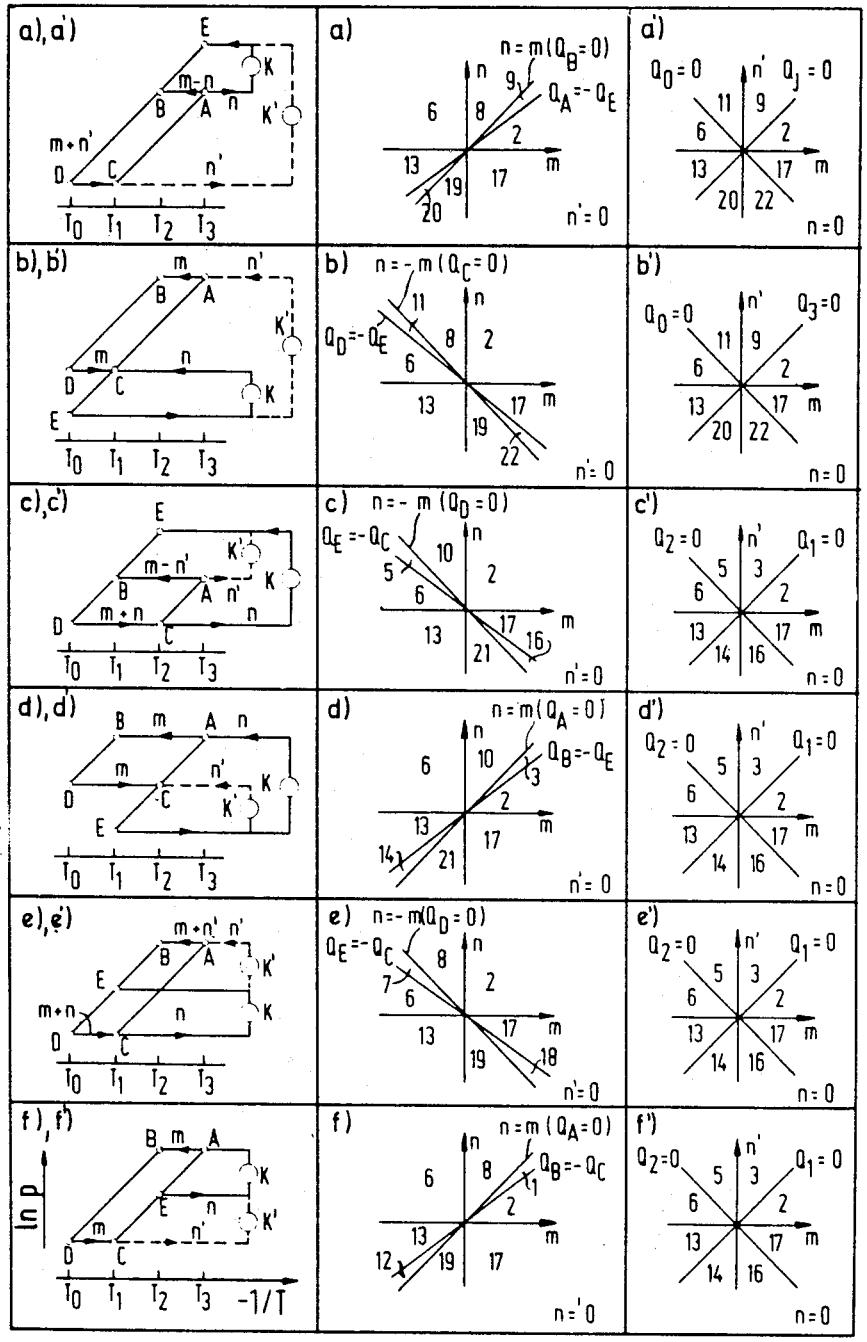

FIG 15 (Part 2)
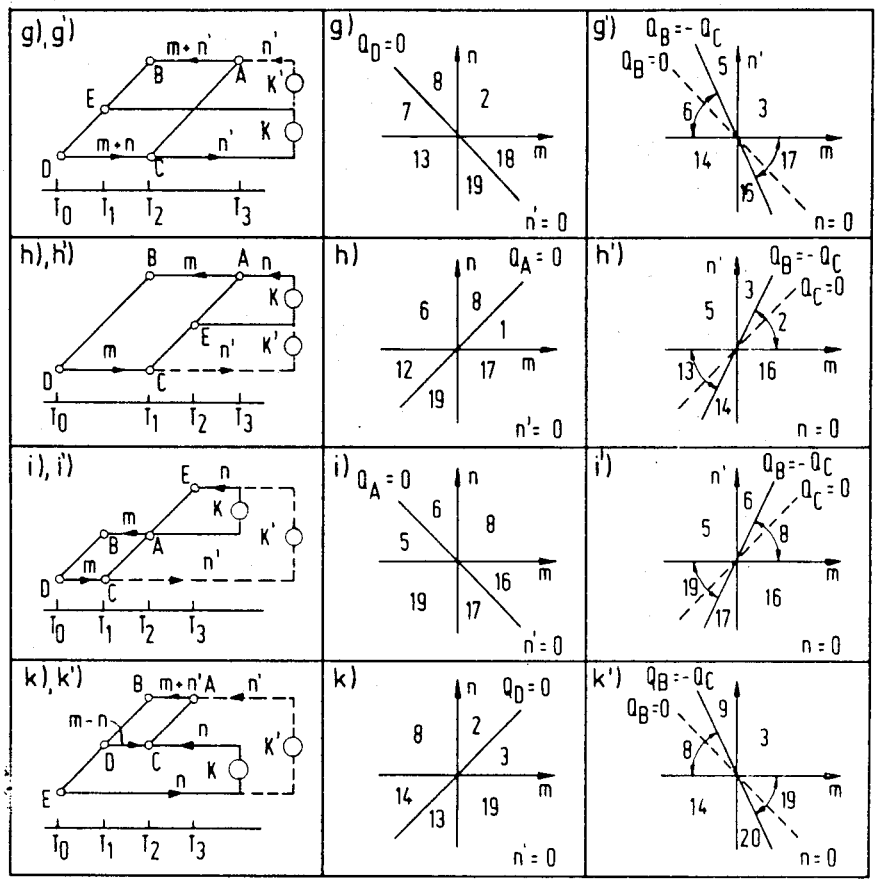
FIG. 16
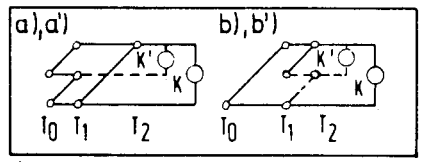

} FIG.19

FIG. 20

FIG. 25 (Part 1)
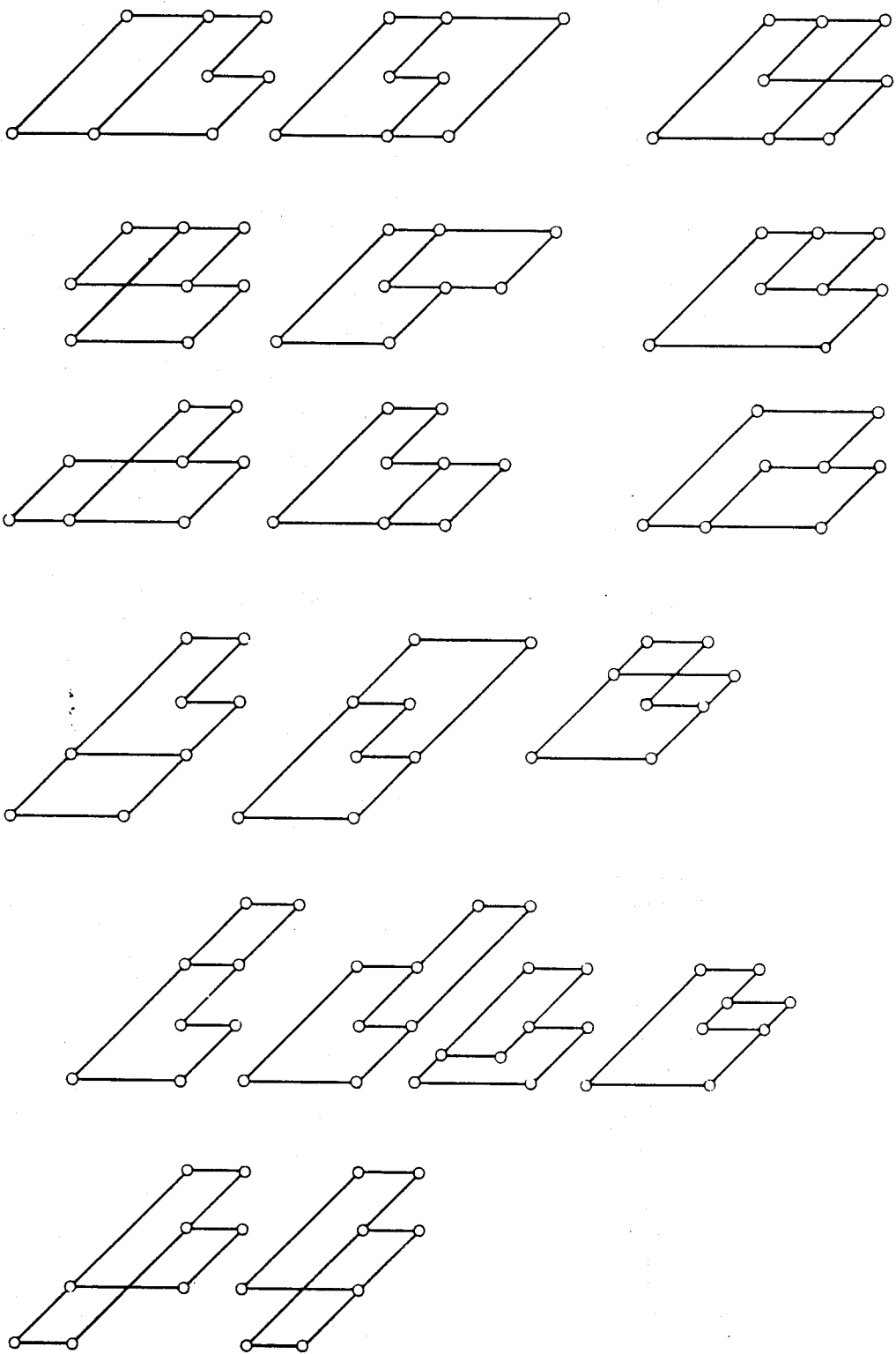

FIG. 25 (Part 2)
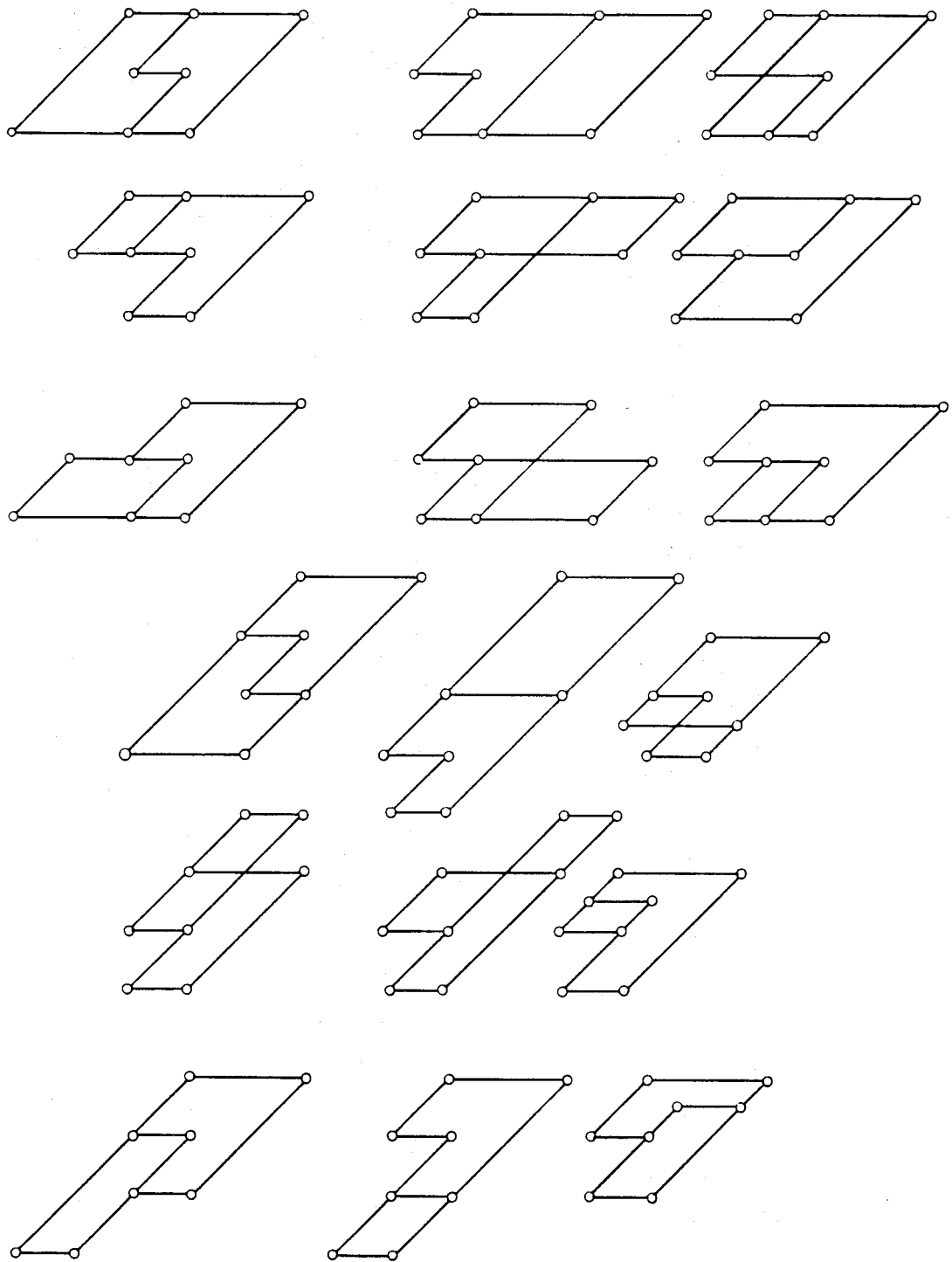

FIG. 25 (Part 3)
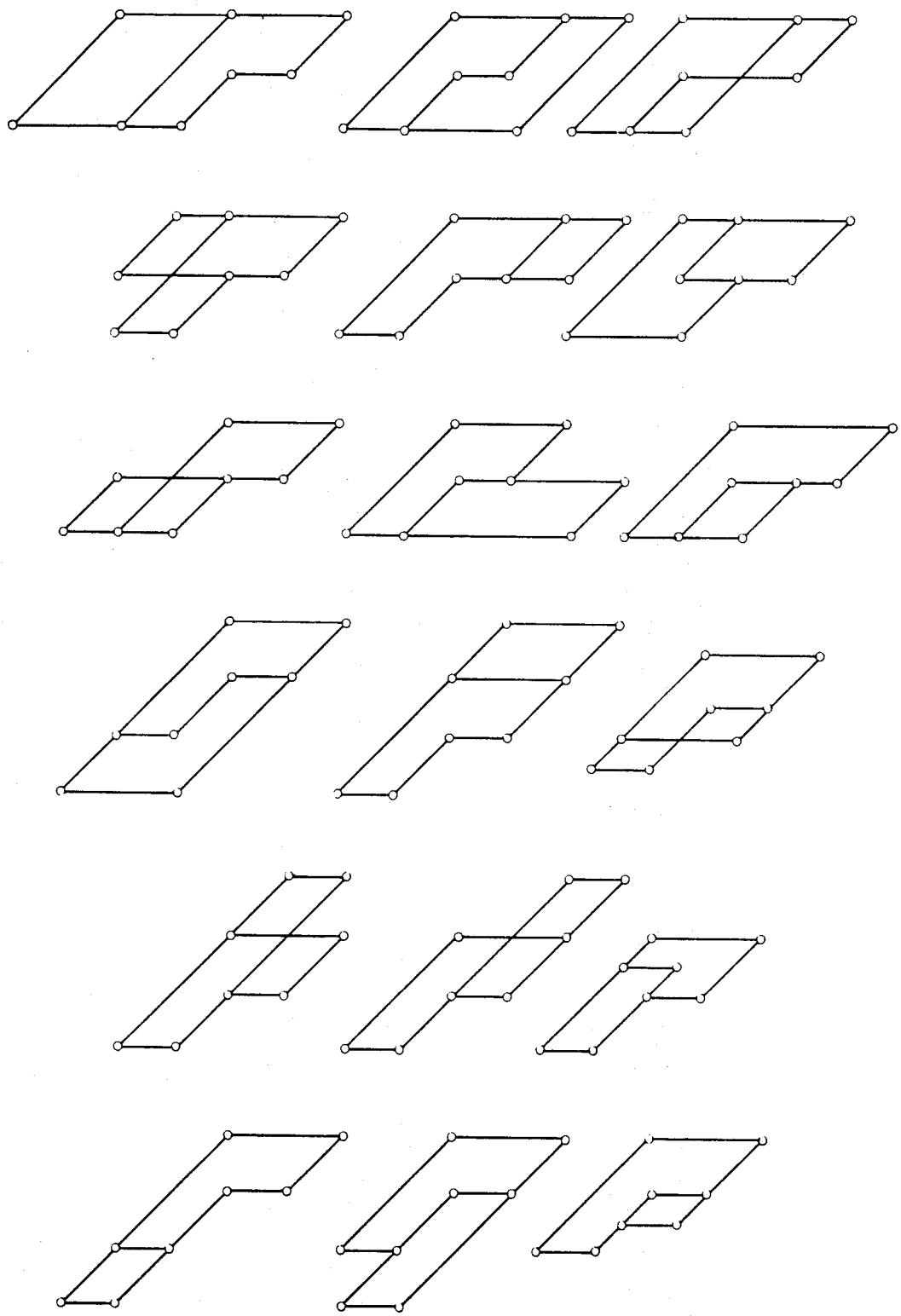

FIG. 25 (Part 4)
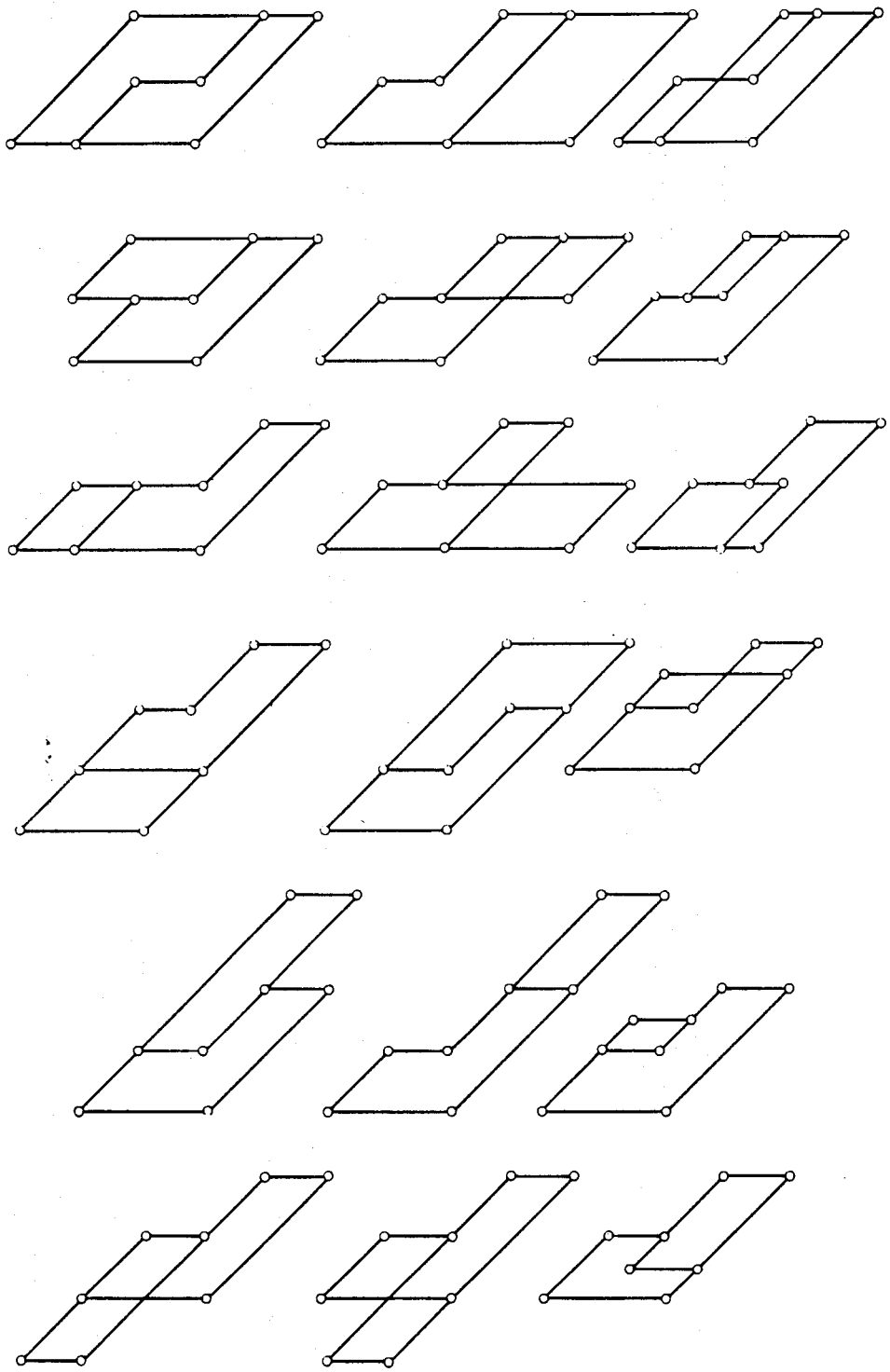

FIG. 25 (Part 5)
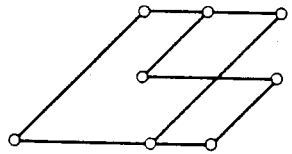
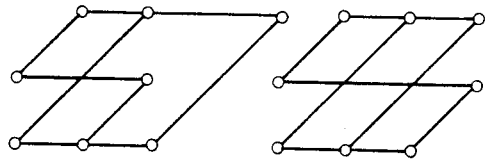
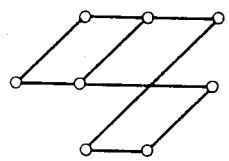
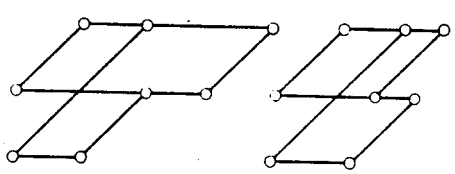
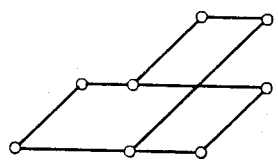
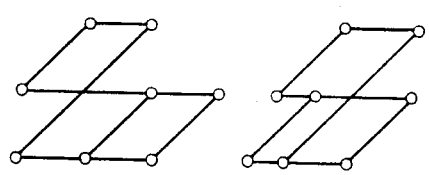
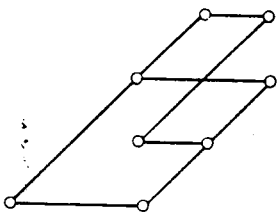
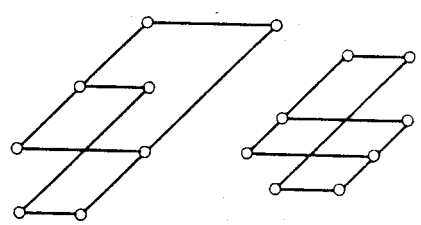
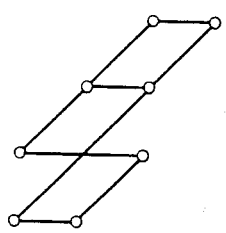
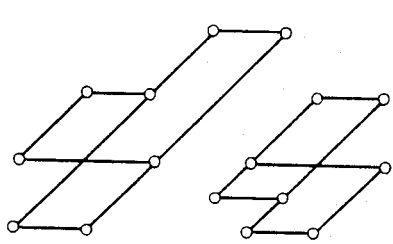
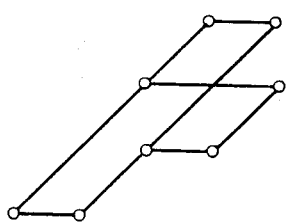
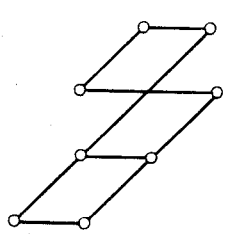
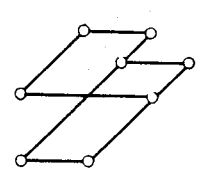

FIG. 25 (Part 6)
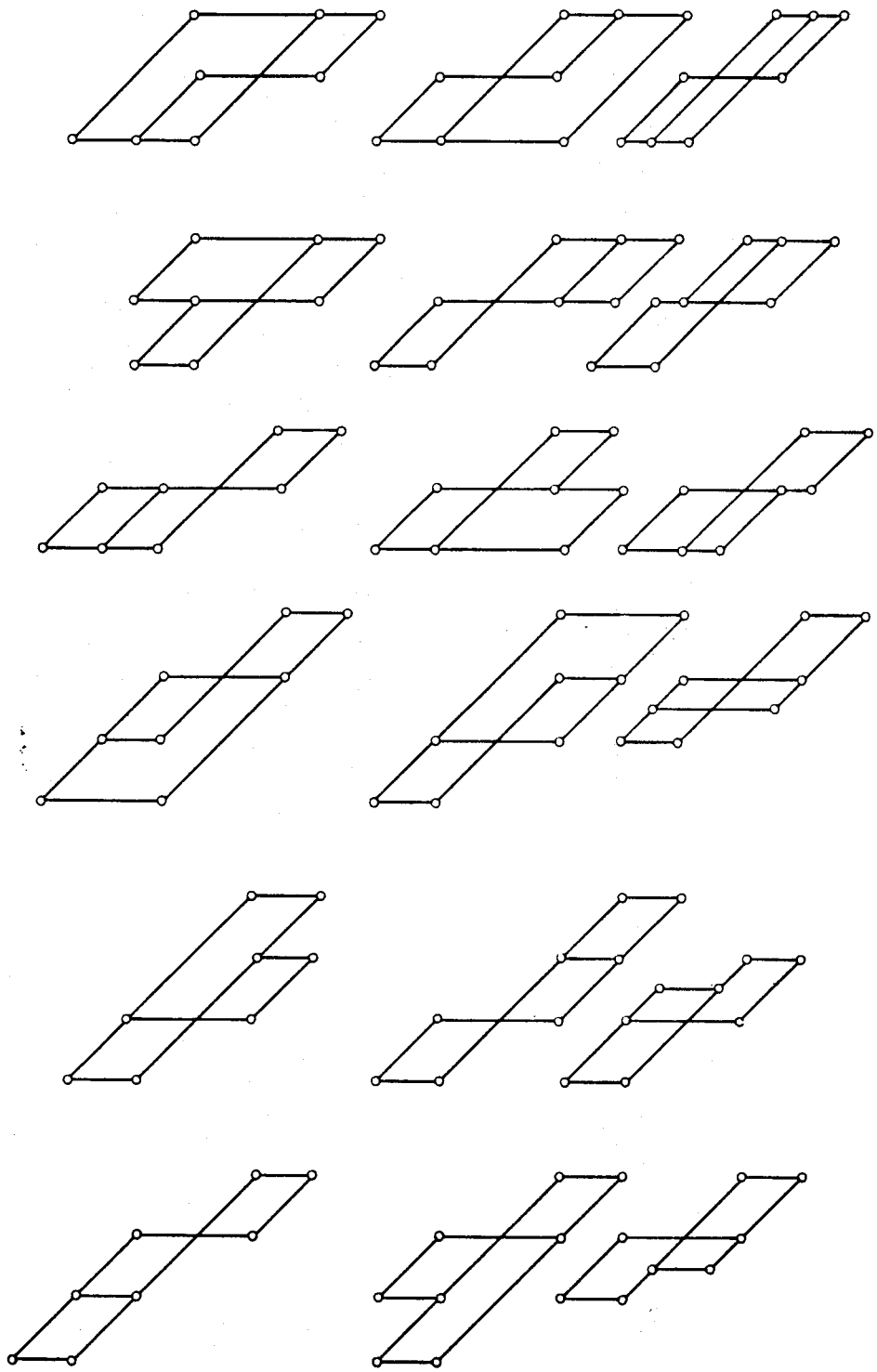

FIG. 28 (Part 1)
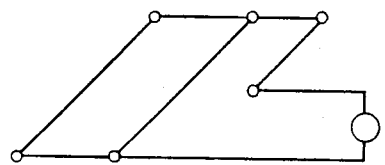
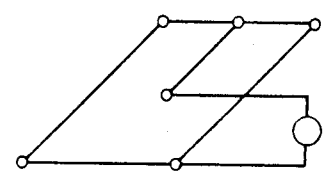
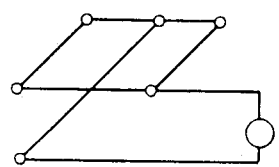
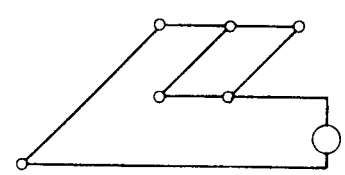
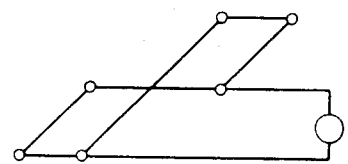
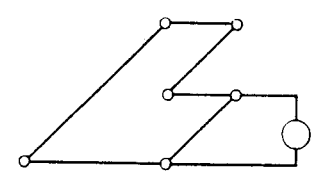
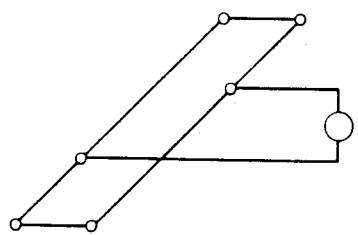
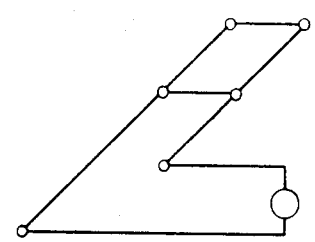
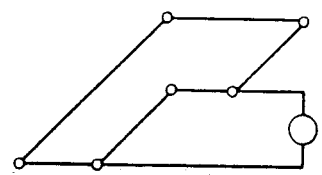
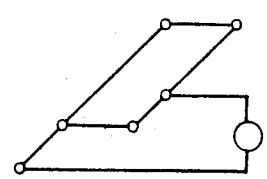

FIG. 28 (Part 2)
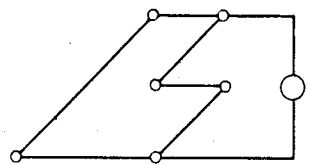
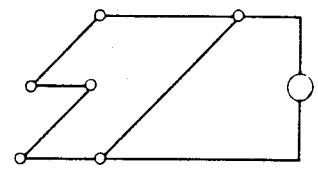
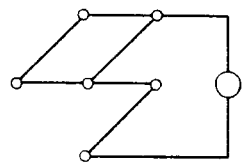
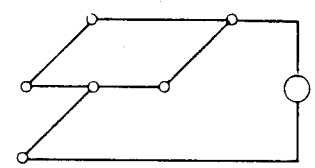
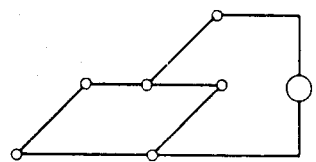
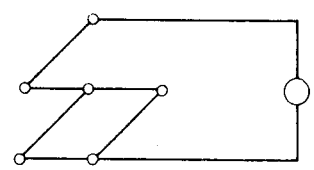
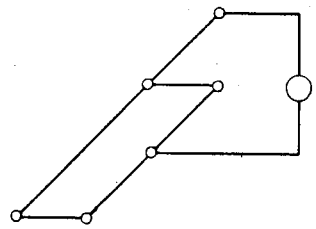
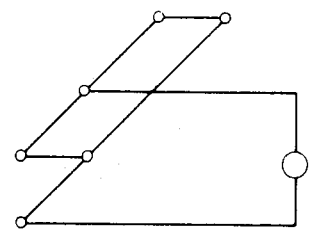
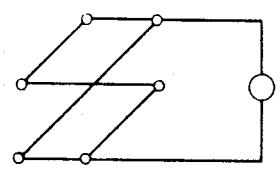

FIG. 28 (Part 3)
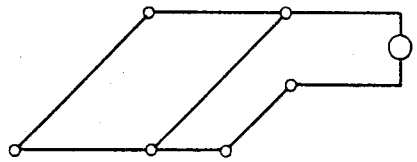
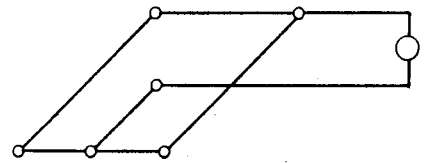
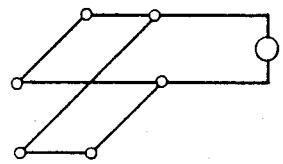
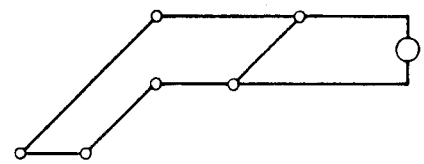
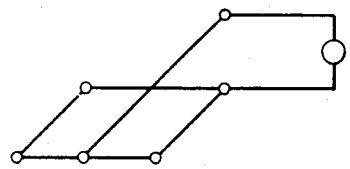
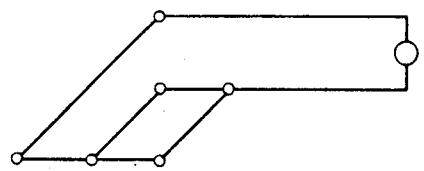
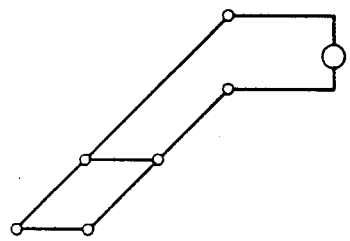
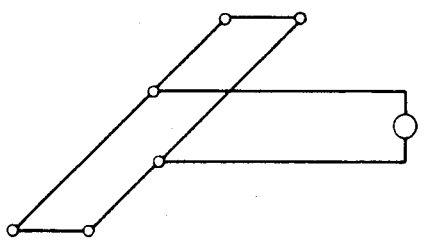
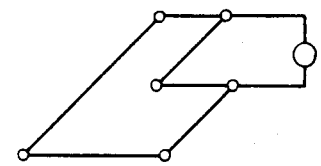

FIG. 28 (Part 4)
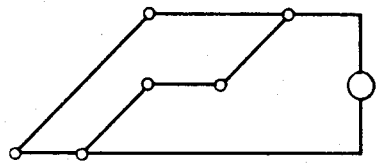 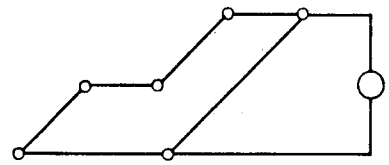
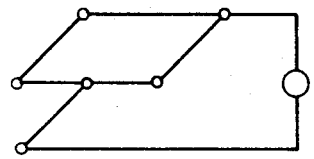 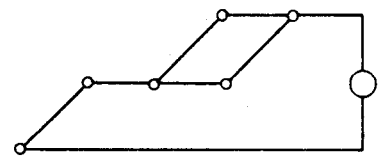
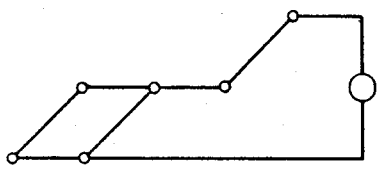 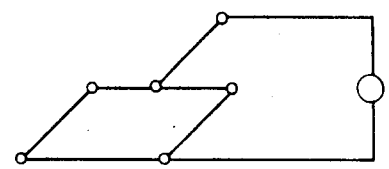
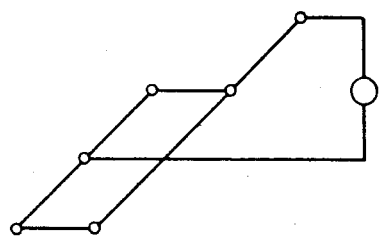 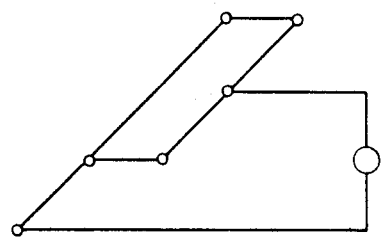
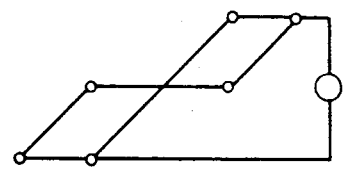 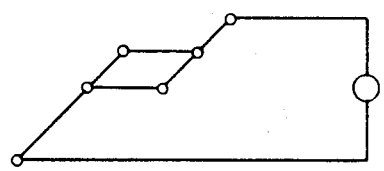

FIG. 28 (Part 5)
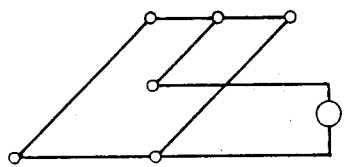
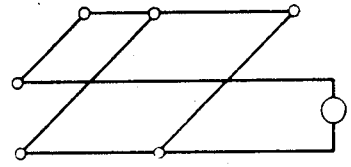
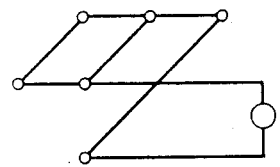
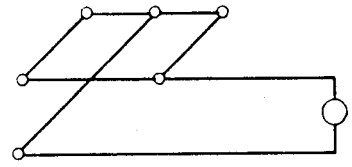
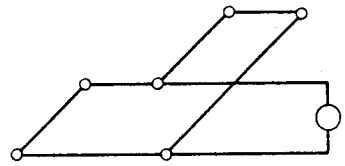
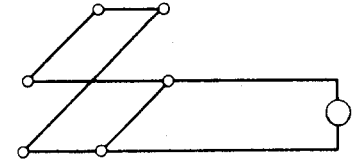
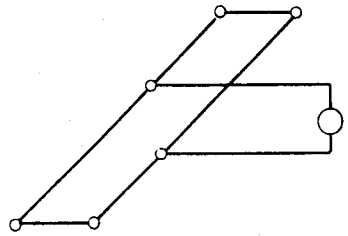
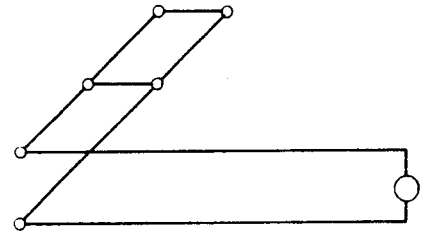
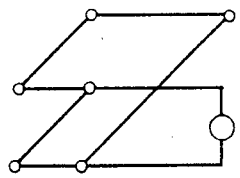
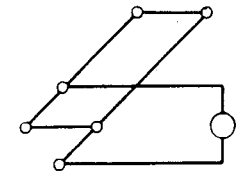

FIG.28 (Part 6)
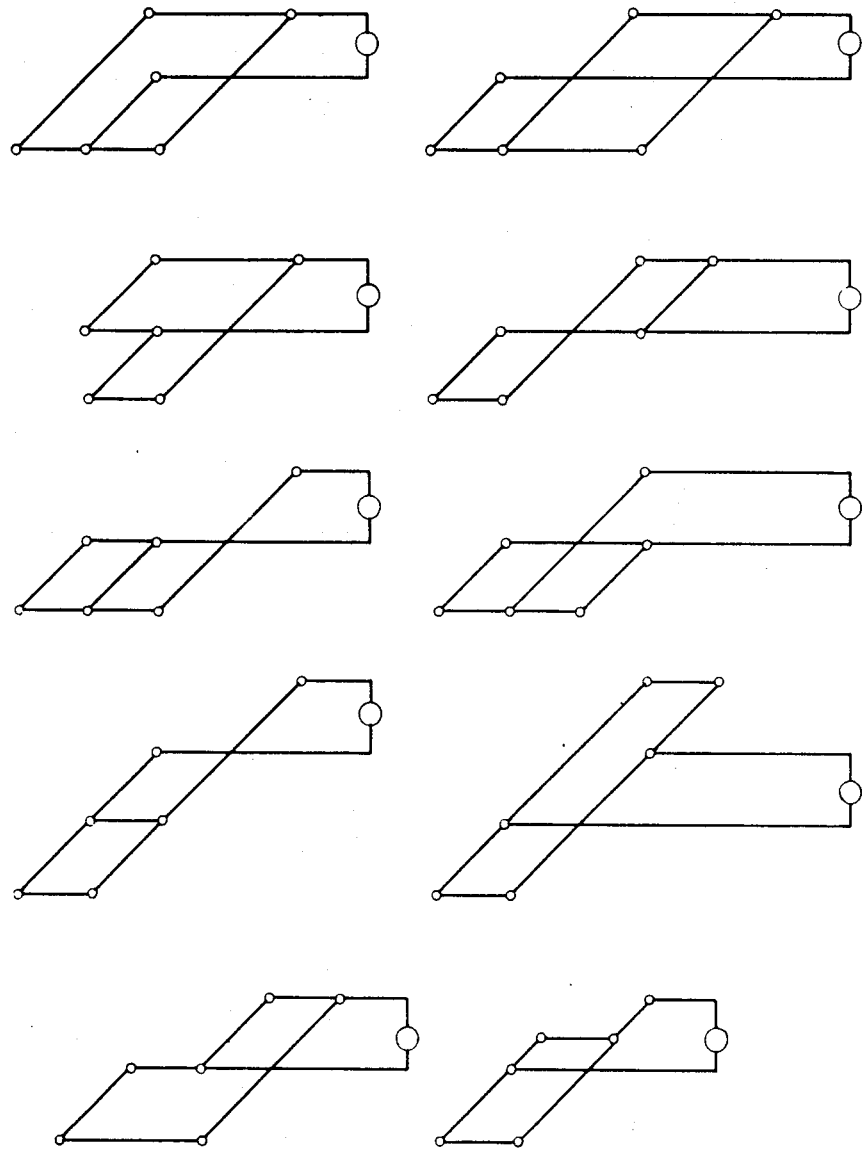

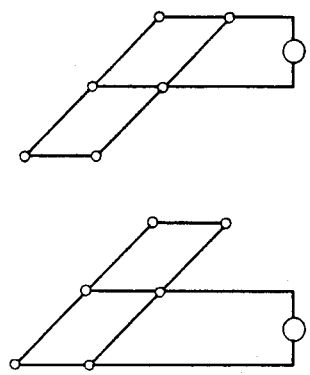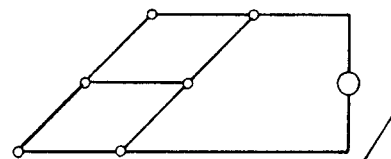
FIG. 29
FIG. 30
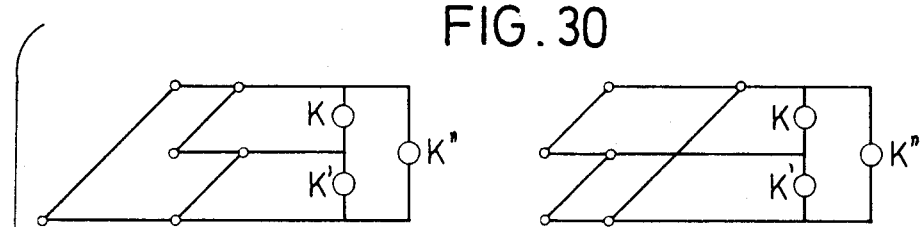
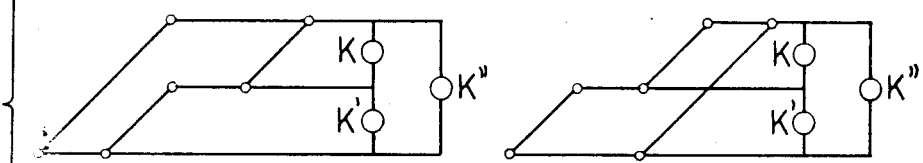
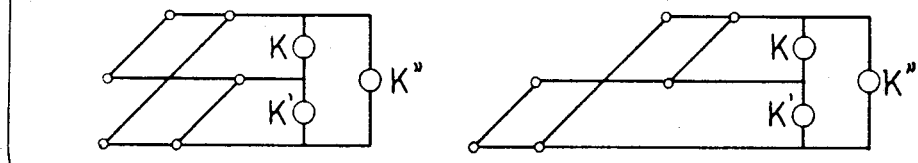
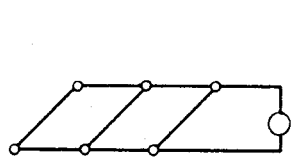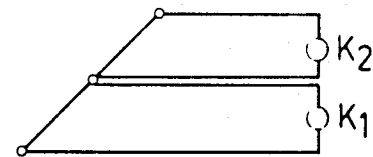
FIG. 31  FIG. 32

K x K x A
FIG. 34
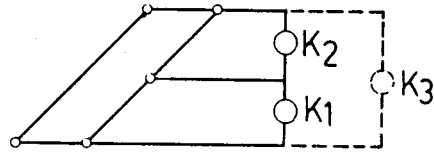
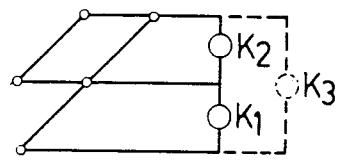
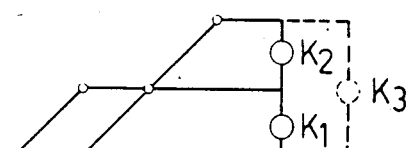
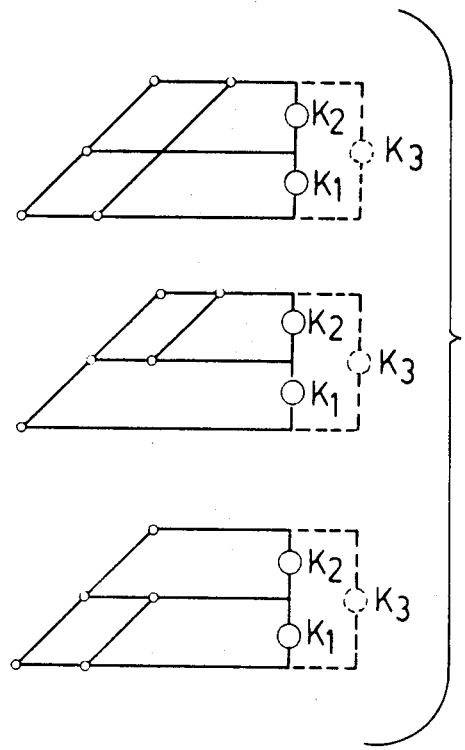
FIG. 34a
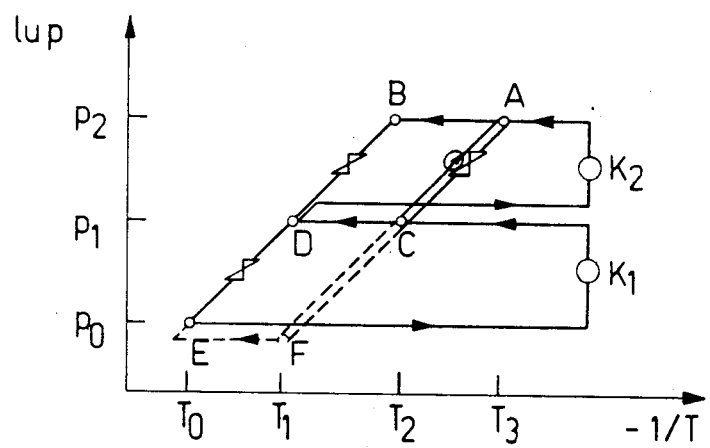
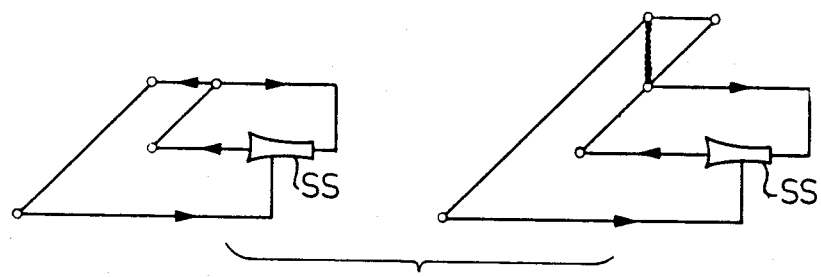
FIG. 35

FIG. 36
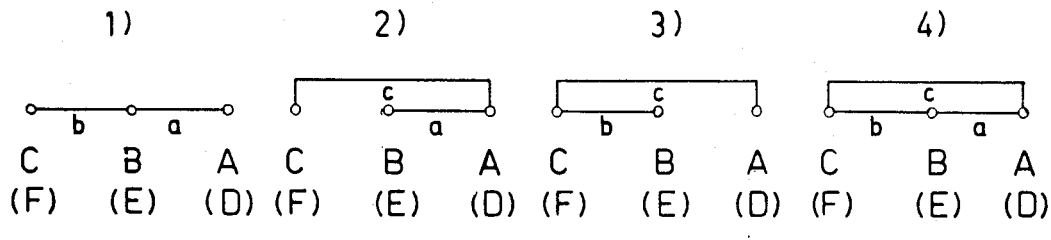
FIG. 37
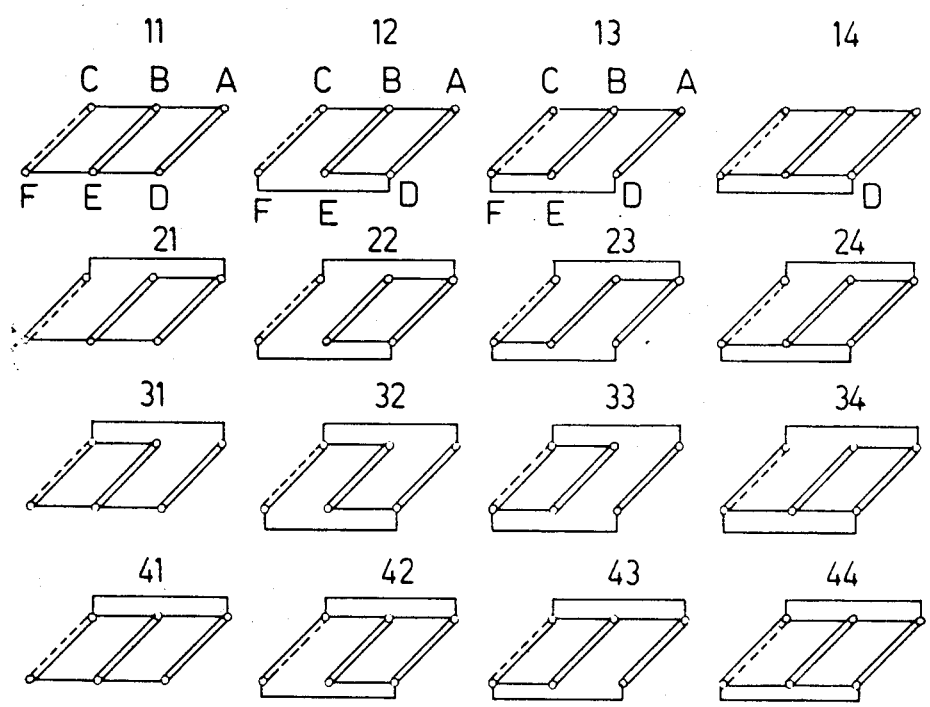
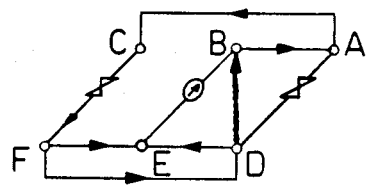
FIG. 37a

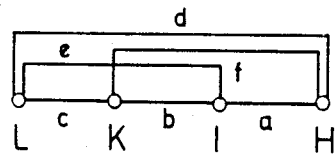
FIG. 38
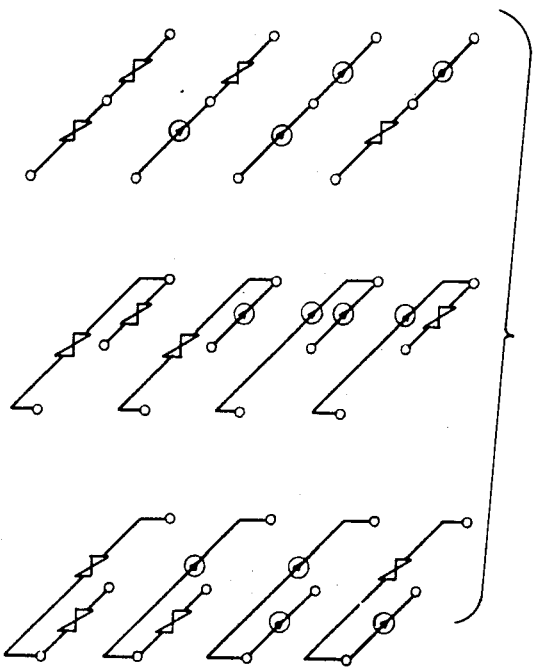
FIG. 39
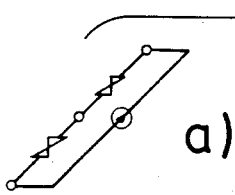
a)
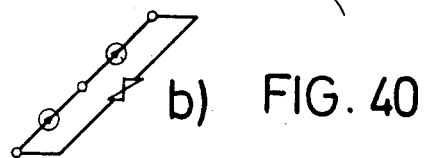
b)  FIG. 40
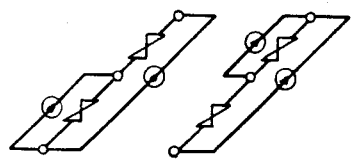
c)  d)
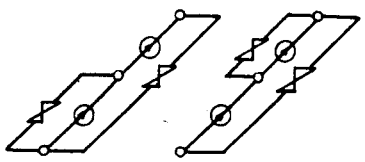
e)  f)
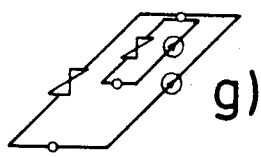
g)
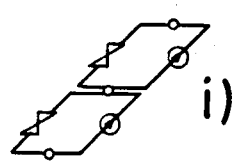
i)
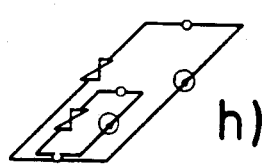
h)

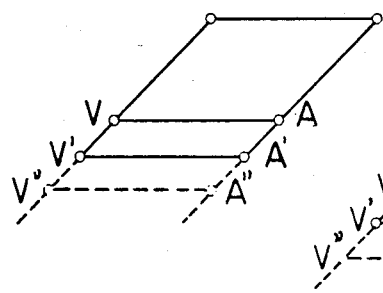
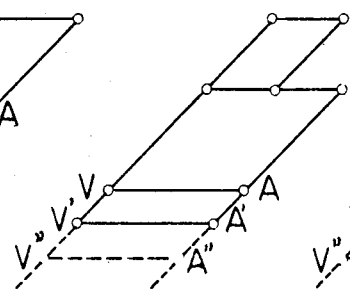
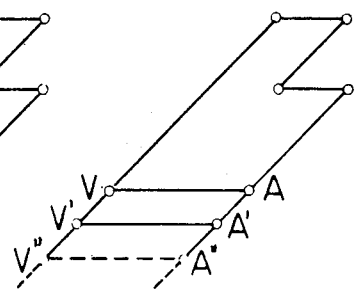
FIG. 44a  FIG. 44b  FIG. 44c
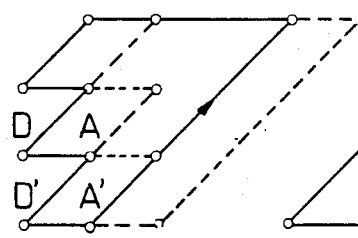
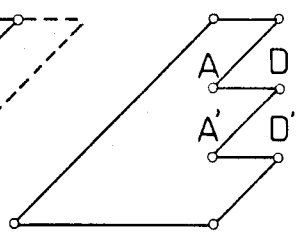
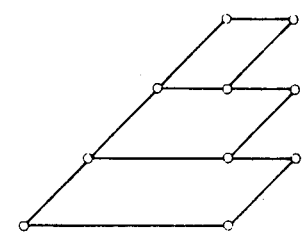
FIG. 44d  FIG. 44e  FIG. 44f
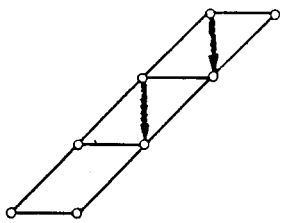
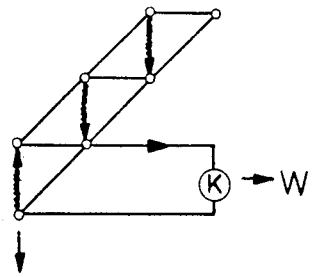
FIG. 44g  FIG. 44h FIG. 45a
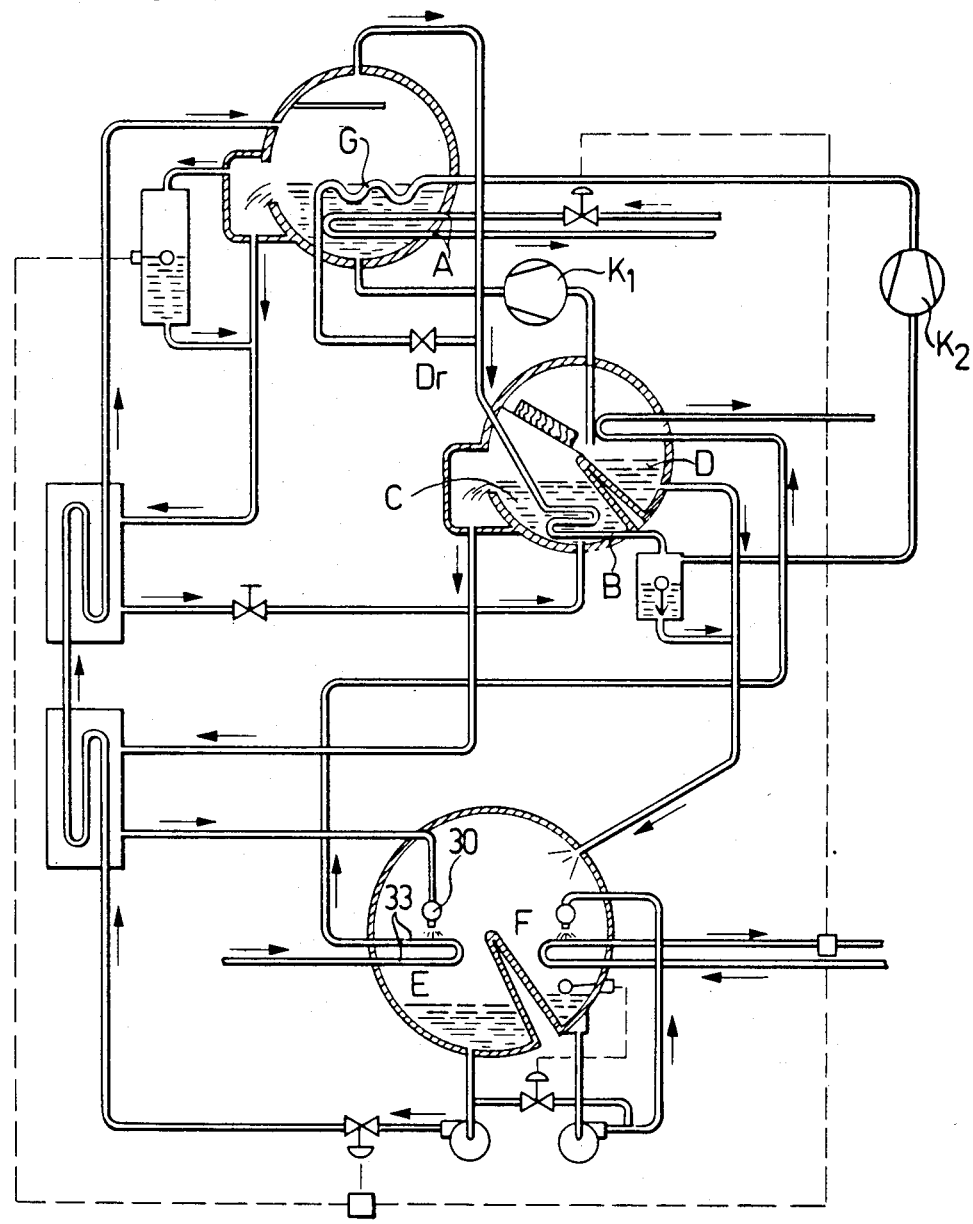
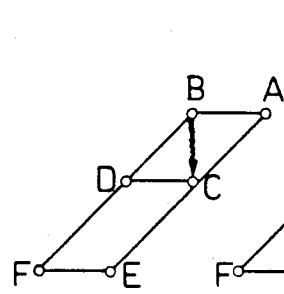
FIG.45b
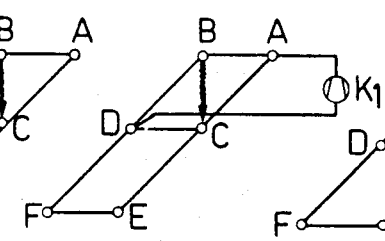
FIG.45c
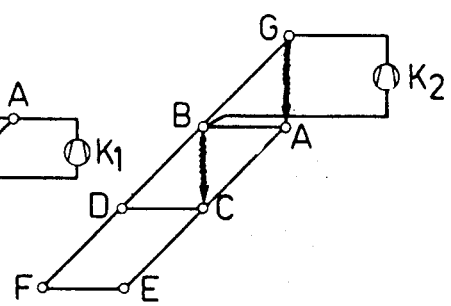
FIG.45d

MULTI-STAGE APPARATUS HAVING WORKING-FLUID AND ABSORPTION CYCLES, AND METHOD OF OPERATION THEREOF

The present invention relates to multi-stage apparatus for harnessing heat energy and/or power, making use of sorption processes and including both working-fluid cycles and absorption cycles. The invention also relates to methods of operating such apparatus.

In an absorption cycle or circuit, a working fluid is absorbed or dissolved in an absorbent, converted to a different pressure level and then desorbed or evaporated again. (The terms "absorbent/solvent", "absorb-/dissolve/resorb" and "evaporate/desorb" should be considered technologically equivalent in this context.)

In a working-fluid cycle or circuit, working fluid circulates partially in the gaseous state and partially in the liquid and/or absorbed state. In the absorbed state, the working fluid is transported in one part of an absorption cycle. A working-fluid cycle thus also includes the part of at least one absorption cycle in which absorbent having a high working-fluid content is conveyed.

Typical, known apparatus of this general type includes:

(a) The Heat Pump and the Refrigeration Machine.

These both operate on the same principle: By means of driving heat energy at a high temperature, delivered heat energy at a low temperature is raised to a medium temperature level. (The terms "high", "medium" and "low", both here and in the ensuing discussion, should be considered as relative terms unless specifically defined otherwise.)

(b) The Heat Transformer.

A heat transformer is an apparatus which, from delivered heat energy at a medium temperature, produces output heat energy at a high temperature, thus also producing waste heat at a low temperature.

(c) The Compressor Heat Pump and the Compressor Refrigeration Machine.

Both operate according to the same principle: By means of mechanical driving energy, delivered heat energy at a low temperature is raised to a higher temperature level.

(d) A Compressor Heat Pump or Refrigeration Machine Having an Absorbent Cycle.

This apparatus differs from that discussed above under (c) in that the condenser is replaced by a resorber, and the evaporator is replaced by a desorber.

(e) The Conventional Thermal Power Station of the Clausius-Rankine Type.

(f) The Thermal Power Plant Having an Absorbent Cycle.

This apparatus differs from the conventional thermal power plant having a boiler, an expansion machine (turbine), condenser and a feed-water pump in that the connection between the condenser and the boiler which contains the feed-water pump is replaced by an absorbent cycle. In an apparatus of this kind, mechanical energy and waste heat at a low temperature are generated from delivered heat energy at a high temperature.

The apparatus discussed above under (a) and (b) can be described generally as "absorber machines", because they include only absorption cycles (see below for a definition of this term). The term "absorption machines" is intended to encompass so-called resorption machines as well.

The apparatus discussed under (c) through (f) comprises working-fluid cycles which contain a "pressure machine" through which a gaseous working fluid flows.

The term "pressure machine" is intended to encompass both compressors (that is, devices in which the pressure of the working fluid is increased by means of work) and expansion machines, such as gas or vapor turbines (that is, devices in which the pressure of the working fluid is reduced in order to generate work). A jet pump may be considered a combination of an expansion machine and a compressor.

An *absorption cycle* is a working-fluid cycle which includes at least one absorption cycle but does not include a pressure machine. The most important components of an absorption cycle are expulsion devices commonly also designated as "generators") condensers, evaporators and absorbers, the functions of which can be presumed to be known. These components will be designated generally as "exchange units", herein.

An *exchange unit* is thus a component of a working-fluid cycle in which the heat content of the working fluid, and perhaps of the absorbent as well, which the apparatus contains is changed, at least in particular types of operation of the apparatus. The phase status of the working fluid is generally changed by means of desorption (in the expulsion device), condensation (in the condenser), vaporization (in the evaporator), and absorption (in the absorber). The functions of some exchange units in the apparatus now under discussion may differ, given different types of operation of a particular apparatus.

The terms "expulsion device" and "absorber" are also intended to apply to exchange units which perform desorption and resorption functions in a resorption machine.

Figure 7:
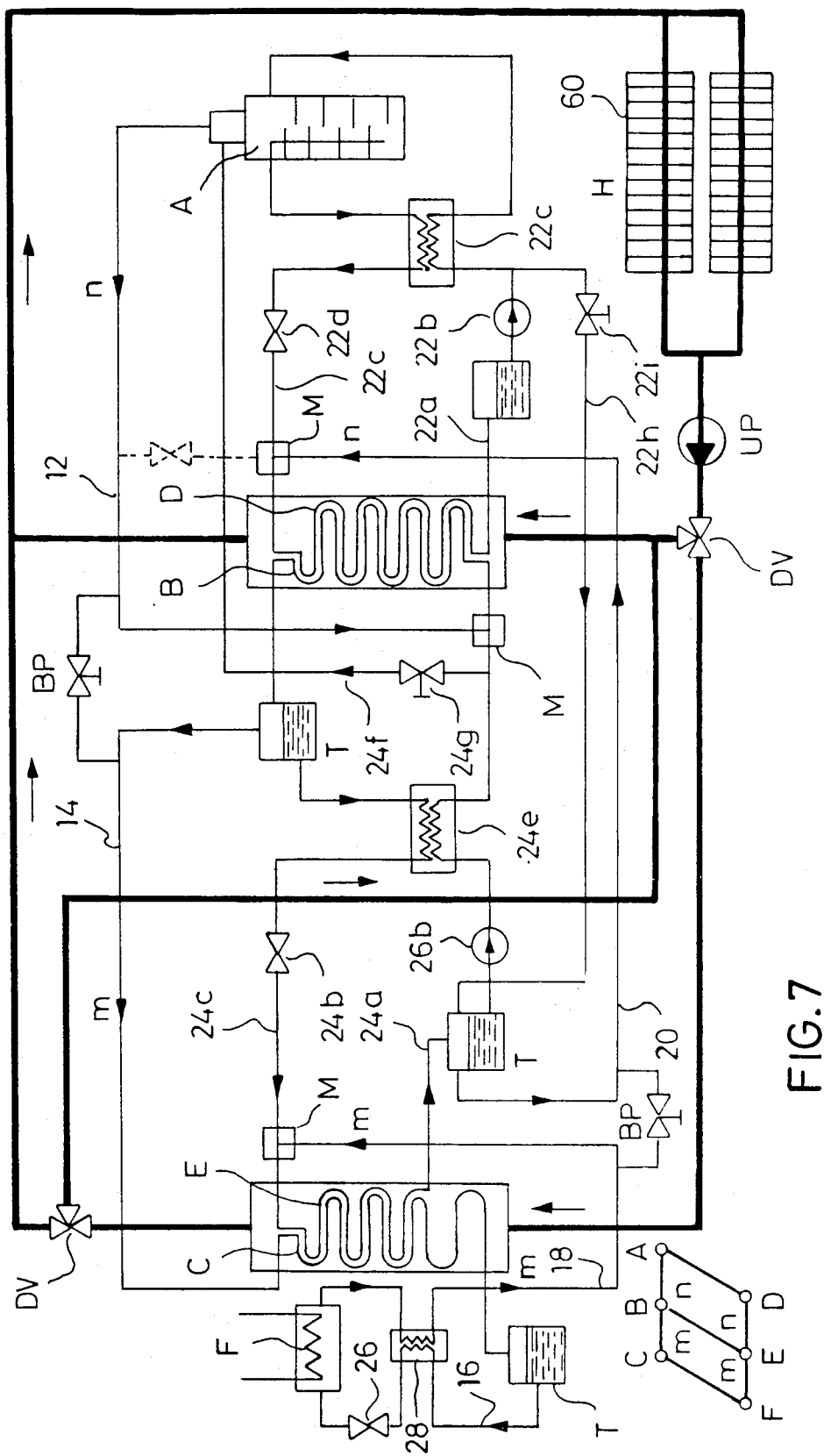

The machine of FIG. 7 may be modified by connecting a valve between lines 12 and 20 as shown in phantom lines in FIG. 7.

The above-discussed exchange units and pressure machines will be considered "primary components" in the following discussion, while pumps, heat exchangers, deviation ducts (by-passes), solution coolers, rectification apparatus, throttles, valves, collection vessels and so forth will be considered "secondary components". However, this definition is not intended to imply either a technical or a commercial evaluation of the various components.

STATE OF THE ART

Single-stage compressor and absorber refrigeration machines and heat pumps, that is, those including only a single working-fluid cycle, are widespread and have attained a high state of development (see, for instance, ASHRAE Handbook of Fundamentals, pp. 19-24).

Multi-stage absorption refrigeration machines are known, from W. Niebergall, Sorptions-Kältemaschinen, HANDBUCH DER KÄLTETECHNIK, for example ["Absorption Refrigeration Machines", *Handbook of Refrigeration Technology*], vol. 7, edited by R. Plank and published by the Springer-Verlag (Berlin-New York-Heidelberg), 1959, especially pp. 71-91.

Further multi-stage absorption refrigeration machines are known from the following sources:

DE-A No. 278 076 (Altenkirch et al.);

Altenkirch, E., Zeitschrift für die gesamte Kälteindustrie [*Journal for the Entire Refrigeration Industry*] 21 (1914), pp. 6-14 and 21-24;

Richter, K. H., *Journal of Refrigeration* 5 (1962), pp. 105–111;
Nesselmann, K., Zeitschrift fürdie gesamte Kälteindustrie 41 (1934), pp. 73–79; Chinappa, J. C. V. et al., *Solar Energy* 18 (1976), pp. 337–342;
DE-A No. 29 44 960 (Sanyo);
DE-A No. 30 14 320 (Rojey);
DE-B No 15 01 141 (Space Conditioning);
DE-B No. 21 36 408 (Carrier Co.); and
US-C No. 3,848,430 (Trane).

From the above publications of Altenkirch, it is also known to use the so-called "overlapping temperature" method. In this method, the degassing of the absorbent in the expulsion device is performed to such an extent that the highest absorber temperatures extend substantially beyond the lowest temperatures of the expulsion device, and a heat exchange is performed between the coldest parts of the expulsion device and the warmest parts of the absorber.

Multi-stage heat transformer circuits are known from DE-C No. 50 81 21 (Altenkirch).

Refrigeration machines and heat pumps which include a combination of absorber and compressor circuits are known from the following sources:
Niebergall, W., HANDBUCH DER KÄLTETECHNIK (loc. cit.), pp. 93–97;
Niebergall, W., Gesundheits-Ingenieur [*The Health Engineer*]76 (1955), pp. 129–135;
DE-A No. 22 16 204 (Arkla);
DE-C No. 8 42 797 (Pöhlmann);
DE-C No. 9 53 378 (Altenkirch et al.);
EP-A No. 00 03 293 (Jansen et al.);
JP-C No. 54-101534 (Hozumi); and
US-C No. 4,031,712 (Costello).

Combinations of absorber cycles having expansion machines are known from the following sources:
DE-A No. 28 01 835 (Singelmann);
DE-C No. 2 78 076 (Altenkirch et al.);
FR-A No. 24 55 253 (Armines et al.); and
US-C No. 4,009,575 (Hartmann).

The known multi-stage absorber machines are complicated, expensive and difficult to understand in terms of the processes taking place in them, so that the use of such multistage machines for other applications, and in particular for operating heat pumps for household heating systems, has heretofore not been explored seriously. In particular, it has thus far not been possible to determine whether the same results could be obtained, perhaps at less expense, or a certain task could be performed in an advantageous manner using other systems, and if so then what these systems might be.

The same is true for apparatus using sorption processes and including pressure machines.

The object of the present invention is to disclose novel and advantageous multi-stage apparatuses for harnessing heat energy, which use sorption processes and include at least one working-fluid cycle. These new types of apparatus are defined by the patent claims.

The invention exploits the new discovery that the constructions (fundamental systems) suitable for attaining a specific object can be ascertained by means of applying certain rules.

The new apparatus according to the invention makes it possible to attain specific objects with optimal efficiency and/or at the least possible cost for apparatus. It is furthermore possible to attain results with the apparatus according to the invention which could not previously be realized with the prior art.

For instance, heat pumps are created in which not only the supply temperature and performance can be adapted in accordance with a variable outdoor temperature, but also the coefficient of performance adjusts itself, within a wide range, to the best value for given temperatures. A particular advantage of heat pumps or refrigeration machines having compressors and absorption cycles is that the compressor is capable of operating at substantially higher or lower pressures and/or pressure ratios than is the case with conventional machines using the same working fluid in the same temperature range. Heat/power processes are also disclosed, in which the expansion machine operates at substantially higher or lower pressures and/or pressure ratios than is the case with conventional Clausius-Rankine processes. For instance, using water as the working fluid, heat-conversion processes can be performed below 100° C., although the compression or expansion machine operates at pressures which correspond to temperatures far higher than 100° C. Conversely, the usable range for refrigerants which under previously known processes were threatened with thermal decomposition can be expanded to include higher temperatures.

The apparatuses according to the invention preferably operate continuously; that is, the working fluid circulates continuously during steady operation and is not stored in reservoirs from time to time as is the case with an apparatus which operates discontinuously.

In a method according to the invention for operating a continuously-operating apparatus which includes at least one absorption cycle and at least one pressure-machine cycle coupled with it, and in which a working fluid circulates in at least one closed working-fluid cycle, the invention is characterized in that gaseous working fluid which is leaving the pressure machine is condensed (absorbed), and that the heat thus created is utilized for generating gaseous working fluid entering the pressure machine.

Further, a method for operating an apparatus which operations on the principle of a compression heat pump, in which a working fluid is compressed and thereby overheated (superheated), is characterized according to the invention in that the excess heat (specific heat due to overheating) is delivered to an absorption cycle, without the compressed working fluid being absorbed entirely.

Conversely, in a method for operating an expansion machine in which a gaseous working fluid is generated, overheated and then expanded in an expansion machine, thereby performing work, the invention is characterized in that the overheating is effected in an exchange unit of an absorption cycle by means of the absorption of a small portion of the working fluid quantity and/or by means of the specific heat of the absorbent.

A method for operating an apparatus which includes a plurality of exchange units, which are connected by both working-fluid and absorbent lines and with them are located in at least two working-fluid cycles in which the throughput of working fluid can be varied separately, is characterized according to the invention in that at least one of the operating parameters of pressure, temperature and working-fluid throughput of an exchange unit belonging to both cycles is used as a regulation variable. The turnover of working fluid in this exchange unit is preferably substantially smaller, for instance less than 25% or less than 10% of the working-fluid turnover in the other exchange units in the apparatus.

In the following description, forms of embodiment of the invention and the general rules for designing apparatus according to the invention will be explained in greater detail, referring to the drawings.

Figure 2:
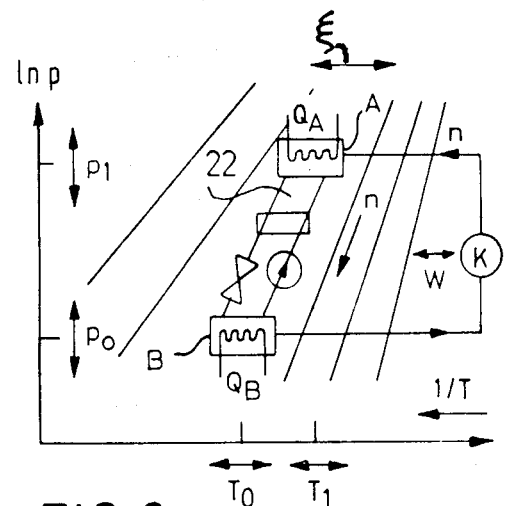
Figure 5A:
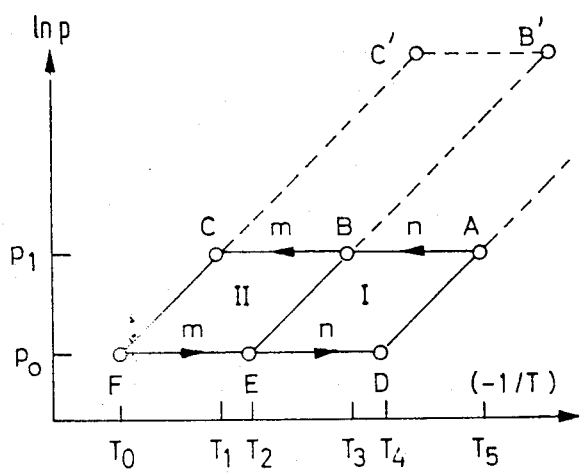
Figure 5B:
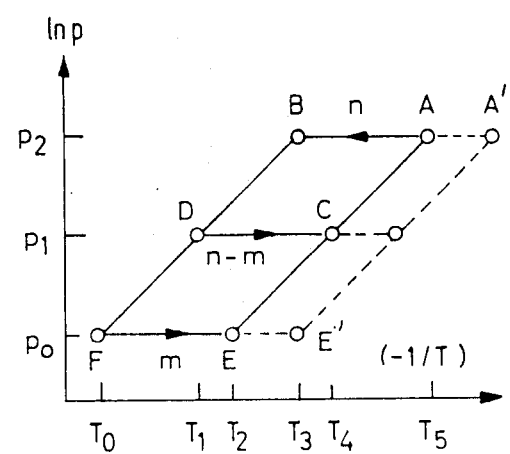
Figure 5C:
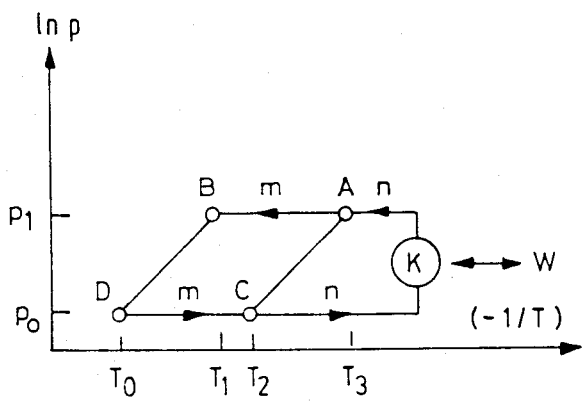
Figure 5D:
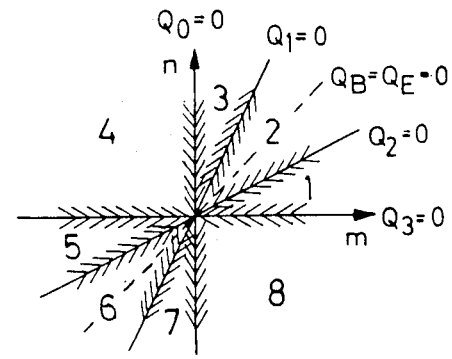
Figure 6:
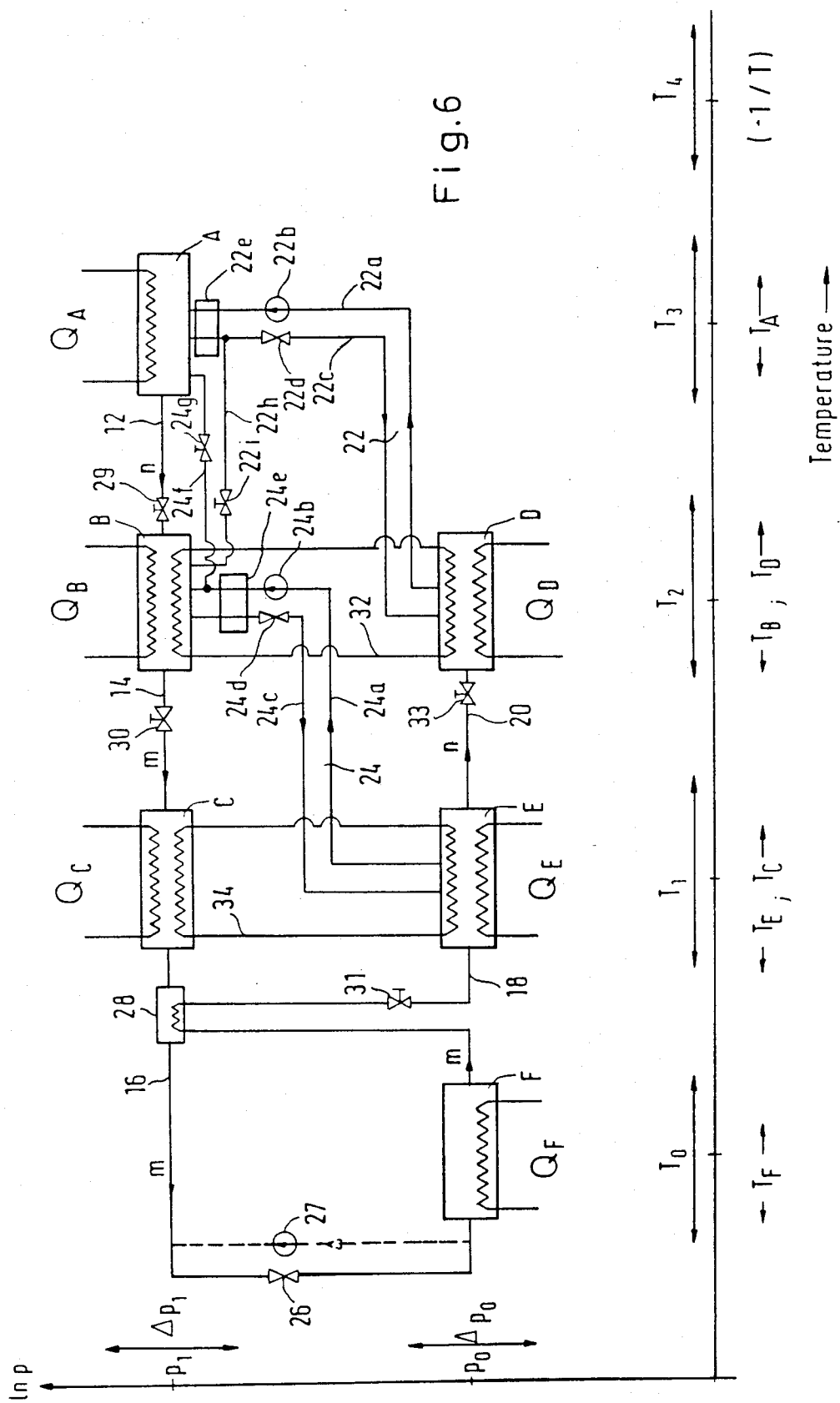
Figure 8:
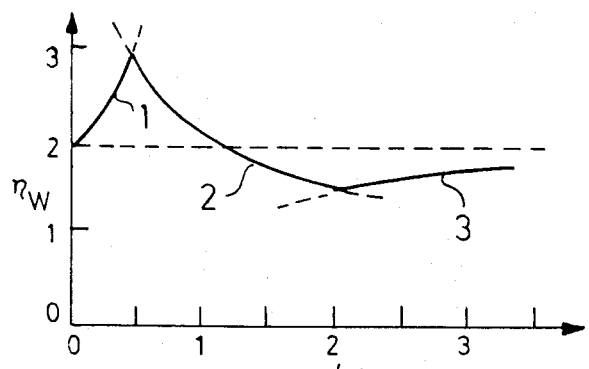
Figure 9:
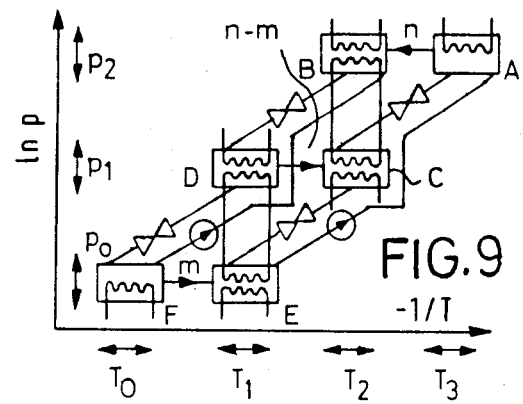
Figure 11:
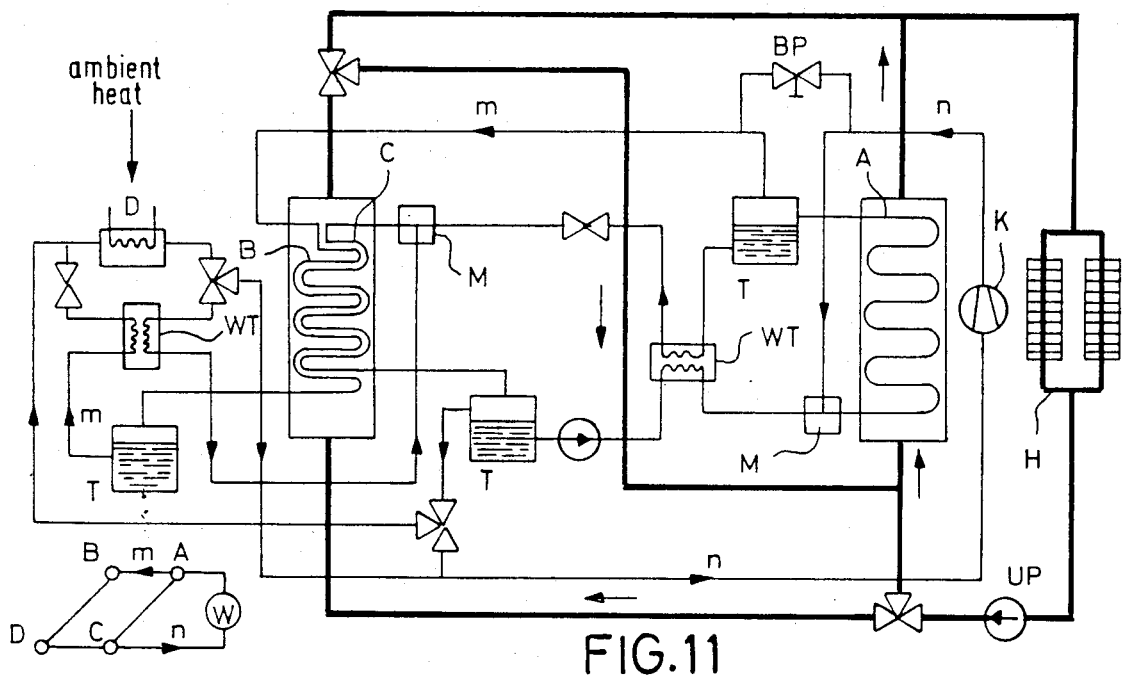
Figure 10A:
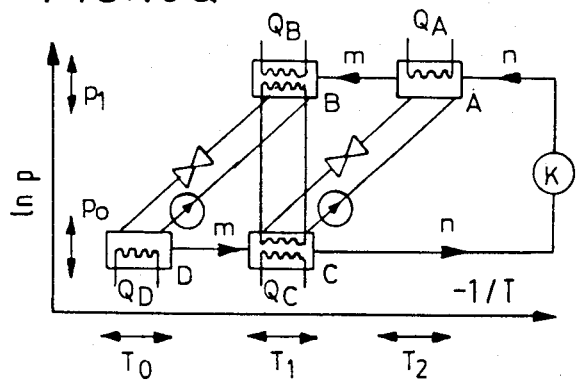
Figure 10B:
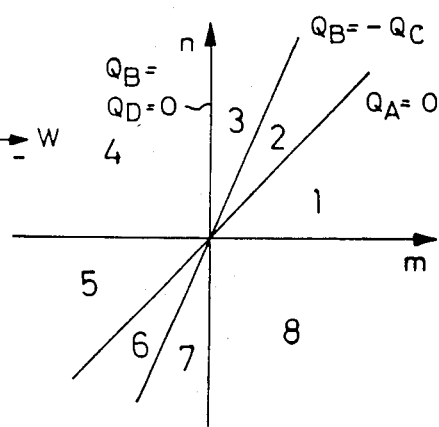
Figure 14:
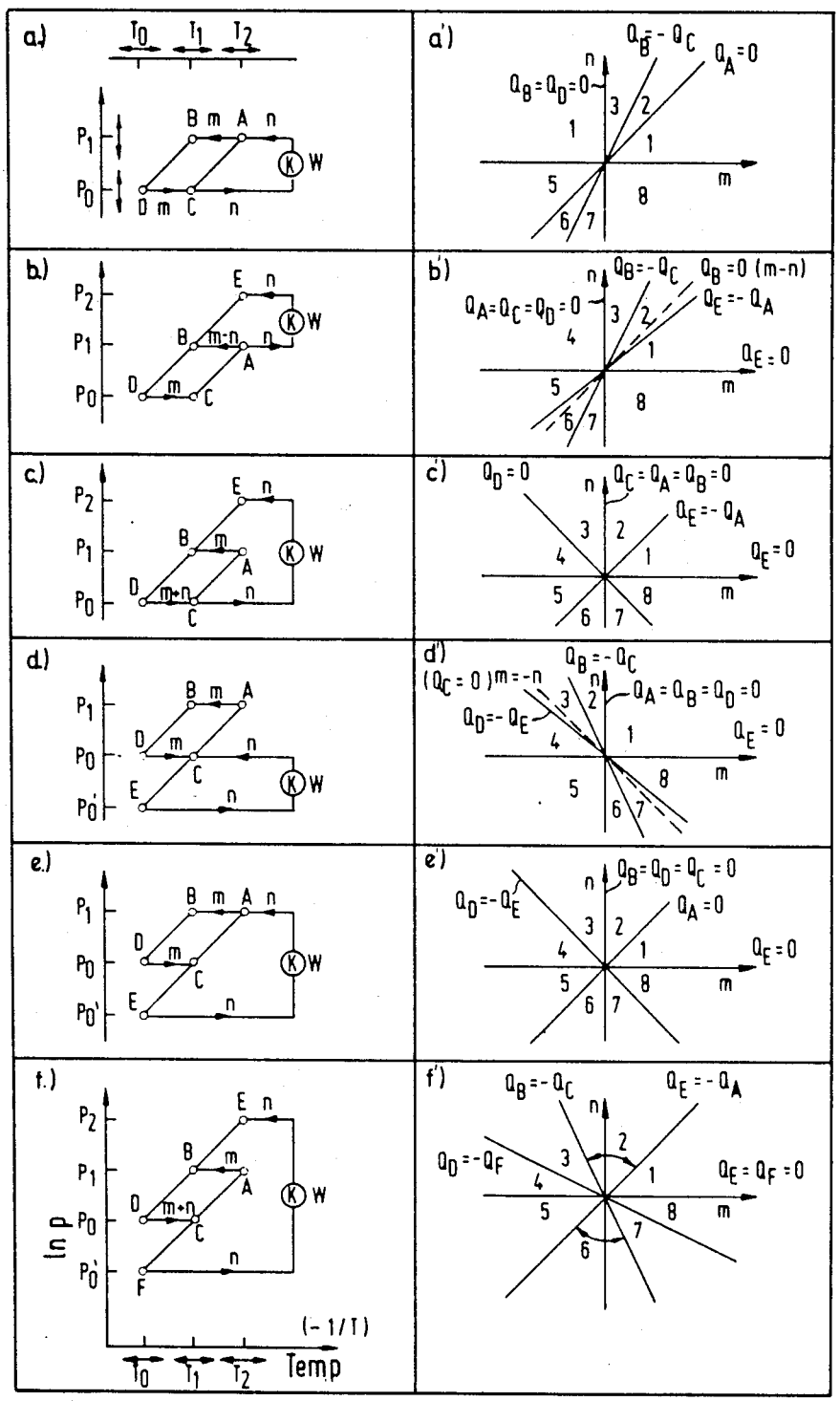
Figure 23A:
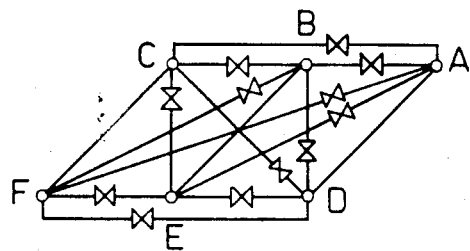
Figure 23B:
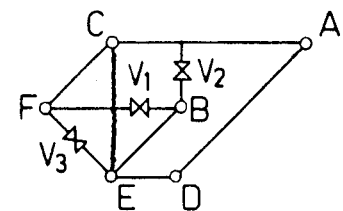
Figure 23C:
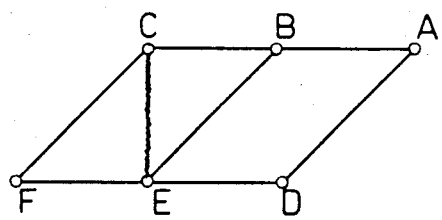
Figure 23D:
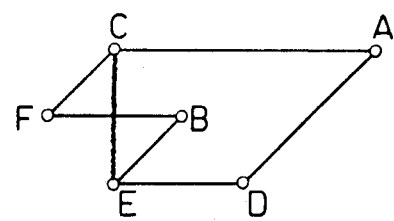
Figure 18:
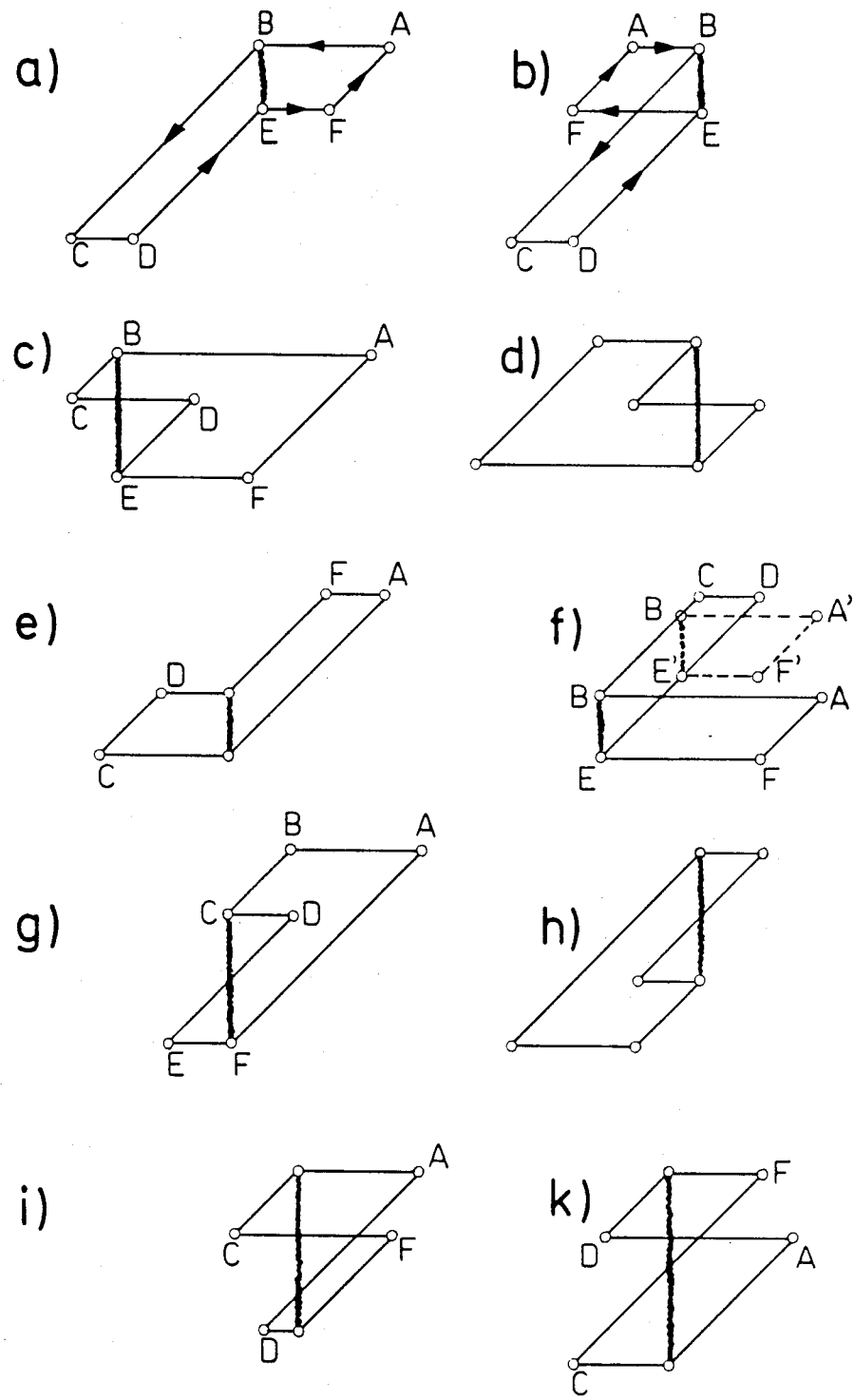
Figure 19A:
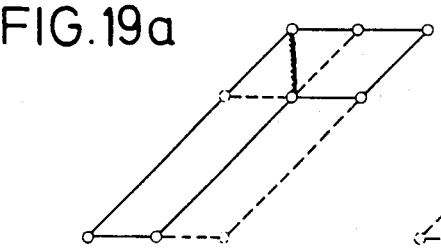
Figure 19B:
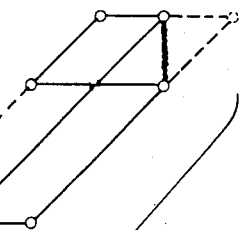
Figure 19C:
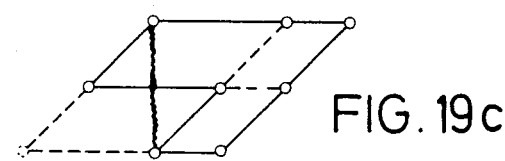
Figure 21A:
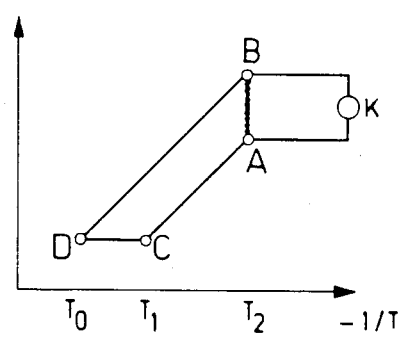
Figure 21B:
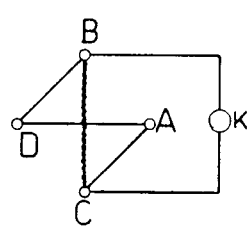
Figure 21C:
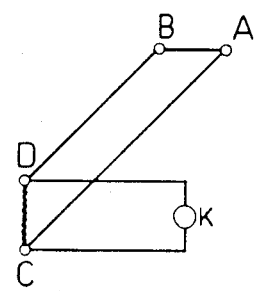
Figure 22:
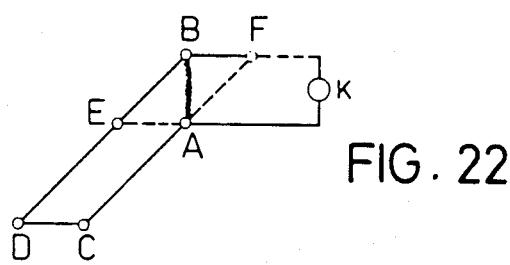
Figure 26:
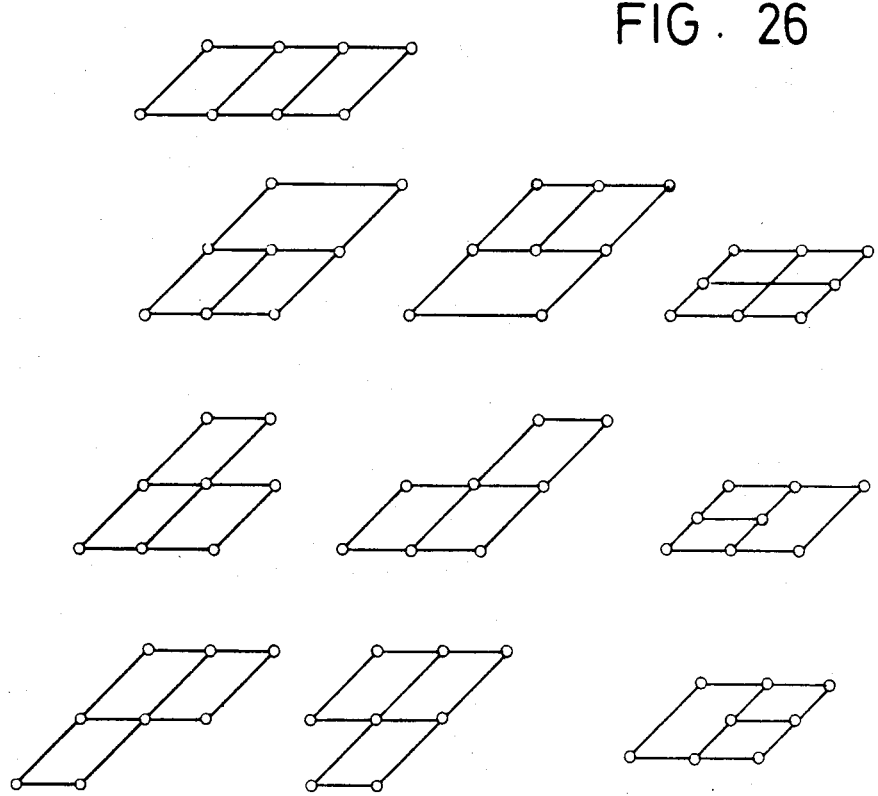
Figure 27:
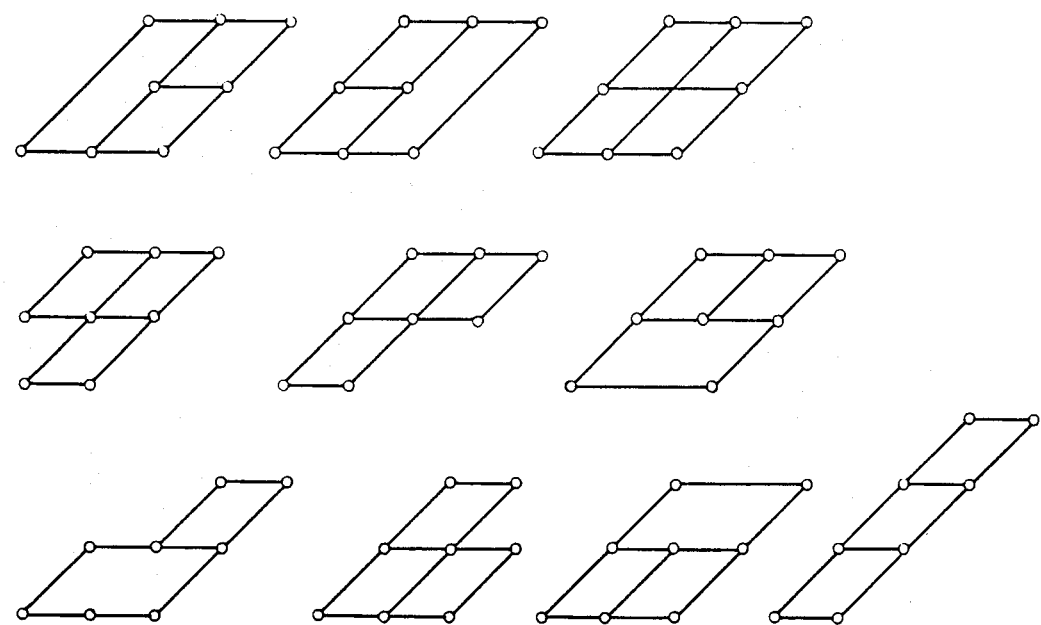
Figure 33:
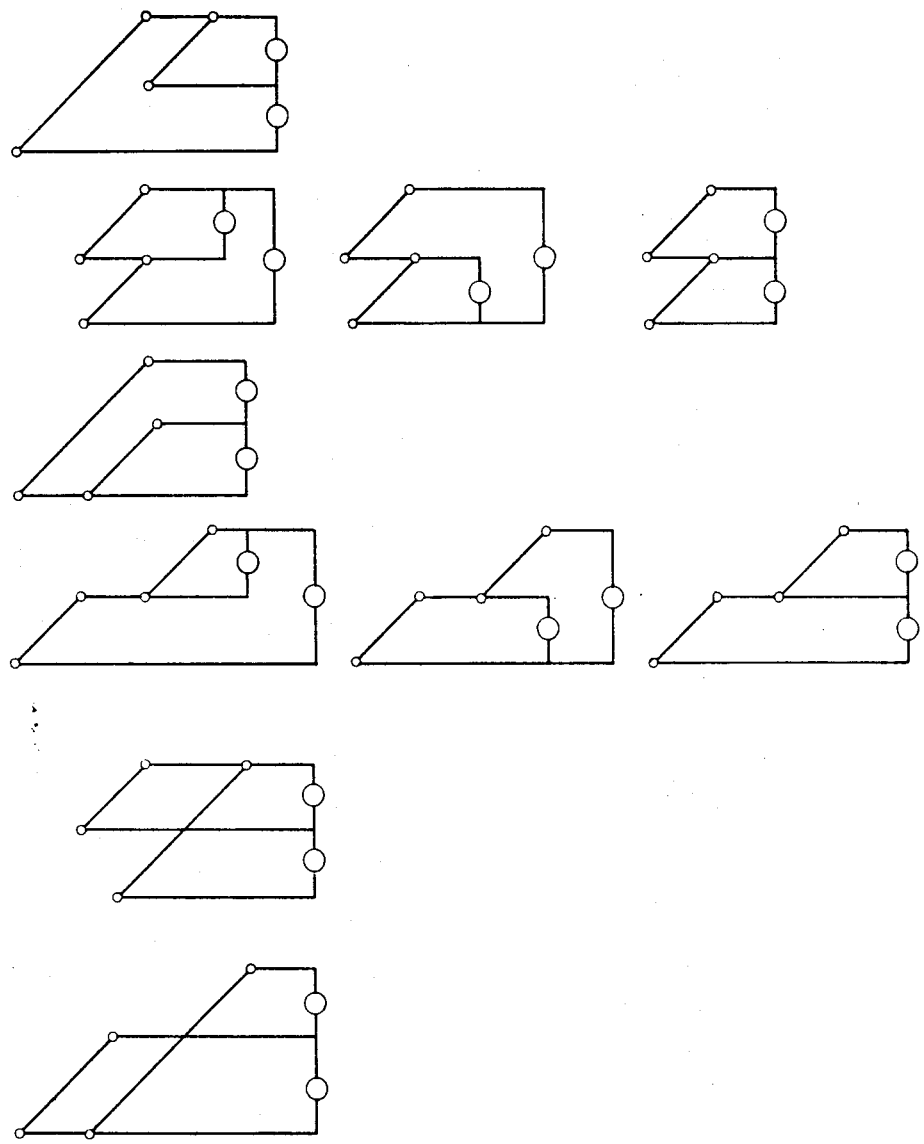
Figure 46A:
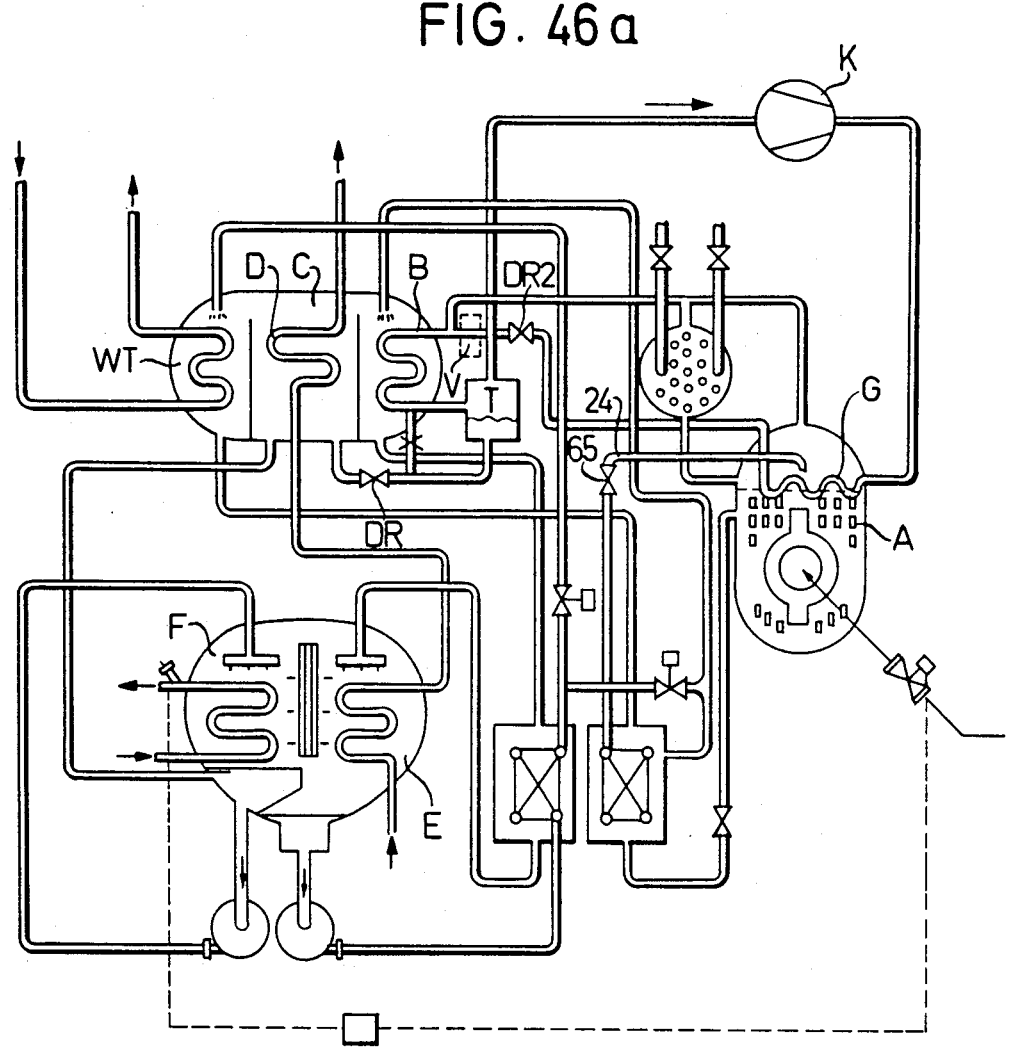
Figure 46B:
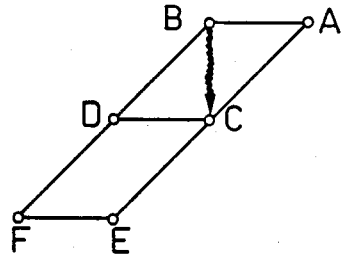

Shown are:

FIG. 1, a schematic representation of an elementary absorption cycle;

FIG. 2, a schematic representation of an elementary pressure-machine cycle;

FIG. 3, a highly schematic representation in the manner of a circuit diagram for the classes of two-stage absorption systems which are obtained if two elementary absorption cycles of the type shown in FIG. 1 are combined in such a manner that the two absorption cycles have one exchange unit in common;

FIG. 4, a representation like that of FIG. 3 for classes of two-stage systems which are obtained if an elementary absorption cycle of FIG. 1 and an elementary pressure-machine cycle of FIG. 2 are combined in such a manner that the two cycles have one exchange unit in common;

FIGS. 5a and 5b, schematic representations of two-stage absorption systems which are obtained if two elementary absorption cycles according to FIG. 1 are combined in such a manner that the two cycles have two exchange units in common;

FIG. 5c, a schematic representation of a two-stage system which is obtained if an elementary absorption cycle according to FIG. 1 is combined with an elementary pressure-machine cycle according to FIG. 2 in such a manner that the two cycles have two exchange units in common;

FIG. 5d, a representation of operating ranges of apparatuses having systems according to FIGS. 5a and 5b;

FIG. 6, a somewhat more precise representation of an apparatus having the system according to FIG. 5a (here as well as in corresponding figures, tubular connections are represented simply by straight lines);

FIG. 7, a still more detailed illustration of a preferred apparatus having a system according to FIG. 5a;

FIG. 8, a graphic representation of the coefficient of performance in accordance with the ratio of two working-fluid flows for apparatuses having a system according to FIG. 5a;

FIG. 9, a somewhat more precise representation of an apparatus having a system according to FIG. 5b;

FIG. 10a, a somewhat more precise representation of an apparatus having the system shown in FIG. 5c;

FIG. 10b, a graphic representation of types of operation for which the apparatus according to FIG. 10a can be constructed;

FIG. 11, a more precise schematic representation of a preferred form of embodiment of an apparatus having the system shown in FIG. 10a;

FIG. 12a, tables which explain the possibilities of internal heat exchange in systems as shown in FIG. 3;

FIG. 12b, a list of possibilities, in the form of a table, of internal heat exchange in systems as shown in FIG. 4;

FIG. 13, schematic representations of absorption machines as shown in FIG. 3, having an additional exchange unit, indicated by the solid circle, for equalizing the heat balance with twofold, complete internal heat exchange;

FIGS. 14a-f, advantageous absorption/pressure machine systems;

FIGS. 14a'-f', respectively associated diagrams explaining the types of operation for which the machines shown in FIGS. 14a-f can be constructed;

FIGS. 15a and a' through k and k', advantageous absorption/pressure machine systems, the letter lacking a prime relating to the system having the pressure machine K and the letter with a prime relating to the system having the pressure machine K', and the associated diagrams for various types of operation being shown next to the systems;

FIGS. 16a, a' and b, b', further advantageous absorption/pressure machine systems;

FIGS. 17a-f, examples of two-stage absorption systems having a single working-fluid cycle;

FIGS. 18a-18k, examples of advantageous absorption systems having internal heat exchange;

FIGS. 19a-c, circuits corresponding respectively to FIGS. 18a, 18b, and 18c having an additional exchange unit;

FIGS. 20a-f, specialized, two-stage absorption/pressure machine systems having a single working-fluid cycle;

FIGS. 21a-c, preferred forms of embodiment of the systems shown in FIG. 20, having an additional internal heat exchange;

FIG. 22, the system of FIG. 21a having an additional exchange unit;

FIG. 23a, a two-stage absorption machine system, in which various variant systems can be realized by opening and closing certain valves;

FIG. 23b, an absorption machine circuit having internal heat exchange, with which system the systems of FIGS. 23c or 23d can be realized by opening and closing certain valves;

FIGS. 24a-24d, illustrations corresponding to FIGS. 23a-23d but for an absorption/pressure machine system;

FIGS. 25, 26 and 27, an illustration of classes of three-stage absorption machines having eight exchange unit the machines of FIG. 25 part 1 to part 6 each comprising an absorber circuit of the type shown in FIG. 17a to FIG. 17f, respectively;

FIG. 28, illustrations of classes of three-stage systems comprising six exchange units and a pressure machine;

FIGS. 29, 30 and 31, representations of further absorption/pressure machine systems;

FIG. 32, a representation of a known, two-stage pressure machine system;

FIG. 33, schematic representations of three-stage absorption/pressure machine systems having two pressure machines and four exchange units;

FIG. 34, schematic representations of further three-stage absorption/pressure machine systems;

FIG. 34a, a somewhat more precise illustration of one form of embodiment of an absorption/pressure machine system according to FIG. 34;

FIG. 35, schematic representations of two known apparatuses;

FIG. 36, possibilities for connecting three exchange units operating at the same pressure level by means of working-fluid lines;

FIG. 37, the combinations of working-fluid line connections which can be attained in a two-stage absorption system as shown in FIG. 5a;

FIG. 37a, a known apparatus having a system as shown in FIGS. 37/34;

FIG. 38, an illustration of the working-fluid lines a-f, with which it is possible to connect four exchange units h-1 operating in the same pressure range;

FIG. 39, possibilities for connecting three exchange units operating in different pressure ranges with one another by means of working-fluid lines;

FIG. 40, possibilities for connecting three exchange units operating in different pressure ranges with one another by means of absorbent cycles;

FIGS. 41a–h, various possibilities for modifying absorbent cycles, which are associated with different concentrations of a working-medium system;

FIGS. 42a–h, systems of specialized, advantageous forms of embodiment of multi-stage apparatus;

FIGS. 43a–d, circuit diagrams for further preferred multi-stage apparatus;

FIGS. 44a–h, circuit diagrams for apparatuses which are not the subject of the present invention;

FIG. 45a, a simplified illustration of an absorber-compressor machine in accordance with a further preferred form of embodiment of the invention;

FIGS. 45b, c and d, schematic illustrations which will be referred to during the explanation of FIG. 45a;

FIG. 46a, a simplified illustration of an absorber-compressor machine in accordance with a further preferred form of embodiment of the invention; and FIGS. 46b and c, schematic illustrations which will be referred to during the explanation of FIG. 46a.

In schematically illustrating the processes and systems, a form has been chosen which not only shows the number of and the connections between the primary components, but in which the relative position of the components in an ln p/−1/T diagram (that is, a diagram showing the relative operating pressure and the relative operating temperature of the components of the apparatus, with the exception of pressure machines) can be seen. The symbolic nature of this illustration, which represents a mixture of an apparatus layout and a process diagram in the form of the ln p/−1/T diagram, makes possible the simple and rapid application of the construction principles contained in the following rules, especially of the superposition principle (to be explained later).

For the sake of simplicity, the term "heat" will be used to represent a heat output (the unit of measurement being watts or kcal/h).

A further simplification is also made, for the sake of simple classification of the types of apparatus herein and of their operating states. That is, the quantity of working fluid which undergoes a change in phase and the heat output of the respective exchange unit are assumed to be proportional to one another, so that the same variable (for instance, m or n) can be used both for the heat quantity Q converted per unit of time and for the quantity of working fluid converted per unit of time. In the description and illustrations of the apparatuses, the pressure drops occurring in the various lines, exchange units and the like through which working fluid flows are neither mentioned nor shown. However, it is emphasized that the validity of the most important conclusions to be drawn in the course of the ensuing discussion is unaffected by these assumed approximations.

The term "complete cycle" is defined as a connection between exchange units, or between exchange units and at least one pressure machine, which even without further primary components already enables stationary operation as an apparatus for harnessing heat energy, and in which the converted heat and (if applicable) work are determined by the indication of the amount and direction of a single working-fluid current. In the simplest case, a complete cycle comprises either one single-stage absorption machine cycle as shown in FIG. 1 or one single-stage pressure machine cycle as shown in FIG. 2. The cycles shown in FIGS. 1 and 2 should be considered as "elementary cycles". FIGS. 1 and 2 also show the vapor pressure curves of the working-medium system, where $\epsilon$ represents the concentration of the working fluid in the liquid absorbent.

The elementary absorption cycle of FIG. 1 includes four exchange units A, B, C and D. The exchange units A and B operate within a relatively high pressure range $p_1$, while the exchange units C and D operate within a relatively low pressure range $p_O$. The exchange units D, B, C and A operate in the temperature ranges $T_0$, $T_1$, $T_2$ and $T_3$, respectively, the mean temperatures of which increase in the order indicated. The exchange units A and B are connected by a working-fluid line 12; exchange units C and D are connected by a working-fluid line 20. The exchange units A and C are connected by means of an absorbent cycle 22, and exchange units B and D are connected by means of an absorbent cycle 24 (for more detail, see the description relating to FIG. 3). In all the systems which include absorption cycles as shown in FIG. 1, the pairs of coupled exchange units located farthest to the left at the top in the ln p/−1/T diagram (that is, in FIG. 1, the exchange units B and D) can also be connected not by an absorbent cycle but by a simple working-fluid line instead. This working-fluid line contains a throttle 24d or a pump 24b, depending upon the direction in which the working fluid circulates, for the liquid working fluid transported between these two exchange units.

Each pair of exchange units, for instance A, C and B, D, connected by an absorption cycle or a working-fluid line containing a pressure-varying device (throttle, pump), can be shifted as desired along the temperature axis relative to the other pairs of exchange units in that circuit. For instance, the exchange-unit pair B, D of FIG. 1 can be shifted so far to the right that the temperature ranges $T_1$ and $T_2$ coincide, and in fact even further, so that the exchange unit operates at a higher temperature than does exchange unit C. The exchange units A–D are each shown with a respective device, shown schematically, for supplying or withdrawing heat $Q_A$, $Q_B$, $Q_C$, and $Q_D$.

In one pair of exchange units which are coupled by an absorption cycle (or a corresponding working-fluid line which includes a pressure-varying device), for instance the pair A and C or B and D in FIG. 1, the following relationship exists between the mean temperatures $T_1$ and $T_2$ of the temperature ranges in which these exchange units operate and between the mean pressures $p_1$ and $p_2$ of the pressure ranges in which these units operate:

$$T_2 - T_1 = \frac{RT_2 \cdot T_1}{\Delta H} \ln \frac{p_2}{p_1},$$

where $$\Delta H = R \frac{d \ln p}{d \, 1/T}$$

represents the mean slope of the vapor pressure curve of the working fluid at a respective concentration of the absorbent and R represents the universal gas constant.

The elementary pressure machine cycle shown in FIG. 2, analogously to FIG. 1, includes two exchange units A, B, which are coupled by an absorbent cycle 22, and one pressure machine K disposed in a working-fluid cycle. Work W is withdrawn from or supplied to the pressure machine K, depending upon whether this machine is an expansion machine or a compressor.

The elementary cycles shown in FIGS. 1 and 2 stand for the various apparatuses discussed above under categories (a) through (f), depending upon the direction in which the working fluid circulates and upon the position of the pair of exchange units located farthest to the left.

The following discussion will indicate the rules for designing apparatuses of the present type. These rules make it possible to determine which systems are available for attaining specific objects. It is furthermore possible in many cases, by applying these rules, to simplify the basic given circuits and to optimize them.

Rule 1:

Every interconnection of exchange units or of exchange units and pressure machines must be reducible to complete cycles. An exchange unit or pressure machine can belong to any arbitrary number of complete cycles (the superposition principle).

Rule 2:

In each system there is a predetermined maximum number of complete cycles, in which the current of working fluid can be selected arbitrarily in terms of amount and direction; that is, the selection can be made independently of the other complete cycles. The maximum number of complete cycles in which the working-fluid current can be selected in terms of amount and direction (known as "independent cycles") can be calculated using the following formula:

One plus the number of connections between exchange units at different presure levels, minus the number of interconnected pressure levels (the nodal equation).

Rule 3:

(a) By means of a specialized selection of the ratios of the amounts of working-fluid currents and their directions, a partial or even a complete internal heat exchange between two or more exchange units can be made possible (the exchange units must belong to different complete cycles from which the system according to Rule 1 can be put together).

(b) One exchange unit or pressure machine can be eliminated from a conceptualized system whenever the working-fluid currents of the complete cycles to which these components belong are selected in such a manner that the various functions of these components in the respective cycles cancel one another out, so that no heat or work has to be supplied to or drawn from these particular units.

Some additional comments must be made concerning the above rules:

Complete cycles may be designed such that the connection between two exchange units passes through one or more exchange units without these latter exchange units being counted in the total number. In technical terms, that is, in order to attain particular effects such as heating, cooling or rectification of a fluid current, it may be desirable to direct this current through an exchange unit which belongs to a different complete cycle. On the other hand, if it is desired to prevent the pressure drop which would then occur, then the flow of working fluid can be carried past the exchange unit or units located between the functionally connected exchange units by means of a bypass (deviation duct).

In determining the number of independently selectable working-fluid currents using the nodal equation of Rule 2, one working-fluid line having a throttle, pump, and compression or expansion machine counts as one connection; however, one complete solution cycle likewise counts as one connection.

According to Rule 1, a system can be expanded in its function by adding an elementary cycle, which may share up to three exchange units in common with one complete cycle of the system. Conversely, each system can be made up of elementary cycles. The application of Rule (3b) makes it possible to reduce the number of exchange units and pressure machines to the maximum number required for a given purpose. If this method is applied to designing a system, then the term "independent cycle" in Rules 1—3 can be replaced with the more specialized, yet simpler, term "elementary cycle". The maximum number of independently selectable working-fluid currents (Rule 2) is ascertained by determining the number of elementary cycles from which the system can be built up by means of the successive addition of elementary cycles. This counting method is unequivocal if, for each newly added cycle, at least one exchange unit or pressure machine coincides with a corresponding component of the already-existing system and at least one component assumes a new function.

Rule (3a) requires that the net heat be zero for a complete internal heat exchange to take place; that is, the heat Q need neither be supplied to nor extracted from the relevant exchange units in the internal heat exchange. The magnitudes of the working-fluid currents are determined by this condition $(Q_1(n,m)=Q_2(n,m))$.

Rule (3b) requires merely that an equal quantity of gaseous working fluid leave the exchange unit to be eliminated as entered it.

Based on the above rules, systems can be indicated with which an intended object can be attained. The engineering expenditure, that is, the number of required components for realizing an operating state, can be variably great from one system to another.

However, Rules 1–3 do not automatically assure that all the systems which are possible in principle can be attained, and it is therefore not generally certain whether the particular system has been found which does permit the attainment of the intended object at the least possible engineering expense.

In the following discussion, a teaching is provided, as Rule 4, which guarantees the representation and thus the testing of all the systems which are in principle possible. Rule 4 is based on the important, novel recognition that every exchange unit of a first, complete cycle can be functionally united with every exchange unit of a second, complete cycle.

In the discussion which follows, the systems are conceptualized as being composites of *elementary* absorption or working-machine cycles.

In order to formulate Rule 4, the following terms must also be defined:

The number of stages of a system is defined as the number of independent, elementary cycles making up the particular system.

A classification of the systems of the present type can be made based on the above recognition, that is, that in combining two elementary cycles in order to make a multi-stage apparatus, every exchange unit of the first circuit can be combined with every exchange unit of the second cycle, not only in terms of heat but also in terms of fluid, so that the two exchange units can be combined into a single unit. Naturally, the two combined cycles must then contain the same working fluid. The absorbent has to be the same only in the absorption cycles which communicate with the combined exchange unit. It is also possible to couple two cycles only in terms of heat; in that case, Rule (3b) is omitted.

In combining two elementary absorption cycles (each of which contains four exchange units) in order to make a two-stage apparatus, there are thus $4 \cdot 4 = 16$ possible combinations, or 16 classes of systems having a maximum of seven exchange units, or in other words a maximum of seven temperature levels and a maximum of three pressure levels.

Some of these classes are equivalent to one another; that is, the combination $A_i \times B_j$ is equivalent to $A_j \times B_i$, where A and B signify the two cycles and i and j represent the number of the common exchange units; thus only 10 substantially different classes exist.

Thus the following *definition of a clas of systems* can be provided: The systems of one class can be transformed merge into one another by varying the temperature and pressure ranges of the exchange units of the coupled cycles.

The operating parameters of temperature, pressure and concentration of the working-medium system in the various exchange units are dependent on one another in accordance with the absorption cycles and working-fluid cycles to which the particular exchange units belong; however, they are otherwise capable of assuming arbitrary values within certain limits defined by the selection of the working-fluid system. The elements of one class are characterized by these values.

Rule 4:

All classes of two-stage apparatuses or machines are obtained by combining two elementary cycles such that they have one or two exchange units in common. All classes of $(n+1)$-stage machines (where $n > 2$) are obtained by combining every n-stage machine with a further elementary absorption or working-machine cycle such that they have one or two exchange units in common, or in the instance where they are expanded by means of an absorption cycle, even three exchange units in common. Thus some systems are obtained several times, and systems having fewer than $(n+1)$ stages are also obtained.

The operating ranges and operating states of the machines of each class can be ascertained in that the operating parameters of pressure, temperature, working-medium throughput and absorbent throughput of the exchange units are varied. The precondition then is that the elementary cycles making up the particular multi-stage unit are coupled together at each common exchange unit not only in terms of heat but also in terms of the flow of working medium. Absorption cycles which have no exchange unit in common may contain various absorbents.

In the following discussion, the elementary cycles shown in FIGS. 1 and 2 and the systems comprising such cycles are shown in highly schematic fashion; exchange units are represented by small circles, pressure machines by larger circles and working-fluid lines and absorption cycles by simple dashes. All secondary components are left out.

FIG. 3 shows the sixteen classes produced when two elementary absorption cycles of FIG. 1 are coupled by means of a single common exchange unit. FIG. 3 furthermore gives examples of elements of these classes attained by means of the above-mentioned variation of the operating parameters. Cycle A is shown identically in all the illustrations (see FIG. 3, top right), and the exchange units of the two cycles are numbered in the manner shown for cycle A. $A_i \times B_j$ means that the exchange unit i of cycle A coincides with the exchange unit j of cycle B.

In FIG. 4, in analogous fashion to FIG. 3, systems are shown which comprise an absorption cycle and a pressure-machine cycle, which have one exchange unit in common.

If one elementary absorption cycle A is combined with one elementary working-machine cycle K such that the two cycles have one exchange unit in common, the result is $4 \cdot 2 = 8$ classes of various systems, each having a maximum of five exchange units or in other words a maximum of five temperature levels and three pressure levels. The designation of the exchange units of the two coupled cycles is shown at the top right in FIG. 4.

It is also possible to combine one elementary absorption cycle A with a second elementary absorption cycle B or an elementary pressure-machine cycle K such that the two cycles have two exchange units in common. The result is the classes of systems shown in FIGS. 5a, 5b and 5c.

For each system comprising two coupled, elementary cycles, there are four different types of apparatus, corresponding to various combinations of the direction in which the working fluid circulates in the two cycles. Within particular types, there are also a plurality of operating states, that is, operating types (modes of operation) of these apparatuses.

The known multi-stage apparatuses are designed only for specific types and specific types of operation within these types and do not permit one to learn what other types and types of operation there are, for the basic system corresponding to the known apparatus (FIGS. 3–5c).

In contrast to this, it is an important characteristic of preferred forms of embodiment of the invention that a given apparatus is capable of operating within a plurality of operating states, and that a continuous or discontinuous transition between these types of operation is possible, so as to be capable of adapting the operation of the apparatus advantageously to changing ambient conditions and requirements.

The apparatuses which are the subject of the present invention will first be explained for the classes shown in FIGS. 5a–5c.

FIG. 6, in somewhat more precise form, shows an apparatus having the basic system according to FIG. 5a.

The absorption machine shown in FIG. 6 contains six exchange units A, B, C, D, E and F. As seen in the drawing, the exchange units A, B, C operate at a pressure $p_1$ (or in practical terms in a certain pressure range centered on $p_1$), while the exchange units D, E and F operate at a pressure $p_0$ (in practice, within a pressure range centered on this pressure), which is less than $p_1$.

The exchange units furthermore operate within various temperature ranges $T_0$–$T_3$, as may be seen from FIG. 6. The mean temperatures of the temperature ranges $T_0$–$T_3$ increase in the order given.

The absorption machines of FIG. 6 operate with a working-fluid system which contains at least one working fluid and at least one absorbent. A typical working-fluid system has ammonia as working fluid and water as the absorbent.

The exchange units A and B are connected by a working-fluid line 12, the exchange units B and C by a working-fluid line 14, the exchange units C and F by a working-fluid line 16, the exchange units F and E by a working-fluid line 18 and the exchange units E and D by a working-fluid line 20. The exchange units A and D are furthermore coupled by an absorbent cycle 22, and the exchange units B and E are coupled by an absorbent cycle 24.

The exchange units B and D and/or C and E are preferably thermally coupled with one another, which is indicated symbolically by heat-exchanger cycles 32 and 34, respectively. This is called "internal heat exchange" (that is, heat exchange within the apparatus). The thermally interconnected exchange units generally furthermore contain an apparatus for the removal or supplying of heat.

The working-fluid line 16 includes a pressure-varying device, for instance a throttle 26 or a pump 27, depending upon the intended use for the absorption machine. This will be discussed in greater detail below.

The components of the present absorption machine have thus been described. The absorption machine may furthermore also have secondary components, such as heat exchangers 22e, 24e and 28 and further heat exchangers (not shown) for the internal heat exchange, such as is known from the prior art. The working-fluid lines 12, 14, 18 and 20 may each contain a regulating valve 29, 30, 31 and 33, respectively.

With the described arrangement comprising the six exchange units A–F and the associated other components, four different types of absorption machines can be realized, depending upon the direction in which the working fluid flows in the various cycles of the machine. For the purpose of explaining this statement, the apparatus of FIG. 6 should be viewed as a two-stage absorption machine, the high-temperature stage I of which contains the exchange units A, B, D and E as well as the absorption cycles 22 and 24, while the low-temperature stage II contains the exchange units B, C, E and F as well as the absorption cycle 24, as is shown schematically in FIG. 5a. Each stage may be designed either as a heat pump (or, as is the same in principle, as a refrigerator) or as a heat transformer. If the particular stage is designed as a heat pump, the working fluid circulates in the counterclockwise direction as shown in FIGS. 5a and 6. If the particular stage is designed as a heat transformer, then the working fluid circulates in the clockwise direction. Thus the four possible types are arrived at.

If the two independent working-fluid cycles ABED and BCFE are observed, and if the working-fluid currents circulating therein are labelled n and m, respectively, then the results for the four types are as follows:
Type 1: heat pump/heat pump, m>0, n>0
Type 2: heat transformer/heat pump, m<0, n>0
Type 3: heat transformer/heat transformer, m<0, n<0
Type 4: heat pump/heat transformer, m>0, n<0

The systems according to FIGS. 5a and 5b, in the most generalized instance, operate with six temperature ranges $T_0$–$T_5$. By varying the operating parameters, the number of temperature ranges can be reduced to five, or even to four. FIGS. 6 and 9 show systems of the class shown in FIGS. 5a and 5b which have four temperature ranges.

For the heat outputs converted in the various exchange units or in the various temperature ranges, the following values pertain to the system of FIG. 6:

| | |
|---|---|
| $Q_A = n$ | $Q_3 = n$ |
| $Q_B = -n + m$ | $Q_2 = -2n + m$ |
| $Q_C = -m$ | $Q_1 = n - 2m$ |
| $Q_D = -n$ | $Q_0 = m$ |
| $Q_E = n - m$ | |
| $Q_F = m$ | |

A more detailed analysis of the possible operating states of the apparatus of FIG. 6 shows that eight ranges can be distinguished from one another, the boundaries between the various ranges being particularly well marked. These ranges are shown in FIG. 5d.

In FIG. 5d, in which the working-fluid flows m and n are plotted, the four quadrants represent the above-discussed four types. The first and third quadrants are further subdivided into three segments, the boundaries of which are defined by the conditions $Q_0=0$, $Q_1=0$, $Q_2=0$ and $Q_3=0$. The algebraic sign (+ or −) which the heat conversions of the individual components have can be determined from the above equations. The heat exchangers, which symbolize the internal heat exchange between the exchange units B and D and between C and E are not required in all operating states. It may also be favorable to shift the components B and D or C and E, respectively, closer together in temperature.

In the following section, the special characteristics of the various operating ranges or states will be discussed:

Operating Range 1

Delivery of driving heat at A (e.g., fossil-fuel heat at 150°–180° C. for $NH_3/H_2O$) and B (e.g., solar heat or waste heat at 80°–110° C.), refrigeration output at F, waste heat and available heat at C and E, respectively. The heat released at D can be used as supplementary expeller heat in B. If B is at a higher temperature than D, the absorption heat in D is emitted as available heat. In the first case, the efficiency for refrigeration is $$\eta_K = \frac{Q_0}{Q_2 + Q_3} = \frac{m}{m - n}$$

and for heat generation is $$\eta_W = \frac{|Q_1|}{Q_2 + Q_3} = \frac{2m - n}{m - n}.$$

Operating Range 2

Driving heat at A, refrigeration output at F, available heat at C and/or E and/or D and/or B. The efficiency for refrigeration amounts to $$\eta_K = \frac{Q_0}{Q_3} = \frac{m}{n},$$

and the efficiency for heat generation is $$\eta_W = \frac{|Q_1 + Q_2|}{Q_3} = \frac{n + m}{n}.$$

At the outer limits of operating range 2 and in the middle, the following special operating states occur:
(a) Operating state $Q_2=0$; that is, $Q_B=-Q_D$; $n \approx m/2$.

The heat obtained by absorption in D can be used completely for expulsion in B. Half of the working fluid condensed in C or evaporated in F is generated in A and the other half in B by means of internal heat exchange with D. The available heat is obtained from C and E at the level $T_1$. If the apparatus is used as a heat pump, the coefficient of performance is $\eta_w=3$, if as a refrigeration machine $\eta_K=2$; that is, the refrigeration output is doubled in comparison with a simple machine.

(b) Operating state $Q_B=0$ and $Q_E=0$; n=m.

In B and E, there is no heat conversion. If these two exchange units E and B were to be eliminated, then the result would be an elementary cycle in which the temperature interval between the exchange pairs would be twice the temperature interval between the components of one pair. The coefficient of performance for heat generation is 2; that for refrigeration is 1. The exchange unit B, as in all operating states, can furthermore serve as a rectifier. The working fluid absorbed in D may be pre-warmed in E.

(c) Operating state $Q_1=0$; that is, $Q_C=-Q_E$; n≈2m.

The heat of condensation or absorption obtained in C can be used in its entirety for expulsion in E. The available heat (or waste heat in the case of the refrigeration machine) is now extracted from B and D at the higher temperature level $T_2$. The efficiency attained is $\eta_w=3/2$ and $\eta_K=\frac{1}{2}$, respectively. In comparison with a simple machine, the refrigeration output $Q_F$ is produced at a temperature level which is approximately twice as low in comparison with the waste heat.

One possible technical realization which permits a continuous transition among all three operating states a–c is illustrated in FIG. 7, where the same reference symbols are used for components corresponding to those of FIG. 6. The internal heat exchange, with a simultaneous exchange of working fluid, is performed here in double tubes (either welded to one another or concentric), which for removing heat protrude into a third tube through which a heat carrier, such as $H_2O$, flows. Depending upon the heat removal from the two triple heat exchangers BD and CE, a continuous transition takes place among all three operating states; the efficiency for available-heat generation (heating) varies between 3 and 1.5.

In addition to the components shown in FIG. 6, the absorption machine of FIG. 7 also includes apparatuses M for mixing gaseous and liquid flows, apparatuses T which serve as a fluid reservoir and for separating the gaseous and liquid flow, and bypass lines BP. Heavy solid lines also indicate a hot-water cycle of a hot-water heating system, which contains a circulating pump UP, three-way valves DV and heating bodies H.

In comparison with a one-stage absorption heat pump where $\eta=2$, the high coefficient of performance $\eta=3$, which can be attained with an increasing outdoor temperature, is not the only advantage; a further advantage is the extension of the heat pump operation to lower outdoor temperatures with a coefficient of performance which is always substantially higher than that for direct heating. If used as a refrigeration machine, the apparatus shown in FIG. 6 or FIG. 7 can adapt to greatly varying waste-heat temperatures and still operate at the optimal coefficient of performance (COP) for a given temperature.

Operating Range 3

Driving heat at A, refrigeration output at F and E, waste heat and available heat at B and D, respectively.

The heat occurring at C can either be used additionally for expulsion in E or be carried away as waste heat (available heat) by shifting C to higher temperatures by increasing the pressure $p_1$. In the first instance, the coefficients of performance are:

$$\eta_K = \frac{Q_1 + Q_0}{Q_3} = \frac{n-m}{n}; \eta_w = \frac{|Q_2|}{Q_3} = \frac{2n-m}{n}.$$

In FIG. 8, the efficiency of a heat pump for the ranges 1, 2 and 3 of FIG. 6 is plotted as a function of n/m.

Operating Range 4

This operating state describes a heat pump transformer, type 2. This type, in which the low-temperature cycle BCFE functions as a heat transformer and the high-temperature cycle ABED functions as a heat pump, can function as either (a), a purely single-stage heat pump (m=0) or (b), a purely single-stage heat transformer (n=0); or (c), it can perform both functions in common (m≠0, n≠0). The heat delivered at E serves both as driving heat for the heat transformer and as the heat source for the heat pump, which is supplied with driving heat at A.

An apparatus of this kind is particularly well suited to harnessing waste heat, since at a low outdoor temperature and a low demand for available heat (at night, for instance), the unit can operate as a heat transformer. In order to increase output, or to increase the available-heat temperature, the heat-pump portion can be connected to it practically without gradations.

Operating Ranges 5, 6 and 7

Both elementary cycles function as heat transformers. A particularly interesting feature is, again, operating range 6, for which the coefficient of performance can be varied continuously between $\frac{1}{2}$ (n=m/2), $\frac{1}{2}$ (n=m) and $\frac{2}{3}$ (n=2m); naturally, various average increases in temperature occur.

Operating Range 8

The low-temperature part operates here as a heat pump (=refrigeration machine), and the high-temperature part operates as a heat transformer. With this machine, by delivering driving heat at B and D, refrigeration output can be generated at F and at the same time available heat (process heat) at the higher temperature level $T_3$ can be generated at A. The heat arising at C and E is waste heat or, again, available heat, if $T_1$ is high enough. The heat pump and the heat transformer can operate independently of one another, so that the ratio of available refrigeration at F and available heat at A can be adjusted depending upon demand. In an apparatus designed for this operating range, the units 32 and 34 for internal heat exchange are not required.

Typical Operating Data

In principle, any working-medium systems in which the so-called field of solution (dependency of ln p on −1/T, with the working-fluid concentration as the parameter) is wide enough can be applied to the apparatuses described above and to be described below. The extent to which utilization can be made of all the operating ranges depends upon the working-medium system and on the performance and temperature requirements made upon it.

A suitable working-medium system (working fluid-/absorbent) is $NH_3/H_2O$.

Other suitable working-medium systems are:
$NH_3/H_2O$; $H_2$
$NH_3/H_2O$/butane
$H_2O$/aqueous salt solution, in particular a lithium bromide solution
$CH_3OH$/alcoholic salt solution
$H_2O$, $CH_3OH$/salt solution.

Organic working fluid, such as R22 and/or R21; organic absorbent, such as tetraethylene glycol dimethyl ether or n,n-dimethylformamide.

However, in the cycles operating at higher temperatures, it is particularly advantageous to use $NH_3$ as the working fluid in combination with an aqueous solution of some substance, such as a salt, as an absorbent, which lowers the vapor pressure of $H_2O$ to the greatest possible extent. Such working-medium systems are known in principle from DE-A No. 28 55 434. However, there is no indication there of using these working-medium systems in the high-temperature part of multi-stage absorption machines and operating the low-temperature part with the "simple" $NH_3/H_2O$ system. The working fluid and its concentration must furthermore be selected such that no precipitation can occur in the operating range (including the lowest temperatures when the apparatus is not in operation). An advantageous working-medium system is $NH_3/H_2O + LiBr$; other advantageous systems are:

$NH_3H_2O + LiBr + CaBr_2$ (mole ratio of $LiBr:CaBr_2$ circa 2:3);

$NH_3/H_2O + LiBr + ZnBr_2$ (mole ratio of $LiBr:ZnBr_2$ circa 1:1); and $NH_3/H_2O + LiBr + ZnBr_2 + CaBr_2$ (mole ratio circa 3:3:1).

These working-medium systems, in particular such as aqueous lithium bromide solution (to which, as a typical representative of this class of systems, reference will be made exclusively in the following discussion) and having in particular from 40 to 60% by weight of lithium bromide in terms of the total weight of the solution, are not only advantageous for absorption machines of the type described here; in fact, and this must be emphasized, they can also be used for other known two-stage and multi-stage absorption machines, such as those described by Niebergall (loc. cit., FIG. 32, p. 82) and in DE-A No. 30 14 320, among other sources. By using a salt solution of this kind, the solution range is widened, and at a given temperature an area in the solution range is attained which is richer in ammonia, which has a very favorable effect on the operation of the absorption machine. In particular, at a given expulsion or outgassing temperature, the expenditure for rectification is reduced. Because of the widening of the solution range and the steepening of the vapor pressure curves, operating states are also possible which cannot be realized with the pure $NH_3/H_2O$ system; in particular, lower refrigeration temperatures can be attained, for instance to below $-70°$ C. In the following section, some typical operating data are given in table form for an absorption machine, type 1, such as have been explained above with reference to FIGS. 6 and 7.

(1) High Efficiency (a) Primary use is for heating purposes, especially low-temperature heating and industrial water heating.

Working-medium system: $NH_3/H_2O$.

All temperatures are given in °C.

| | | | |
|---|---|---|---|
| $p_1=21$ bar | | $T_C=50$ | $T_B=90-100$ | $T_A=160-180$ |
| $p_0=8.5$ bar | $T_F=20$ | $T_E=55-65$ | $T_D=125-145$ | |
| $p_1=21$ bar | | $T_C=50$ | $T_B=90-100$ | $T_A=160-180$ |
| $p_0=6.2$ bar | $T_F=10$ | $T_E=43-53$ | $T_D=110-130$ | |
| $p_1=25$ bar | | $T_C=57$ | $T_B=100-110$ | $T_A=180-190$ |
| $p_0=6.2$ bar | $T_F=10$ | $T_E=43-53$ | $T_D=120-130$ | |

If the $NH_3/H_2O + LiBr$ system is used in cycle 22, similar values are attained.

(b) Refrigeration, air conditioning systems.

Also usable at high outdoor temperatures.

Working-medium system $NH_3H_2O$ (in 22, $NH_3/H_2O + LiBr$ is advantageous).

| | | | |
|---|---|---|---|
| $p_1=12$ bar | | $T_C=30$ | $T_B=80-90$ | $T_A=160-180$ |
| $p_0=3$ bar | $T_F=-10$ | $T_E=30-40$ | $T_D=110-135$ | |
| $p_1=12$ bar | | $T_C=30$ | $T_B=70-80$ | $T_A=160-180$ |
| $p_0=4.3$ bar | $T_F=0$ | $T_E=33-43$ | $T_D=120-140$ | |

For the last form of embodiment listed above, it should be noted that with the present absorption machine, with $\eta=3$, temperatures down to $-10°$ C. can be attained with waste heat temperatures up to 30° C.; that is, such temperatures can be attained virtually using air cooling.

(2) Medium Efficiency

Working-medium system: ammonia/water or ammonia/aqueous lithium bromide solution.

| | | | |
|---|---|---|---|
| $p_1=25$ bar | | $T_C=57°$ | ($\approx 90-100$) | 160-180 |
| $p_0=4.3$ bar | $T_F=0$ | ($\approx 30-40$) | $T_D=100-120$ | |

(3) Low Efficiency

In this range, particularly high temperature differences can be encompassed.

(a) Primary application: for heating systems.

| | | | |
|---|---|---|---|
| $p_1=25$ bar | | $T_C=57$ | $T_B=100-110$ | $T_A=160-180$ |
| $p_0=3$ bar | $T_F=-10$ | $T_E=22-32$ | $T_D=85-105$ | |
| $p_1=25$ bar | | $T_C=57°$ | $T_B=100-110$ | $T_A=160-180$ |
| $p_0=2$ bar | $T_F=-20$ | $T_E=12-22$ | $T_D=63-83$ | |
| $p_1=12$ bar | | $T_C=30°$ | $T_B=70-80$ | $T_A=160-180$ |
| $p_0=2$ bar | $T_F=-20°$ | $T_E=12-22$ | $T_D=90-100$ | |

(b) Primary field of application: refrigeration machines having air or water cooling at high coolant-fluid or coolant-air temperatures $T_2$.

| | | | |
|---|---|---|---|
| $p_1=4.0$ | | $T_C=-3$ | $T_B=30-50$ | $T_A=95-115°$ |
| $p_0=0.43$ | $T_F=-50°$ | $T_E=-10$ to $-23$ | $T_D=30-50$ | |

In other words, refrigeration down to $-50°$ C. can be generated with air cooling, using driving heat of only ca. 115° C. Here, again, the use of the ammonia/lithium bromide solution system in cycle 22 is particularly advantageous.

Assuming an expeller temperature $T_A$ at approximately 150° to 170° C., then even with air cooling, temperatures down to $-75°$ can be attained. This is possible only with the $NH_3/H_2O) + LiBr$ system in the high-temperature cycle.

| | | | |
|---|---|---|---|
| $p=3$ bar | | $T_C=-10$ | $T_B=40-60$ | $T_A=150-170°$ |

-continued p=0.08 bar  $T_F = -75°$ C.  $T_E = -25-(-39)$  $T_D = 40-58$

It was already mentioned above that with the ammonia/water working-medium system substantial expenditure was required for rectification of the vapor phase arising in expeller A, in order to remove $H_2O$ vapor from the expelled $NH_3$ to the greatest possible extent. It was also already mentioned that the rectification problem is reduced substantially if the new working-medium system is used, comprising ammonia and an aqueous solution, in particular aqueous lithium bromide solution.

In the present absorption machine, a further reason why the rectification problem is less serious than in the known absorption machines is that the vapor exiting from A is cooled and rectified as it passes through B, since at the lower temperature $T_B$, the water vapor arriving from A is absorbed in the absorbent (solution) supplied via the cycle 24 from E and $NH_3$ is simultaneously expelled. As a result, however, an accumulation of $H_2O$ occurs in the cycle between B and E. This is prevented by the branching line 24f shown in FIG. 6, which contains a regulating valve 24g and by which a portion of the absorbent from line 24a, which is rich in working fluid, is diverted, returned to the expeller A and used there in a known manner for preliminary rectification.

FIG. 6 also shows a further development of the described absorption machine. In order to attain an additional increase in the available-heat output, solution which is low in $NH_3$ is diverted out of the line 22c via a branching line 22h, which contains a regulating valve 22i, and carried directly into the exchange unit B, where it absorbs ammonia vapor and causes the creation of a corresponding, additional heat of absorption.

The valves 29, 30, 31 and 33 disposed in the working-fluid lines make it possible to separate the exchange units A-F from one another, which is advantageous when the machine is started up. During operation, they can also be used as regulating devices.

The valve 30 provided in the working-fluid line 14 can be used in particular for the following purpose: In the operating state where $\eta = 3/2$, a temperature difference $T_C - T_E$ between the condensor C and the expeller E may arise under some circumstances which is so great that the condensor output $Q_C$ becomes excessively large in comparison with the evaporator output $Q_F$, or that such a high pressure is built up during the expulsion into E that the evaporator output of F is reduced excessively. In order to be able to adjust the working-fluid gas flow in the low-temperature part for a maximal evaporator output, the valve 30 is disposed between B and C, so that the condensor line and thus the condensor temperature can be controlled via the pressure.

A further possible modification of the absorption machine shown in FIG. 6 is provided by bridging the working-fluid lines 18 and 20 by a bridge line bypassing the exchange unit E and selectable by means of valves, so that the working-fluid flow n does not have to flow through E. Bridge lines are also advantageous for the various exchange units for purposes of starting and regulating the machine and, as needed, for reducing pressure drops.

A further element of interest in the class of systems shown in FIG. 5a is obtained if the pressure ratio $p_1/p_0$ is selected to be so large that C and D operate in the same temperature range, as shown at C'; thus in types 2 and 4 (where the working fluids I and II circulate in opposite directions), an internal heat exchange is possible between C' and D.

A two-stage heat pump having the system as shown in FIG. 5a, which is capable of functioning only in the operating state where $Q_1 = 0$ or the operating state where $Q_2 = 0$, is not the subject of the present invention. However, apparatuses having the system shown in FIG. 5a and constructed for the operating ranges 2, 3, 4 and 8 do represent advantageous exemplary embodiments of the invention.

Example of an Apparatus Having Four Temperature Ranges and Three Pressure Ranges In FIG. 9, a system according to FIG. 5b is shown in simplified form but somewhat more precisely; like the system of FIG. 5a, it is made up of two elementary absorption cycles coupled together, but it functions with three substantial pressure levels and has four temperature levels.

In this system, as well, there are four types of absorption machines having the same eight operating ranges as were explained above referring to FIGS. 5a, 5d and 6.

For the system of FIG. 6, a broader solution range is necessary than for the system of FIG. 9. The system of FIG. 6 is thus designed more for the properties of the $NH_3/H_2O$ working-medium system, while the system of FIG. 9 is more suitable for the working-medium system $H_2O/LiBr.H_2O$.

An apparatus having the system of FIG. 9 and constructed exclusively for the operating state where $Q_2 = 0$ is not intended to be encompassed by the subject of the present invention, because such an apparatus is known from the prior art discussed at the outset above. Refrigeration machines having the system of FIG. 9 are not claimed either, where they are constructed for operation in range 1 as shown in FIG. 5d or in the portion of range 2 located below and on the dashed line (that is, where $n \leq m$).

However, apparatuses having the system of FIG. 9 and designed for operation in ranges 4 or 8 do represent advantageous forms of embodiment of the present invention.

The operating parameters of the system of FIG. 5b or FIG. 9 can furthermore be selected such that the exchange units B and E operate in the same temperature range (as shown in FIG. 5b by dashed lines), and an internal heat exchange can now be performed between these two exchange units.

Apparatus Having an Absorption Cycle and a Pressure Machine Cycle

FIG. 10a, in somewhat greater detail, and FIG. 11 provide a schematic illustration of a specialized form of embodiment of the system of FIG. 5c, which contains an absorption cycle ABDC and a pressure machine cycle KAC or KBD. The system according to FIG. 5c operates with two substantial pressure ranges and four temperature ranges. For the sake of simplicity, the following discussion will relate to forms of embodiment of this circuit operating with only three substantial temperature ranges, reference being made to the drawings in FIGS. 10a and 11. The working-fluid flows circulating in the pressure machine cycle KAC or in the absorption cycle ABDC are indicated by the symbols n and m, respectively. Four types of apparatus result, depending upon the direction of circulation of the working-fluid flows. The possible operating ranges are shown in FIG. 10b, in a manner analogous to FIG. 5d.

The individual operating ranges and the operating states of the system of FIG. 10 will now be explained, referring to FIG. 10b. The algebraic sign (+ or −) of the heat turnover $Q_0$–$Q_2$ in the temperature ranges $T_0$–$T_2$ and the algebraic sign of the work W of the pressure machine ("+" stands for work input; "−" stands for work output).

The following eight special cases exist as boundaries between the operating ranges 1–8:

n=0:
Purely absorption operation as a heat pump (m>0) or heat transformer (m<0); the pressure machine is not in operation;

m=0:
($Q_0=0$; $Q_B=0$) the apparatus operates as a compressor heat pump (n>0) or as an expansion machine (n<0) having the components A, C, K between the temperatures $T_1$ and $T_2$;

m=n:
($Q_2=Q_A=0$; $Q_C=0$) the apparatus operates as a compressor heat pump (n>0) or as an expansion machine (n<0) having the components B, D, K between the temperatures $T_0$ and $T_1$;

n≈2m:
($Q_1=0$; $Q_B=-Q_C$) by means of internal heat transmission between B and C, the apparatus operates as a compressor heat pump (n>0) or as an expansion machine (n<0) between the relatively great temperature interval $T_2$ and $T_0$ at a relatively low pressure ratio $p_1/p_0$.

The eight operating ranges have the following properties:

Operating Range 1:
The driving heat for the absorption heat pump is supplied at A; available heat is extracted in the temperature range $T_1$ and available refrigeration is generated in the temperature range $T_0$. For n<<m, the performance of the absorption heat pump predominates, while for n→m, the performance of the compressor heat pump predominates.

Operating Range 2:
The compressor operates both with the exchange units BD and with the exchange units AC. Heat extraction at $T_1$ from exchange unit B and at $T_2$ from exchange unit A. Refrigeration at $T_0$ in exchange unit D. The heat required for expulsion in the exchange unit C can be extracted by means of internal heat transmission (heat exchange) from B. The mean temperature of the available heat increases from $T_1$ (for n=m) to $T_2$ (for n≈m); the coefficient of performance naturally varies inversely with temperature. Because of this capability of adaptation of the available heat temperature (or waste heat temperature) to variable operating conditions, this system is particularly well suited as a heat pump for household heating and as an air conditioner with a variable waste heat temperature.

FIG. 11, in schematic form, shows one form of embodiment of a heat pump of this kind. The exchange units B and C are combined into one triple heat exchanger, which is located at the same time in the water circulation of a hot-water heating system, the lines of which are indicated by heavy strokes. Besides the exchange units A, B, C and D and the pressure machine K which comprises a compressor, the apparatus of FIG. 11 contains mixing vessels M for mixing gaseous working fluid and liquid absorbent; separating vessels T for separating gaseous working fluid from liquid absorbent; heat exchangers WT, for instance corresponding to the heat exchanger 22e in FIG. 6; a bridging line BP, which contains a blocking valve; heating bodies H and a hot-water circulation pump UP.

If the compressor K operates primarily with the exchange units B and D (boundary zone with operating state 1), the excess heat from overheating of the compressed working fluid can be harnessed for expulsion purposes, thus increasing efficiency. The working fluid evaporated in D can be made to bypass C, in order to avoid overheating. Conversely, the working-fluid flow expelled in C can be pre-cooled in D, so that it enters the compressor K at a reduced temperature. (Analogous considerations apply as well to all the other systems in which the compressor is capable of aspirating overheated working fluid.)

Operating Range 3:
The heat generated in B does not suffice to meet the heat requirement for expulsion in C. Available refrigeration is therefore generated at both $T_0$ in D and $T_1$ in C. Heat is emitted at $T_2$ from the exchange unit A.

Operating Range 4:
The apparatus functions as a combination of a heat transformer and a compressor heat pump. At $T_0$, heat is emitted to the surroundings; the exchange units B and C are supplied with heat $T_1$ for the operation of the heat transformer, and the exchange unit C is furthermore supplied as a heat source for the compressor heat pump portion; available heat is extracted from the exchange unit A at $T_2$.

Operating Range 5:
The apparatus functions as a heat transformer and additionally furnishes available work by means of the pressure machines K comprising an expansion machine. Waste heat is emitted at $T_0$; heat at $T_1$ is supplied to the exchange units B and D; available heat can be extracted at $T_2$ from the exchange unit A. The exchange unit A is preferably used as a superheater, in order to superheat the steam generated in the exchange unit B before it enters the expansion machine K.

Operating Range 6:
The apparatus furnishes available work from heats which are supplied at $T_1$ (in B) and $T_2$ (in A). The heat emitted at C is additionally fed into B, so that waste heat occurs only at $T_0$.

Operating Range 7:
The apparatus furnishes available work from heat at $T_2$; there is heat transmission from C to B; waste heat occurs at $T_0$; there is further heat emission at $T_1$ in C in the form of available heat or waste heat.

Operating Range 8:
The apparatus operates as an absorption machine heat pump or refrigeration machine ABCD; a portion of the working-fluid current generated in A is decompressed in K, performing work, and is directed into the absorber C. Heat is supplied at $T_2$; heat is emitted at $T_1$ (in B and C), and available refrigeration at $T_0$. This apparatus thus furnishes available refrigeration and/or available heat depending on the need and on the ratio of n to m, as well as mechanical work.

What is not claimed, because they are known, are apparatuses having the system shown in FIG. 5c which are constructed for operation in range 8 of FIG. 10b, or for operation in range 1 including the boundaries of this range, or for operation on the boundary between ranges 6 and 7.

Particularly advantageous forms of embodiment of the invention are those having the system shown in FIG. 5c which are constructed for operation in range 2, 3, 5, 6 or 7.

Two-Stage Absorption Machines as Shown in FIG. 3

Analogously to the discussion of FIGS. 5a, 5b and 5d, for the 16 classes of two-stage absorption machines shown in FIG. 3, of which only 10 are substantially different from one another, there are four types of absorption machines, depending on the four combinations of algebraic signs (++), (+−), (−+), (−−) of the working-fluid flows in the two interconnected yet independent cycles.

(+) means that the working fluid is circulating in the counterclockwise direction (the respective absorption cycle is operating as a heat pump);

(−) means that the working fluid is circulating in the clockwise direction (operation as a heat transformer).

The apparatuses having systems as shown in FIG. 3 operate with three pressure ranges and, in the most general case, with seven temperature ranges, which can be reduced to four, and even to three, temperature ranges by the suitable selection of the operating parameters in some of the systems. In general, apparatuses which are constructed for operating states in which a partial or complete internal heat exchange takes place between exchange units belonging to different elementary cycles are particularly advantageous. The number of temperature ranges at which heat is supplied to or extracted from the apparatus can then be reduced to three, in several classes. The number of pressure ranges is always three.

In apparatuses as shown in FIG. 3 which operate with four temperature ranges, the eight operating ranges shown in Table 1 are generally found. With five temperature ranges, there are 22 operating ranges in the generalized case, for which the algebraic sign of the net heat turnover $Q_0$-$Q_4$ in the five temperature ranges are listed in Table 3.

In FIG. 12a, the exchange units are listed in table form for the systems of FIG. 3 between which an internal heat exchange can be performed. $B_iA_j$ means that a heat exchange can take place between the exchange unit i of the cycle B and the exchange unit j of the cycle A. The algebraic signs in parenthesis indicate the relative direction in which the working fluid circulates in the various cycles; that is, if both the minus sign and the plus sign are in parentheses together, the direction of circulation in the two cycles must be opposite to one another, while otherwise the circulation is in the same direction.

Apparatuses having a system such as that shown in the left-hand portion of FIG. 3 in class $A_2 \times B_3$ (and in the right-hand portion in class $A_3 \times B_2$) or having a system of class $A_3 \times B_3$ (left-hand portion), in which the working fluid of both absorption cycles circulates counterclockwise and furthermore no internal heat exchange is performed, are not the subject of the present invention.

In the case of heat exchange in one temperature range, the heat exchange can be made complete by the suitable selection of the working-fluid flows m and n. In the case of a heat exchange in two temperature ranges, a complete heat exchange in both temperature ranges is generally not possible. However, a complete heat exchange in both temperature ranges can always be attained, if the particular system is augmented by an additional exchange unit such that a third, independent absorption cycle is created. To this end, there are two possibilities for each of the systems of FIG. 3, which are shown in FIG. 13. The additional exchange unit is indicated by a filled-in circle. Since in the systems of FIG. 3, the conditions for a complete internal heat exchange in both temperature ranges can virtually be met in many cases, the working-fluid and heat conversion in the additional exchange unit only needs to be relatively small. The additional exchange unit in such cases can therefore be small in dimension in comparison to the other seven exchange units. The heat conversion and/or the working-fluid conversion and/or the temperature and/or the pressure of the additional exchange unit can furthermore be used for purposes of open-loop or closed-loop control.

Two-Stage Absorption-Pressure Machine Systems as Shown in FIG. 4

In the apparatuses having a system as shown in FIG. 4, for each class there are four types of apparatus, depending on the algebraic sign of the working-fluid flows in the two working-fluid cycles. Here, again, an internal heat exchange is possible between two exchange units of the absorption cycle A and of the pressure machine cycle K, as listed in the tables of FIG. 12b in analogous fashion to FIG. 12a.

Apparatuses having a system of class $A_3 \times K_1$ of FIG. 4, in which the working fluid in the absorption cycle circulates counterclockwise, the pressure machine is a compressor and no internal heat exchange is performed are not the subject of the present invention. Nor are apparatuses having the system shown in the first sketch of class $A_2 \times K_1$ of FIG. 4, in which (a) the pressure machine is a compressor, and (b) the working fluid circulates clockwise, the compressor output is connected to the exchange unit which operates in the lowest temperature range of the highest pressure range and an internal heat exchange occurs between $K_1$ and $A_4$, the subject of the present invention. The systems shown on the right in FIG. 4 and belonging to classes $A_1 \times K_1$, $A_2 \times K_1$, $A_3 \times K_2$ and $A_4 \times K_2$ are particularly preferred. The systems of classes $A_1 \times K_1$, $A_1 \times K_2$, $A_3 \times K_2$, $A_4 \times K_1$ and $A_4 \times K_2$ shown on the left in FIG. 4 are also considered advantageous. What was said with respect to FIG. 12a about the complete heat exchange in two temperature ranges applies here as well. The additional exchange unit required for meeting the conditions for a complete heat exchange in two temperature ranges is disposed, in the systems of FIG. 4, at a location such that the exchange units comprise the absorption system shown in FIG. 5b. Here again, the additional exchange unit may be relatively small, and its operating parameters can be used for open-loop and closed-loop control purposes.

In FIGS. 14a–14f, absorption-pressure machine systems having two to four pressure ranges and three temperature ranges are shown. FIGS. 14a'–14f' provide the various operating state diagrams associated with the eight operating ranges. As an introduction to still further descriptions to follow, FIG. 14f shows a three-stage apparatus, but the discussion immediately following applies to it as well.

The system of FIG. 14a has already been explained above, referring to FIGS. 5c, 10a and 10b; it is shown again here only for systematic reasons, because the systems then shown in FIGS. 14b–14f are capable of the same operating states.

In the systems of FIGS. 14b–14f as well, analogously to the system of FIG. 14a (10a), there are eight operating ranges; however, the pressure machines operate at higher or lower pressures and with different pressure ratios (ratio of inlet pressure to outlet pressure), which may be of advantage depending upon the particular application. Only some simple operating states will be described now, which are distinguished by the disappearance of a heat conversion in certain temperature ranges and are shown in the diagrams of FIGS. 14a'–14f' as boundaries between two adjacent sectors. Technically, these operating states are attained by means of heat transmission between the exchange units operating within this temperature range or by shutting down parts of cycles. The following paragraphs under the heading (a) relate to the generation of available heat; the paragraphs under (b) relate to the use of the associated apparatuses for refrigeration and the paragraphs under (c) relate to types of apparatus which emit available work W and correspond to operating types in the lower half of the diagrams.

$Q_1 = 0$ (Boundary between the operating ranges 2 and 3 or between 6 and 7):

(a) Heat is elevated from $T_0$ (for example, the outdoor temperature) to $T_2$. In the systems of FIGS. 14a, b, d, e and f, the compressor operates in lower or higher pressure ranges and with other pressure ratios than if the pure working fluid were to be used. By internal heat exchange at $T_1$, a larger increase in temperature is attained.

(b) Available heat is generated at the relatively low temperature $T_0$, if $T_2$ stands for the outdoor temperature. Here again, there is an advantageous large increase in temperature. For the pressures at which the compressor operates, the same conditions apply as were given under (a) above.

(c) From heat supplied in the temperature range $T_2$, mechanical work is obtained. Waste heat is emitted in the temperature range $T_0$. The pressure ratio in the depressurization of the gaseous working fluid in the expansion machine, in contrast, is much smaller than $P_2/p_0$ in the apparatuses shown in FIGS. 14a, b and d, corresponding to the temperature interval $T_2-T_0$ when the pure working fluid is used; however, in the apparatus of FIG. 14f, the pressure ratio is larger. The absolute values of the inlet pressures in the systems of FIGS. 14a, d and e are smaller than $p_2$; in the system of FIG. 14b, the absolute values of the final pressures are greater, and in the systems of FIGS. 14d, e and f they are smaller, than $p_0$.

$Q_2 = 0$ (Boundary between the operating ranges 1 and 2 or between 5 and 6):

(a) Heat is raised from $T_0$ to $T_1$. In the systems of FIGS. 14b and d, the compressor does operate with the same pressure ratio as in a simple compressor heat pump BDK as shown in FIG. 14a; however, the pressure is higher (in the system of FIG. 14b) or lower (in the system of FIG. 14d) in absolute terms. In the systems of FIGS. 14c, e and f, the pressure ratio is greater than in a simple heat pump.

(b) Refrigeration at $T_0$, waste heat at $T_1$, a doubled coefficient of performance in comparison with the operating state where $Q_1 = 0$. For the compressor pressures, the same conditions as in (a) apply.

(c) Heat at the temperature $T_1$ is converted into work; waste heat is at $T_0$. In the apparatuses of FIGS. 14b–f, the expansion machine can, however, be operated in a different pressure interval or temperature interval than is the case with a conventional power plant operating with the same, pure working fluid.

$Q_0 = 0$ (Boundary between the operating ranges 3 and 4 and between 7 and 8):

(a) Heat is raised from $T_1$ to $T_2$; however, in the systems as shown in FIGS. 14a and c–f, the compressor is operated in a different pressure interval than the compressor of a conventional apparatus operating with the same, pure working fluid.

(b) Refrigeration at $T_1$, waste heat at $T_2$; here again, the compressor operates in a different pressure and temperature interval.

(c) Heat at the temperature $T_2$ is converted into work. Waste heat is produced at $T_1$. In the apparatuses of FIGS. 14a and c–f, the expansion machine is operated in a different pressure interval than the expansion machine of a conventional apparatus which operates with the pure working fluid (that is, without circulating absorbents).

A particular advantage of the present apparatuses, as already mentioned, is that the operating states of the present apparatuses can be adapted to changing outdoor conditions by varying the working-fluid throughputs m and n.

As an example, operating range 2, which is realizable with all the systems shown in FIGS. 14a–14f, will now be discussed. Available heat can be extracted both at $T_2$ and at $T_1$. The efficiency increases continuously during the transition from $T_2$ to $T_1$. If the heat is extracted solely in temperature range $T_2$, then with the same compressor output n, the heat absorbed per unit of time at $T_0$ is only half as great (m = n/2 for FIGS. 14a and b) than when heat is extracted only in temperature range $T_1$ (m = n for FIGS. 14a and b). In order to keep the available heat output constant with increasing available-heat temperature (transition from $T_1$ to $T_2$), or to increase the available heat output, the working-fluid throughput n and thus the work supplied per unit of time must be increased. By controlling the inflow temperature in the hot-water cycle, the ratio between the amounts of heat extracted at $T_1$ and $T_2$, respectively, can be determined.

In refrigeration machines and air-conditioning systems as well, this adaptability of the temperature of the waste heat is advantageous. With a decreasing waste heat temperature, the apparatus automatically attains a better coefficient of performance for refrigeration.

The described apparatuses also make it possible to generate refrigeration simultaneously in various temperature ranges, using only one compressor—for instance, in operating range 3. This property is advantageous in the operation of refrigerators, freezers and, again, particularly for air conditioners.

The fact that the compressors or expansion machines of the present apparatuses operate in pressure intervals which are quite different from the pressure intervals which would result if the same process were performed using the same working fluid without any absorbent circulation will now be explained in more detail, referring to some practical examples.

EXAMPLE 1

An apparatus as shown in FIG. 14b, in the operating state where $Q_2 = 0$ and $W > 0$, represents a heat pump in which heat is raised from $T_0$ to $T_1$, while the compressor here operates between $p_2$ and $p_2$ instead of between $p_0$ and $p_1$. The heat of condensation created in the condenser E is used for expulsion in A, in analogy to the principle of vapor compression. With $H_2O$ as the working fluid and a 60% aqueous lithium bromide solution as the absorbent, the following operating data are attained by way of example:

$p_0 = 0.2$ bar
$p_1 = 1$ bar
$p_2 = 6.5$ bar
$T_0 = 60°$ C.
$T_1 = 100°$ C.
$T_2 = 150°$ C.

In a conventional compressor heat pump, which uses $H_2O$ as working fluid and operates with a temperature increase from 60° C. to 100° C., the compressor would have to effect compression from 0.2 bar to 1 bar with a large volumetric throughput, while the compresor of the present compresor heat pump effects compression with a relatively small volumetric throughput from 1 bar to 6.5 bar.

EXAMPLE 2

Conversely ($W < 0$), it is possible to obtain work, using this apparatus, from the temperature difference from 100° C. to 60° C. with a relatively small turbine, by means of the decompression of steam between 6.5 bar and 1 bar. The heat of absorption created in A is used for steam generation in E.

In both examples, $T_0$ can also be selected to be lower than 60° C. In both examples, the heat conversion and working-fluid conversion in exchange unit B are small, because for $Q_2 = 0$, the working-fluid current m is approximately equal to n. The exchange unit B can therefore be omitted in principle. In that case, however, $Q_2$ is exactly equal to zero only under quite specialized conditions of specific heats, heats of solution and circulation of the solvent, compressor efficiency and so forth. The boundary between the operating ranges 1 and 2 in FIG. 14b' can be at the right or left of the dashed line (representing m=n) or may, at some points, be on this line. If no heat is to be supplied or extracted at $T_2$, then the exchange unit B, which depending upon the relationship of the two lines $Q_2 = 0$ and $Q_B = 0$ to one another is either a small condenser (m > n for $Q_2 = 0$) or an evaporator (m < n for $Q_2 = 0$), serves to equalize the heat balance between E and A. The working-fluid flow m-n through the exchange unit B can serve to regulate the operating parameters of the combination KEA. The exchange units A, E and B can be shifted arbitrarily along the vapor-pressure curves to higher or lower pressures (see FIGS. 15a and c). Thus at a given temperature rise $T_1-T_0$ of the heat pump, the pressures $p_2$ and $p_1$ of the compressor K can be located in a technologically favorable range. For the purpose of increasing efficiency, it is advantageous first to decompress the liquid working-fluid flow occurring from E to D to the pressure level $p_1$ and then to feed the gaseous component thus created directly back to the compressor K.

At the boundary between operating ranges 5 and 6, analogous conditions apply to the heat balance and to component B. Since in this operating state, liquid working fluid is pumped from D to E and must thereby be heated, B can serve as a condenser for partially heating this fluid flow, corresponding to the increase in efficiency by means of feed-water preheating.

The apparatus of FIG. 14d (and in particular FIG. 15b) is advantageous, for instance if the thermal stability of the working fluid is imperiled by overheating during the compression process or if $p_1$ for the compressor is at an uncomfortably high level. For $Q_D = -Q_E$, that is, $Q_0 = 0$, heat is pumped from $T_1$ to $T_2$ in the heat transformer/heat pump operation (second quadrant in FIG. 14d"), although the compressor operates only between $p_0'$ and $p_0$. In the operating state where $Q_0 = 0$, the heat and working-fluid conversions in the exchange unit C are small, in the system of FIG. 14d. The boundary between operating ranges 3 and 4 or between 7 and 8 is in the vicinity of the dashed line for $Q_c = 0$. In principle, C can thus be omitted, although in that case the heat balance between D and E is generally no longer equalized precisely. Exchange unit C will be retained, however, so that in it the heat of overheating of the gaseous working fluid arriving from the compressor can be used, for instance for expulsion, thus increasing efficiency. The heat balance of the absorbents circulating between A and E, one flow being high in working fluid content and the other low, can partially be equalized in C. In the system shown in FIG. 14d, as well, the exchange units D, E and C can be shifted arbitrarily along the vapor pressure curves into a favorable pressure or temperature range (see FIGS. 15b and d). $T_0$ may also be lower than the outdoor temperature.

The apparatus shown in FIG. 14e, where $Q_2 = 0$ (m=n) and $W > 0$, represents a compressor heat pump having high efficiency. With this type of operation, the exchange unit A can be omitted (see FIG. 21a), unless it is intended that the heat of overheating be used for expulsion purposes in A. If the pressure machine is an expansion machine ($W < 0$), A can serve as an overheater. The exchange unit which communicates with the outlet or in other words the compression side of the compressor can serve not only to carry away the heat of of overheating but also as an oil separator. This is the case particularly if an oil suited to lubricating the compressor is used as the absorbent.

In the apparatus of FIG. 14c, the exchange unit D can be omitted if $Q_0 = 0$, that is, for m = -n.

In the systems of FIGS. 14a-f, the intervals $T_2-T_1$ and $T_1-T_0$ on the reciprocal temperature scale were selected as of approximately equal size. FIGS. 16a and b, as examples, show how the addition of two further exchange units and one absorption cycle can alter the temperature intervals in the system of FIG. 14a in an intended manner, without the number of substantial pressure levels increasing to more than three. Analogous expansions of the system are possible for all the absorption cycles having systems as shown in FIGS. 14a-f. These new systems, in which the absorption portion is two-staged, are therefore capable of exactly the same operating states as those shown in FIGS. 14a'-f; however, different coefficients of performance do result, which must be expected given the altered temperature intervals. In the systems of FIGS. 16a and b, every pressure stage can be connected via a pressure machine.

In all the systems shown in FIGS. 14a-f, two independent circulations exists, so that except for special operating states, both work and heat can be supplied for operating the system. The systems can, for instance, operate purely as absorption heat pumps or absorption heat transformers by first supplying heat. In order to increase performance, the compressor can then always be added and can even drive the system by itself should the heat supply become exhausted. These systems are particularly advantageous as well if the compressor output W is furnished by an internal combustion engine. The waste heat of the engine can then be used as driving heat for the absorption heat pump portion (m > 0) or for the heat transformer portion (m<0). This also applies, for instance, to the system of FIG. 14b (or 15a), having $H_2O$ as working fluid and an LiBr solution as absorbent.

In FIGS. 15a, a'–k, k', examples are shown for systems as in FIG. 4 in which the operating parameters are selected such that four temperature ranges are obtained. The reference numerals with a prime (') relate to the alternative system having the pressure machine k'. The associated diagrams of operating states are identified, for the sake of simplicity, with the same numerals with or without a prime as appropriate.

The algebraic sign of the heat conversions $Q_0$–$Q_3$ and the work W are shown in Table 3 (line symbols of the right-hand column).

For the systems of FIGS. 15a and 15g, the same conditions apply for operation as a heat pump between $T_0$ and $T_1$ or between $T_2$ and $T_3$ as discussed above for FIGS. 14b, c and 14d, e. In FIGS. 15a and 15b, it is again indicated that when there is a complete heat exchange in the temperature ranges $T_3$ and $T_0$, respectively, the working-fluid conversion in the exchange unit B or C is small or is even zero. The systems of FIGS. 15c, c' and d, d' can be understood as variants of the systems of FIGS. 14b–e, but also as variants of the systems of FIGS. 15a, a' and b, b', which are obtained if in the system of FIG. 15a or 15a' the arbitarily shiftable combination EBA having K or K' is "shifted through" the exchange-unit pair CD in such a manner that only the exchange unit E is above it in terms of pressure. In the case of the system of FIGS. 15c, c', the heat pump operates with an internal heat exchange at $T_2$ between $T_1$ and $T_3$; D represents a small exchange unit for the purpose of satisfying the condition $Q_2=0$ exactly. For the systems of FIGS. 15d, d', the same can be said. The systems of FIGS. 15e and e' are created from the systems of FIGS. 15a and 15a', respectively, in that the exchange unit C is shifted past B as far as $T_1$, although all the topological relationships (that is, all the connections) are retained as they were. As with the system of FIGS. 15b and b' or FIG. 14e, this last system is capable of pumping heat from $T_2$ to $T_3$; an internal heat exchange occurs between E and C in the temperature range $T_1$. In that case, however, the small exchange unit D serves as a condenser or evaporator in order to satisfy the condition $Q_E=-Q_C$. In analogous fashion, in the systems of FIGS. 15f and f', the heat balance in temperature range $T_2$ is equalized, not as in the system of FIG. 14b by means of an exchange unit which is at a lower temperature level but rather by means of an exchange unit which is at a higher temperature level. It will thus be appreciated that in "vapor compression", there are two possible ways of equalizing the heat balance between the condenser and the expeller.

The systems according to FIGS. 15g and g' and FIGS. 15h and h' are created from the systems of FIGS. 15e and e' and f and f', respectively, by broadening the absorption part along the temperature axis. The systems of FIGS. 15i and i' are created from the systems of FIGS. 14d and e, respectively, by shifting the exchange unit E to higher and higher pressures without altering the connections. The same is true for the systems of FIGS. 15k and k', derived from the systems of FIGS. 14b and c. The twenty systems shown in FIGS. 15a, a' through k, k' all have one operating state in which the number of active exchange units is reduced to four. The exchange unit common to both cycles is inactive in this case.

In the sixteen classes of FIG. 3, each class has a subclass having six exchange units and thus a maximum of six temperature levels and three pressure levels. These subclasses are distinguished by the fact that if Rule 3(b) is applied, a system is created in which the exchange unit which previously belonged to both cycles is now no longer present. The systems resulting from the omission of the common exchange unit are shown in FIGS. 17a–f. If one begins with a system according to FIG. 3 in which an internal heat exchange is performed, new systems are arrived at. Without internal heat exchange, however, the systems of FIGS. 17a–17d and 17f are known and are therefore not claimed herein.

Also not claimed herein are apparatuses having a system according to FIG. 17c or 17d having exchange units in which the method of overlapping temperatures is used. The same applies to the system of FIG. 5a.

Figure 17:
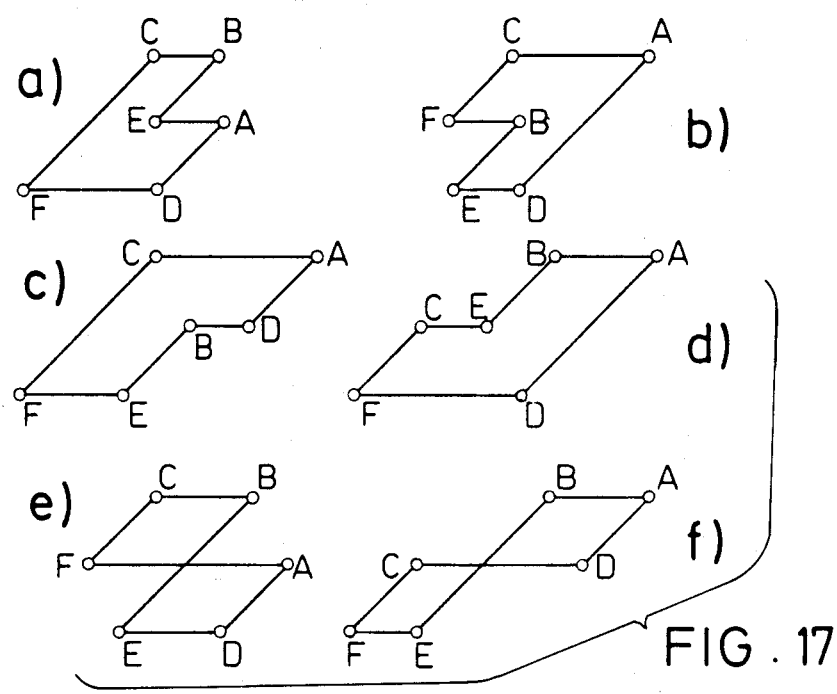

In the systems of FIG. 17, there is only a single independent working-fluid flow, and thus only two respective types.

Examples of particularly efficient, novel systems according to FIG. 17 and having internal heat exchange are shown in FIG. 18. The vertical wavy lines symbolize an internal heat exchange between the exchange units connecting them; the direction of the flow of heat depends upon the type, or in other words on the direction of the circulation of the fluid.

The following discussions relate to apparatuses as shown in FIG. 18 which are constructed for operation as a heat pump. For the opposite direction of the working-fluid flow, analogous conditions apply.

In the system shown in FIG. 18a, driving heat is supplied at A; refrigeration output is produced at C; waste heat is emitted at D; and at F, available heat at a high temperature is emitted. For the working-medium system $NH_3/H_2O$, the temperatures are, by way of example:

$T_A = 150°–180°$ C.
$T_F = 100°$ C.
$T_D = 30°$ C.
$T_C = 5°$ C.

The systems of FIGS. 18c, i and k can be operated in analogous fashion.

In the system of FIG. 18c, operating heat is supplied at A, heat is absorbed in C and available heat is emitted at D and F. In comparison with a single-stage heat pump having the same operating temperatures, the pressure in the expeller A is substantially lower and can practically be reduced to the pressure in the evaporator C.

The system of FIG. 18f represents a heat pump analogous to the system of FIG. 18c; however, in this case the pressure in the expeller A is below that in the evaporator C. The dashed lines indicate that by "shifting" the exchange unit A, B, E, F into the position shown in the ln p/(−1/T) diagram, the pressure in the expeller A' can be made virtually equal to the pressure in the evaporator C. B' and C remain separate compenents.

The system of FIG. 18g can be used, for instance, to attain refrigeration output at D at a temperature below the freezing point of water, using the $H_2O$/LiBr-solution working-fluid system.

The system of FIG. 18b, when the $H_2O$/LiBr-solution working-fluid system is used, has the advantage that the pressure in the expeller A is at a higher level than in the case of a single-stage heat pump and identical temperature ranges.

If a complete internal heat exchange is desired in the systems of FIG. 18, yet is attainable only with difficulty because of given operating parameters, an additional exchange unit is provided for equalizing the heat balance. This additional exchange unit only needs to be small in comparison with the exchange units shown in FIG. 18, and it is disposed at a location such that again two independent circulations result. In this case there are three different possibilities, indicated by dashed lines as examples in FIGS. 19a, b and c for systems according to FIGS. 18a, b and c.

The operating parameters of this additional, small exchange unit could be used, as has been mentioned above in connection with FIG. 13, for closed-loop and open-loop control purposes.

In the absorption-pressure machine systems of FIG. 4 as well, systems can be obtained by applying Rule 3(b) which no longer contain the common exchange unit. These systems are shown in FIGS. 20a–f. Analogously to the systems of FIG. 17, there is only one working-fluid circulation in the systems of FIG. 20 and therefore only two types for each system of the classes of systems shown in FIG. 20.

Figure 20A:
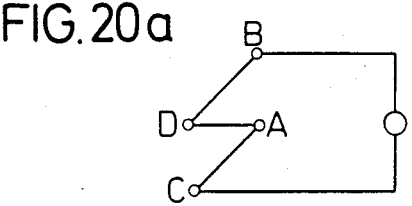
Figure 20B:
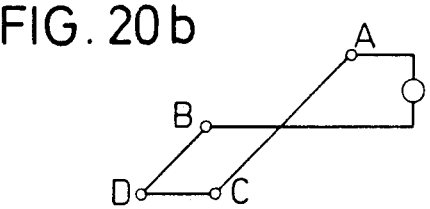
Figure 20C:
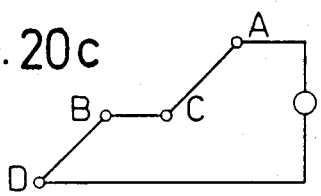
Figure 20D:
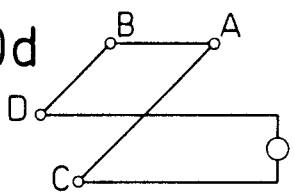

Apparatuses are already known having systems according to FIGS. 20b, d, e and f which are constructed for quite specific operating types, and which are therefore not encompassed by the subject of the present invention. In particular, systems as shown in FIGS. 20b and d–f, in which the pressure machine is a compressor and the absorption part operates without internal heat exchange, are known. An apparatus having the system shown in FIG. 20b in which the pressure machine is an expansion machine is also known.

Figure 20E:
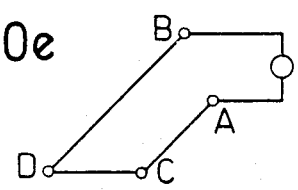
Figure 20F:
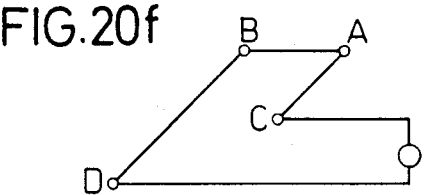

In FIGS. 21a, b and c, three particularly advantageous systems having internal heat exchange are shown, corresponding to the systems shown in FIGS. 20e, a and d, respectively. Particular advantages are attained if the systems shown in FIG. 21 are used for continuously functioning heat pumps or refrigeration machines having a compressor. However, if the pressure machine is an expansion machine, the corresponding conditions apply.

In a heat pump having the system shown in FIG. 21a, heat is pumped from D to C; however, the compressor K operates in a pressure range which is substantially higher than that corresponding to the vapor pressure of the working fluid in the temperature range $T_0$. The temperature range $T_2$ can be selected independently of the temperature ranges $T_0$ and $T_1$ such that favorable pressures for the compressor K are attained. This is favorable when $H_2O$ is used as working fluid.

In a heat pump having the system shown in FIG. 21c, heat is pumped from B to A, while the compressor K operates in a substantially lower pressure range than that corresponding to the vapor pressure of the working fluid in the temperature range of exchange unit B. This has the advantage that the compressor K can operate at lower pressures and that the working fluid is not subjected to such high temperatures during compression.

In a heat pump having the system shown in FIG. 21b, heat is pumped from D to A.

If a complete heat exchange is to be attained between the coupled exchange units in the systems of FIGS. 21a–c, that is, if heat is neither supplied from outside to nor extracted from the exchange units which are in a heat-exchanging relationship with one another, the systems of FIG. 21 can be augmented by an additional, small exchange unit in such a manner that a second complete working-fluid circulation is brought about. Then there are two respective possibilities, which are shown in FIG. 22 in dashed lines for the system shown in FIG. 21a. The exchange unit F can furthermore assume the function of the overheater for the gas flow entering into the expansion machine K or, conversely, pre-cool the gas flow leaving the compressor K and condensed in B. The exchange unit E can furthermore cool the gas flow generated in A and aspirated by the compressor K or it can heat the gas flow leaving the expansion machine K. The corresponding conditions apply to the systems shown in FIGS. 21b and 21c.

The systems shown in FIG. 17 each have different properties, which assure optimal operation under various conditions. In the systems discussed earlier and having two working-fluid flows variable independently of one another, the mode of operation of the system could be adapted to changing conditions by varying the ratio of the working-fluid flows. It was then recognized that in the systems of FIG. 17, a similar adaptation to various conditions can be attained by additionally providing simple connecting lines having blocking valves for gaseous working fluid, with which changes from one configuration to another in FIG. 17 can be made.

FIG. 23a shows the connecting lines and gas valves which are required in order to realize each of the systems shown in FIG. 17 and the system of FIG. 5a as desired, without anything having to be altered in the absorption cycles. It is even possible to switch over between certain classes of systems having internal heat exchange, as is shown in FIG. 23b. With the system shown in FIG. 23b, the system of FIG. 23c can be realized by means of closing the valve $V_1$ and opening the valves $V_2$ and $V_3$, while the system according to FIG. 23d can be realized by opening the valve $V_1$ and closing the valves $V_2$ and $V_3$.

Figure 24C:
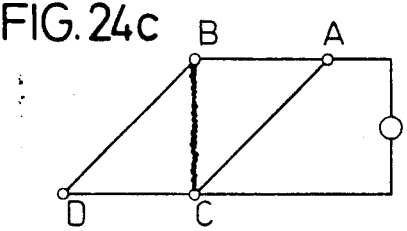
Figure 24D:
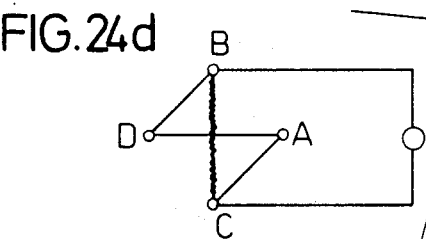
Figure 24B:
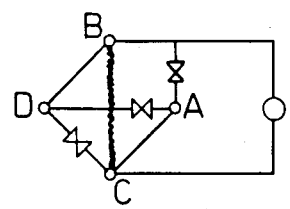
Figure 24A:
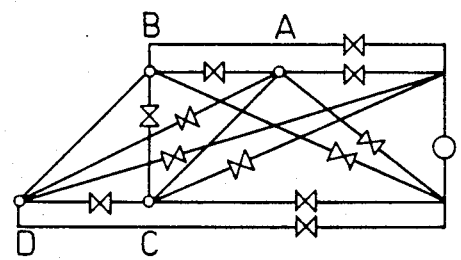

The corresponding conditions apply to the absorber compressor systems shown in FIG. 20. FIG. 24a shows an absorber-compressor system in which each of the systems shown in FIG. 20 and the systems of FIG. 5c can be realized by means of opening and closing the various gas lines and valves shown. Analogously to FIG. 23b, FIG. 24b shows a system having internal heat exchange, with which either the system of FIG. 24c or the system of FIG. 24d can be realized by opening and closing the various valves shown.

In the systems shown in FIGS. 23 and 24, accordingly, a discontinuous switchover is possible between systems which operate at different degrees of efficiency.

It was furthermore discovered tha a switchover between various classes of systems, such as has been discussed with respect to FIGS. 23 and 24, can also be performed with the systems shown in FIG. 3. That is, the systems of classes $A_1 \times B_1$, $A_1 \times B_4$, $A_4 \times B_4$ can be switched over by gas line valves, and the systems of classes $A_2 \times B_2$, $A_2 \times B_3$ and $A_3 \times B_3$ can also be interconnected, and finally the systems of classes $A_1 \times B_2$, $A_1 \times B_3$, $A_2 \times B_4$ and $A_3 \times B_4$ can be interconnected.

Analogously to the above discussion, it is possible with the systems shown in FIG. 4 to make transitions among one another for the systems of classes $A_1 \times K_1$, $A_1 \times K_2$, $A_4 \times K_1$ and $A_4 \times K_2$ by means of switching over gas valves; the corresponding conditions apply to the systems of classes $A_2 \times K_1$, $A_2 \times K_2$, $A_3 \times K_1$ and $A_3 \times K_2$.

If a two-stage absorption machine system according to FIG. 3 is expanded by one further elementary absorption cycle, then the result is three-stage absorption machines having a maximum of ten exchange units, that is, a maximum of ten temperature levels and a maximum of four pressure levels. Subclasses are obtained having eight exchange units, since the added absorption cycle can have three exchange units in common with the expanded two-stage system. The temperature ranges, as well, can be reduced to three.

If a two-stage absorption machine system is expanded by one elementary pressure machine cycle, then the result is classes of further three-stage absorption-pressure machine systems. If a two-stage system comprising one absorption cycle and one pressure machine cycle is expanded by one elementary absorber cycle, then further classes of three-stage machines are obtained, which are included only in part in the classes mentioned in the preceding sentence.

If a further elementary absorption cycle is added to the two-stage systems shown in FIG. 3 such that the added, new absorption cycle has three exchange units in common with the original, two-stage system according to FIG. 3, then the result is the systems shown in FIG. 13; all the exchange units in this case are to be considered of normal dimensions. All these systems have three independent working-fluid flows. A multiplicity of operating types can be realized in accordance with Rule 3 by means of the selection of the relationships among these working-fluid flows.

If the two-stage absorption systems of FIG. 17 are expanded by one further absorption cycle such that the further absorption cycle has two exchange units in common with the original, two-stage system of FIG. 17, then the result is the three-stage systems shown in FIG. 25, having eight exchange units and two independent working-fluid flows. The method described above for obtaining the three-stage systems results in some classes of three-stage systems being obtained several times.

If the two-stage absorption system of FIG. 5a is expanded by one further elementary absorption cycle such that the additional absorption cycle and the original system have two exchange units in common, the result is the three-stage systems shown in FIG. 26. These systems contain eight exchange units and have three independent working-fluid circulations.

FIG. 27, analogous to FIG. 26, shown the three-stage systems obtained if the two-stage absorption system of FIG. 5b is expanded in the manner indicated.

If the two-stage absorber-compressor systems of FIG. 4 are expanded by one additional elementary absorption cycle such that the additional absorption cycle has three exchange units in common with the original system, then the three classes of three-stage absorption-pressure machine systems shown in FIG. 29 are obtained.

If the two-stage absorption-pressure machine systems shown in FIG. 20 are expanded by one further elementary absorption cycle such that the further absorption cycle and the original system have two exchange units in common, then the result are the three-stage systems shown in FIG. 28 having six exchange units and two independent working-fluid flows.

If the two-stage absorption systems shown in FIG. 17 are expanded by one elementary pressure machine cycle such that this additional elementary pressure machine cycle and the original system have two exchange units in common, then the result is the systems shown in FIG. 30, which may each contain either the pressure machine K or the pressure machine K′ or the pressure machine K″. Some of these systems are the same as some systems shown in FIG. 28.

If the two-stage absorption system of FIG. 5a is expanded by one elementary pressure machine cycle such that the elementary pressure machine cycle and the original system have two exchange units in common, then the result is the class of three-stage systems shown in FIG. 31, having six exchange units and three independent working-fluid circulations.

If the two-stage absorption system of FIG. 5b is expanded by one elementary pressure machine cycle such that this cycle has two exchange units in common with the original system, then the result is the classes of systems shown in FIG. 29.

The absorption systems of FIGS. 5a and 5b can also be expanded by one elementary pressure machine cycle such that the latter has only one exchange unit in common with the system of FIG. 5a or 5b.

The two-stage absorption systems shown in FIG. 3 can also be expanded by one elementary pressure machine cycle, which then may have one or two exchange units in common with the original system.

A two-stage pressure machine system comprising two elementary pressure machine cycles, such as is shown by way of example in FIG. 32, can also be expanded into a three-stage apparatus by the addition of one elementary absorption cycle. The result then is sytems such as are shown in FIG. 34 with the two pressure machines $K_1$ and $K_2$, indicated by heavy lines. One of these two pressure machines, $K_1$ or $K_2$, may be replaced with a pressure machine $K_3$.

If one exchange unit is eliminated from the systems shown in FIG. 34 in accordance with Rule 3(b), this exchange unit being common to both the absorption cycle and one pressure machine cycle, then systems such as those shown in FIG. 33 are obtained. These systems have four exchange units and two pressure machines, and they have two independent working-fluid circulations.

Of the systems shown in FIG. 34, the system shown at center right, having the pressure machines $K_1$ and $K_2$, is preferred. In a heat pump with this system, the pressure machines are compressors; the working-fluid lines and the absorption cycle are preferably connected in the manner shown in FIG. 34a. Without the exchange units A, C interconnected by an absorption cycle, the apparatus of FIG. 34a represents a known, two-stage heat pump, which pumps heat from $T_0$ to $T_2$. The working fluid compressed by the compressor $K_1$ gives up its excess heat in the exchange unit D, which is designed as a separator. The compressor heat pump of FIG. 34a having the exchange units A, C interconnected by the absorption cycle has greater efficiency than the simple, two-stage compressor heat pump, because in the exchange unit A, the heat of overheating from the working fluid leaving the compressor $K_2$ is utilized for expulsion, and the heat of overheating of the working fluid leaving the compressor $K_1$ is carried away in the exchange unit C.

The system of FIG. 34a can additionally be expanded, as indicated by dashed lines, by one exchange unit F, which is coupled by means of an absorption cycle with C and by means of a working-fluid line with E.

In the systems having two pressure machines, it is possible for one pressure machine to perform work and the other to consume work. In that case, the two pressure machines can then be realized by means of a jet compressor. Among these specialized apparatuses, those which are not claimed are those whose systems are shown in FIG. 35, in which SS represents the jet compressor.

In the above-mentioned, multi-stage systems, an internal heat exchange is again possible if the operating parameters are selected in a suitable manner, as has been explained above for the two-stage systems.

In the above-discussed systems including three exchange units operating in the same pressure range, the four possibilities illustrated in FIG. 36 exist for connecting these exchange units with one another. For the class of systems shown in FIG. 5a, the variant systems shown in FIG. 37 result accordingly. An apparatus having the specialized system shown in FIG. 37a is not claimed. For the system of FIG. 5a in heat-pump operation, the variant system of FIG. 35 is preferred.

When there are four exchange units operating in the same pressure range, the connecting lines a–f shown in FIG. 38 result. Arbitrary combinations of from three to six of these connecting lines can be used, so long as it is assured that each exchange unit is connected either directly or indirectly with every other exchange unit.

If a system includes three exchange units which operate in different pressure ranges and must be connected with one another via lines for liquid working fluid, then the possibilities illustrated in FIG. 39 exist.

Figure 41:
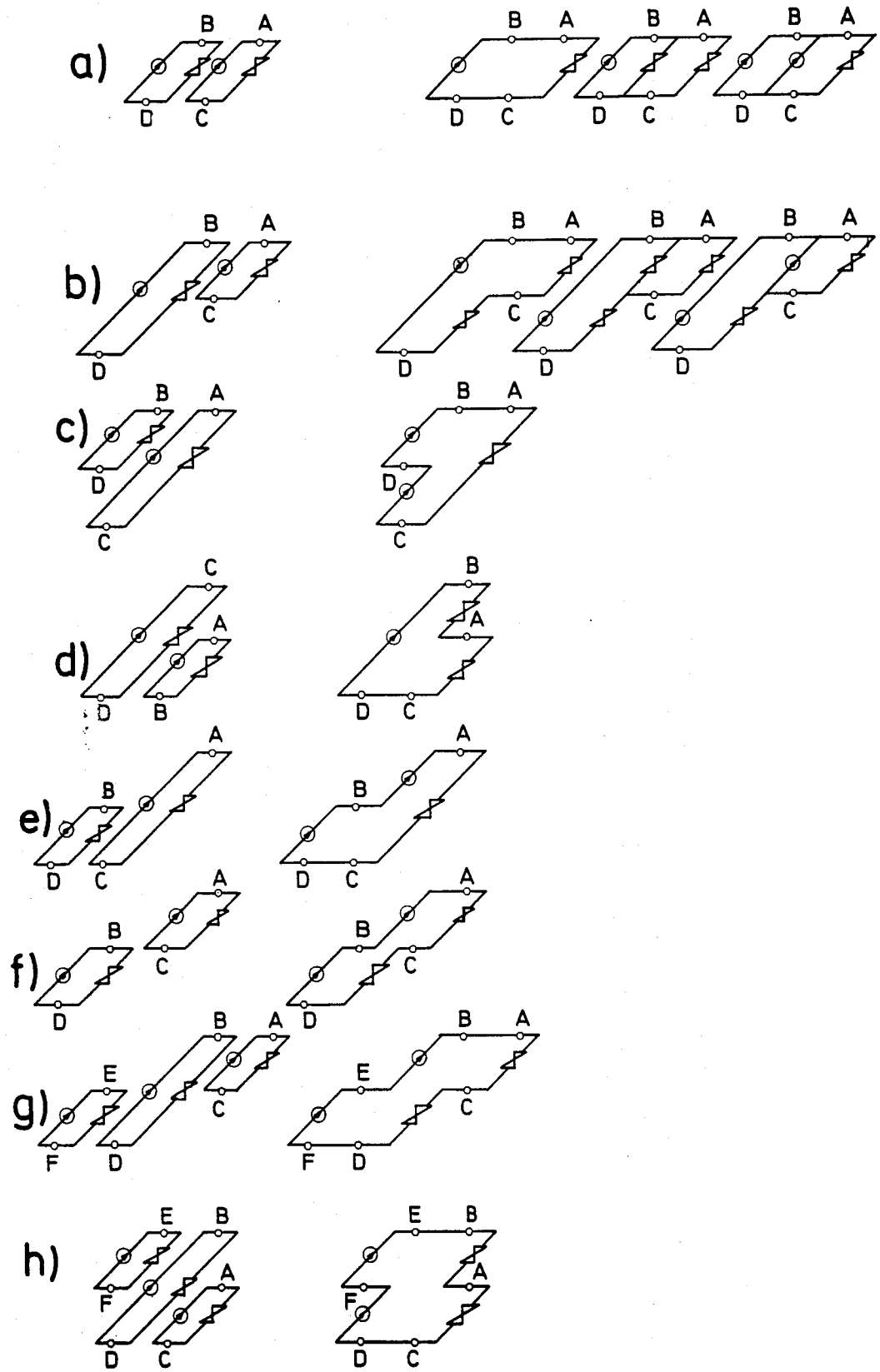

If the system includes three exchange units which operate at different pressure levels and are interconnected by means of absorption cycles, then at least the possibilities illustrated in FIG. 40 exisit. If a system includes a plurality of adjacent pairs of exchange units which are connected by one absorption cycle, for instance exchange unit pairs A-C, B-D and E-F (FIG. 41), and if the range of solution of the working-fluid system circulating in the absorption cycles is so wide that the concentration of the absorbent in one cycle, which is rich in working fluid, is at least equal to the concentration of absorbent low in working fluid in the other cycle, then the absorption cycles can be united with one another. In FIG. 41, on the left, the two separate absorption cycles are shown, the left-hand line respectively carrying absorbent that is rich in working fluid and the right-hand line carrying absorbent that is low in working fluid. To the right of these two separate absorption cycles, absorption cycles are shown which result from the union of the two absorption cycles shown on the left. Three variants each are attained, which are shown in only the first two lines; corresponding conditions apply to the other lines. In the opposite circulation direction, there is a throttle instead of a pump and vice versa.

If two absorption cycles are united in the above-described manner, then the united absorption cycles thus created frequently include two exchange units operating at the same pressure level, which are connected by a line carrying absorbent; examples are the exchange units A and B or C and D in the second system of FIG. 41a. These exchange units may remain separate exchange units; or, for the sake of a compact structure for the apparatus, they can be combined into a single exchange unit, in which a corresponding temperature drop and concentration drop then occur along the flow route of the absorbent. Not claimed as an invention are the systems of class $A_2 \times B_2$ of FIG. 3, having the absorption cycle shown as the second circuit diagram in FIG. 41b or 41c, if the exchange units A and B are combined into one common exchange unit and the working fluid in both absorption cycles circulates counterclockwise.

In FIGS. 42a–42h, systems of advantageous apparatuses for the working-fluid system $NH_3/H_2O$ are shown; the systems of FIGS. 42a–42d are preferred. In all the apparatuses, the working fluid is supposed to circulate counterclockwise. An internal heat exchange takes place in the direction of the arrow between the exchange units connected by a wavy line.

Figure 42:
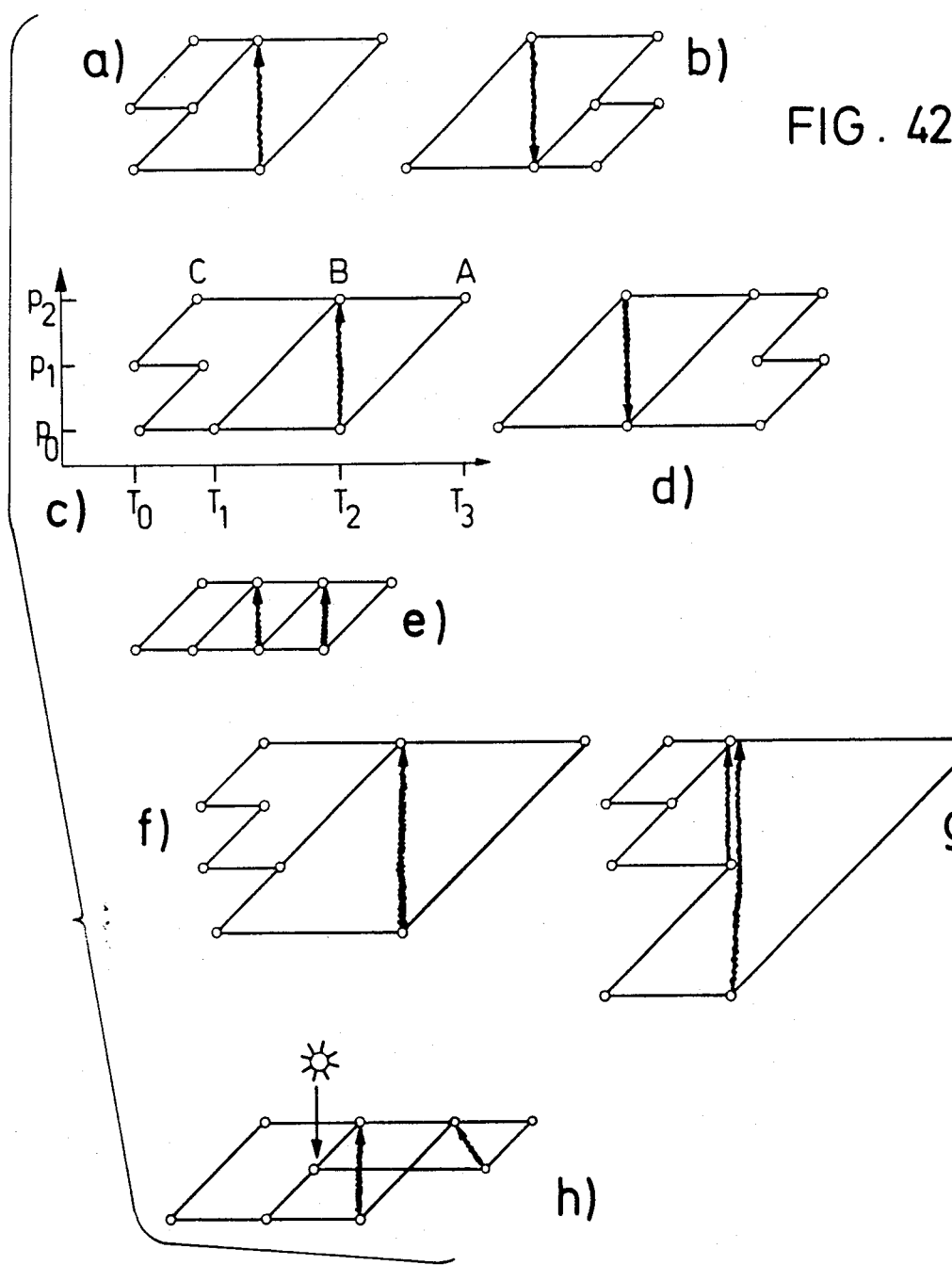

The apparatus having the system shown in FIG. 42a has an efficiency for refrigeration purposes which is three times as great as that of a simple refrigeration machine such as that shown in FIG. 1. The apparatus according to FIG. 42a furthermore has the advantage that the exchange unit B can additionally be supplied with heat; as a result, the refrigeration output of the exchange units operating in the lowest temperature range is increased.

The system shown in FIG. 42c, for refrigeration purposes, has four times the efficiency of a simple refrigeration machine such as that of FIG. 1. Here, again, the exchange unit B can be supplied additionally with heat, such as waste heat or solar heat, in order to increase the refrigeration of the exhange units operating in the lowest temperature range. The apparatus of FIG. 42c can operate with the following operating parameters, if the ammonia-water working-fluid system is used:

| | |
|---|---|
| $p_2$ = 12 bar | $T_5$ = 160–180° C. |
| $p_1$ = 6 bar | $T_3$ = 90–125° C. |
| $p_0$ = 2 bar | $T_1$ = 30–40° C. |
| | $T_0$ = 8° C. |

These are approximate values.

The system of FIG. 42e has three times the efficiency, when used for refrigeration, of a simple refrigeration machine as shown in FIG. 1.

The systems of FIGS. 42f and g have five times the efficiency of a simple refrigeration machine as shown in FIG. 1; however, the temperature rise between exchange units in the lowest and the next-to-lowest temperature range is relatively small.

The system of FIG. 42h has the advantage over the systems of FIGS. 42a and c that for refrigeration, not only driving heat at relatively high temperature but also heat at a relatively low temperature can be used, for instance solar heat at a temperature between 60° and 100° C., which is supplied to the exchange unit marked with an arrow in the medium pressure range.

In FIGS. 43a–c, three advantageous multi-stage absorption systems are shown for the lithium bromide/water working-fluid system.

In the system of FIG. 43a, the lowest temperature level may extend below 0° C., because the exchange unit operating at the lowest temperature level contains lithium bromide, which lowers the freezing point of the water. The exchange unit H thus functions as a desorber. By means of the internal heat exchange between G and F, despite the narrow range of solution of the lithium bromide/water working-fluid system, the waste heat produced is at the relatively high temperature level at which the exchange unit E works. The temperature levels, in an apparatus as shown in FIG. 43a, may have the following approximate values:
−5° to 0° C.; 30° C.; 60° C.; 100° C.; 140° to 150° C.

The efficiency of the system of FIG. 43a can be increased by means of an additional absorption cycle having heat exchange, as is shown in FIGS. 43b and 43c.

FIG. 43d shows a system in which, similarly to the system of FIG. 42h, an exchange unit marked by an arrow can additionally be supplied with heat (solar heat, waste heat) at a low temperature (for instance, between 60° and 100° C.), in order to increase the refrigeration output.

If the exchange units A and B are eliminated from the system shown in FIG. 43a, a functional system is again obtained, but it has a somewhat lower efficiency. If the exchange units operating at the lowest pressure level are eliminated from the system of FIG. 43c, then a functional system is once again obtained, but with it, such low temperatures as are attainable with the complete system of FIG. 43c cannot be attained.

In FIG. 44, systems are shown which may be considered as multi-stage absorption systems or absorption-expansion machine systems; they are not the subject of the present invention.

The systems of FIGS. 44a, b and c represent, in practical terms, one single-stage or two two-stage absorption systems, in which the evaporator V and the absorber A are subdivided into a plurality of parallel evaporator-absorber pairs V-A, V'A', V"-A" and so forth, operating in closely adjacent pressure ranges, in order to generate refrigeration in various temperature ranges.

The systems of FIGS. 44d and 44e contain a single working-fluid cycle and represent absorption refrigeration machines, in which high efficiency is to be attained, or a high temperature difference encompassed, by means of additional desorber-absorber pairs D-A, D'-A' and so forth. The system of FIG. 44f corresponds substantially with that of FIG. 44e.

FIG. 44g shows a known three-stage absorption refrigeration machine having internal heat exchange in two stages.

Heating plants also exist for which, upon close analysis, the system shown in FIG. 44h can be drawn. This system is therefore likewise not the subject of the present invention.

The above-discussed teachings clearly also make it possible to develop known heat pumps, refrigeration machines and the like further in such a manner that better adaptability and/or higher efficiency is attained. This will be explained further, referrring to FIGS. 45 and 46:

FIG. 45a shows, how an apparatus known from U.S. Pat. No. 3,651,655 can be converted into an apparatus according to the invention. The circuit diagram of the known apparatus is provided in FIG. 45b. The exchange units are identified by the same capital letters as before.

A first advantageous further development of the known apparatus of FIG. 45b can be made by adding a compressor $K_1$ between exchange units D and A, as shown in FIGS. 45a and 45c.

However, the alternative variant shown in FIG. 45d and FIG. 45a is particularly advantageous, having the compressor $K_2$ and an additional exchange unit G, which is embodied as a heat exchanger element functioning in the exchange unit A as a condenser and is connected in the manner shown in FIG. 45a. The condensate from the condenser G is fed via a throttle Dr into the vapor line leading to the exchange unit B, so that it is likewise capable of emitting heat to the exchange unit C.

Figure 46C:
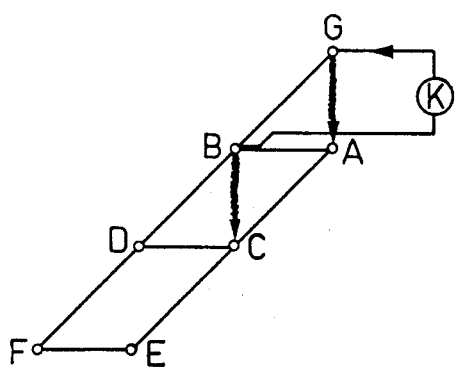

FIG. 46a shows how a known refrigeration machine (see DE-A No. 29 44 960) can be modified in accordance with the teaching of the present invention. The fundamental circuit diagram of the known refrigeration machine is shown in FIG. 46b. According to the invention, this known refrigeration machine can be expanded in an advantageous manner by one additional compressor K and one additional exchange unit G, as is shown in FIG. 46c in the form of a circuit diagram and in FIG. 46a in greater detail. The compressor K is disposed between the exchange units B and G; the exchange unit G functions as a condenser and is in a heat-exchanging relationship with the exchange unit A and is disposed in this exchange unit A for this purpose. The original connection between B and a throttle DR1 is interrupted, as indicated by an X. An additional evaporator V may be disposed between a throttle DR2 and B.

In the refrigeration machines shown in FIGS. 45a and 46a, lithium bromide solution and water are preferably used as the working-fluid system.

A first advantage of the refrigeration machines embodied in accordance with the invention in the described manner and as shown in FIGS. 45a and 46a is that the refrigeration output can be increased by means of the simultaneous supply of heating energy to the exchange unit A and mechanical energy to the compressor K. However, it is also possible to drive the refrigeration machines according to the invention either with heating energy or with the driving energy of the compressor, or with various combinations of these two types of energy.

Particularly advantageous conditions are attained if the compressor is driven by an internal combustion engine, because in that case the heat of the exhaust can be fed, as heating energy, into the exchange unit A, and the coolant heat can be fed as additional heat to the exchange unit C, for instance via a heat exchanger WT in FIG. 46a. In the apparatus shown in FIG. 45a, a heating device would be provided in the exchange unit C in a manner similar to what was done in exchange unit A.

If it is desired to construct the refrigeration machines shown in FIGS. 45a and 45b such that the driving energy is supplied entirely, or at least predominantly, via the compressor, then the exchange units B, C and D can be dimensioned relatively small in comparison with the other exchange units.

A comparison of FIGS. 45a and 45b–d as well as of FIGS. 46a and 46b and 46d also shows how the systems shown above in schematic form can be realized in practice.

With the apparatuses shown in FIG. 45a, for instance, an apparatus having the system of FIG. 45d can also be realized, with which work and refrigeration can simultaneously be generated. In that case, the pressure machine $K_2$ is an expansion machine and the internal heat exchange proceeds from A to G. The absorption cycle ACDB functions as a heat transformer, to which the driving heat is supplied at the exchange unit C. Waste heat is produced at D. The exchange unit B is generally relatively small and the heat exchange between B and C can be used for equalizing the heat balance in b. With the above units, the apparatus would already be capable of functioning. For additionally generating refrigeration in F, the absorption cycle CDFE operated as a heat pump is used.

Figure 43:
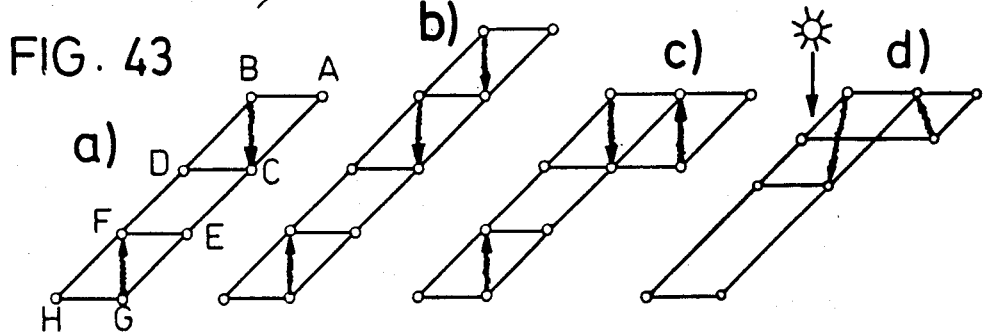

If the refrigeration machines shown in FIGS. 45 and 46, having the working-fluid system of lithium bromide and water, are to be used for generating refrigeration at temperatures below 0° C. or as heat pumps which are also operational at an evaporator temperature below 0° C., the systems of FIGS. 45d and 46c can be expanded, in a manner analogous to FIG. 43, by two further exchange units corresponding to the exchange units G and H in FIG. 43, having the internal heat exchange toward F as shown there. In the exchange unit H, a certain lithium bromide concentration is maintained, in order to reduce the freezing point of the water sufficiently. This concentration can, in practice, be quite low (a few percent).

I claim:

1. A multistage heat energy utilizing apparatus comprising a plurality of exchange units which operate in three different pressure ranges and which are comprised in first and second working fluid circuits and at least one absorbent circuit, in which circuits the pressure and temperature levels of the working fluid are changed by supplying or withdrawing available energy, the term "exchange unit" including units operating as generator, condensor, evaporator and absorber;

the first working fluid circuit (A in FIG. 3) comprising first, second, third and fourth exchange units ($A_1$, $A_2$, $A_3$, $A_4$) of which said first unit $A_1$ operates in a relative high temperature range of a first pressure range, which is a relatively high pressure range of said first working fluid circuit, said second unit $A_2$ operates in relatively low temperature range of said first pressure range, said third unit $A_3$ operates in a relatively low temperature range of a second pressure range which is a relatively low pressure range of said first working fluid circuit, and said fourth unit $A_4$ operates in a relatively high temperature range of said second pressure range;

said second working fluid circuit (B) comprising fifth, sixth, seventh and eigth exchange units ($B_1$, $B_2$, $B_3$, $B_4$) of which said fifth unit $B_1$ operates in a relatively high temperature range of a third pressure range which is a relatively high pressure range of said first working fluid circuit, said sixth unit $B_2$ operates in a relatively low temperature range of said third pressure range, said seventh unit $B_3$ operates in a relatively low temperature range of a fourth pressure range which is the relatively low pressure range of said working fluid circuit, and said eighth unit $B_4$ operates in a relatively high temperature range of said fourth pressure range;

said first and second working fluid circuits having one exchange unit in common so that a specific exchange unit operates as exchange unit in both said first and said second working fluid circuits, which therefore comprise in total seven exchange units, and wherein further one condition of the following set of conditions is fulfilled:

(a) the single exchange unit which is common to both of said first and second working fluid circuits forms any of the folllowing pairs of exchange units in said first and second circuits: $A_1,B_1$; $A_1,B_2$; $A_1,B_3$; $A_1,B_4$; $A_2,B_1$; $A_2,B_2$; $A_2,B_4$; $A_3,B_1$; $A_3,B_4$; $A_4,B_1$; $A_4,B_2$; $A_4,B_3$; $A_4,B_4$;

(b) the single exchange unit which is common to both of said first and second working fluid circuits forms said second ($A_2$) and said seventh ($B_3$) exchange units;

means for internal heat exchange is provided between at least two exchange units;

(c) the single exchange unit which is common to both of said first and second working fluid circuits forms said second ($A_2$) and said seventh ($B_3$) exchange units;

both working fluid circuits are heat pump circuits, said exchange units comprise first and second generators, said first generator operating in higher pressure range than said second; said first generator being comprised in an absorption circuit in which, at given pressures, the working fluid system has a vapor pressure curve which is at higher temperatures than the vapor pressure curve of a second absorption circuit comprising said second generator;

(d) at least one of said working fluid circuits is a heat transformer circuit;

(e) the single exchange unit which is common to both of said first and second working fluids forms said third ($A_3$) and seventh ($B_3$) exchange units; both working fluid circuits are heat pump circuits, means for internal heat exchange is provided between at least two exchange units, (f) the single exchange unit which is common to both of said first and second working fluids forms said third ($A_3$) and seventh ($B_3$) exchange units; both working fluid circuits are heat pump circuits;

said exchange units comprise first and second generators, said first generator operating in higher pressure range than said second; said first generator being comprised in an absorption circuit in which, at given pressures, the working fluid system has a vapor pressure curve which is at lower temperature than the vapor pressure curve of a second absorption circuit comprising said second generator.

2. A multistage heat energy utilizing apparatus comprising a plurality of exchange units and a pressure machine unit, said units operating in a first, second and third successively lower pressure ranges and being comprised in first and second working fluid circuits and at least one absorbent circuit, in which circuits the pressure and temperature levels of the wrking fluid are changed by supplying and withdrawing available energy, the term "exchange unit" incluidng units operating as generator, condensor, evaporator and absorber, and the term "pressure machine" including compressors and expansion machines, said first working fluid circuit being an absorber circuit and said second working fluid circuit being a pressure machine circuit, said absorber circuit comprising first, second, third and fourth exchange units ($A_1$, $A_2$, $A_3$, $A_4$ in FIG. 4) of which said first unit $A_1$ operates in a relative high temperature range of a first pressure range, which is a relatively high pressure range of said first working fluid circuit, said second unit $A_2$ operates in relatively low temperature range of said first pressure range, said third unit $A_3$ operates in a relatively low temperature range of a second pressure range which a relatively low pressure range of said first working fluid circuit, and said fourth unit $A_4$ operates in a relatively high temperature range of said second pressure range;

said pressure machine circuit comprising fifth and sixth exchange units ($K_1$, $K_2$), and the pressure machine (K), of which said fifth exchange unit ($K_1$) operates in a third, relatively high pressure range of said pressure machine circuit and said sixth exchange unit $K_2$ operates in a fourth, relatively low pressure range of said pressure machine circuit, said absorber and pressure machine circuits having one exchange unit in common so that a specific exchange unit operates as exchange unit in said working fluid circuit and also as exchange unit in said pressure machine circuit, wherein further one condition of the following set of conditions is fulfilled:

(a) the exchange unit which is common to both of said absorber and pressure machine circuits forms a pair of exchange units selected from the following set of pairs: $A_1$, $K_1$; $A_1$, $K_2$; $A_2$, $K_2$; $A_3$, $K_2$; $A_4$, $K_2$;

(b) the single exchange unit which is common to both of said circuits comprises said third ($A_3$) and fifth ($K_1$) exchange units, and the pressure machine (K) is an expression machine;

(c) the single exchange unit which is common to both of said first and second working fluid circuits forms said third ($A_3$) and said fifth ($K_1$) exchange units;

the working fluid circulates in said absorber circuit in the sense of a heat transformer;

(d) the single exchange unit which is common to both of said circuits comprises said third ($A_3$) and fifth ($K_1$) exchange units, the pressure machine is a compressor, and means for heat exchange is provided between at least two exchange units;

(e) the single exchange unit which is common to both of said first and second working fluid circuits forms said second ($A_2$) and said fifth ($K_1$) exchange units;

the pressure machine connected between exchange units operating in said first and third pressure ranges;

(f) the single exchange unit which is common to both of said first and second working fluid circuits forms said second ($A_2$) and said fifth ($K_1$) exchange units;

the working fluid circulates in the absorber circuit in the sense of a heat pump;

(g) the single exchange unit which is common to both of said first and second working fluid circuits forms said second ($A_2$) and said fifth (($K_1$) exchange units;

said fifth ($K_1$) and fourth ($A_4$) exchange units are thermally decoupled;

(h) the single exchange unit which is common to both of said first and second working fluid circuits forms said fourth ($A_4$) and fifth ($K_1$) exchange units and the pressure machine is a compressor;

(i) the single exchange unit which is common to both of said first and second working fluid circuits forms said fourth ($A_4$) and said fifth ($K_1$) exchange units, and the pressure machine is an expansion machine and means for heat exchange is provided within the apparatus between no more than one pair of exchange units.

3. A multistage heat energy utilizing apparatus (FIG. 5a, FIG. 6, FIG. 7) comprising first to sixth exchange units (A–F)

said first to third exchange units (A to C) operating in a first, relatively high pressure range and relatively high, medium and low temperature ranges, respectively, of this pressure range, said fourth to sixth exchange units (D to F) operating in a second, relatively low pressure range and relatively high, medium and low temperature ranges, respectively, of this pressure range, said first, second, fifth and forth exchange units (A-B-E-D) forming a first working fluid circuit, said second, third, sixth and fifth exchange units (B-C-F-E) forming a second working fluid circuit, each of working fluid circuits comprising an exchange unit operating as generator, an exchange unit operating as condensor, and exchange unit operating as evaporator, and an exchange unit operating as absorber;

wherein further at least one condition of the following set of conditions is fulfilled:

(a) at least said first working fluid circuit (A, B, D, E) operates in accordance with the principle of the heat transformer;

(b) means for heat exchange between at least one pair of exchange units operating in said first and second pressure range is provided and at least one exchange unit of such pair is additionally provided with means for heat-exchange with a heat carrier medium supplied from an external source;

(c) said first working fluid circuit (A, B, D, E) operates on the principle of the heat pump and comprises means to vary the heat supplied to its generator (A), and said second working fluid circuit (B, C, E, F) operates in accordance with the principle of the heat transformer;

(d) means for heat exchange is provided between said fourth exchange unit (D) and said third exchange unit (C');

(e) said first and fourth exchange units (A, D) are coupled by an absorption circuit which comprises an aqueous salt solution;

(f) a first absorbent circuit (22 in FIG. 6) is provided between said first and fourth exchange units (A, D);

a second absorbent circuit (24) is provided between said second and fifth exchange units (B, E), and said absorbent circuits (22, 24) are connected by conduit means (22h, 24f) comprising valve means (22i, 24g) for selectively transferring absorbent between said absorbent circuits;

(g) a valve is coupled between a working fluid output conduit (12) of said first exchange unit (A) and a working fluid input conduit (20) of said fourth exchange unit (FIG. 7), (h) means for heat exchange between said second (B) and fourth (D) exchange units is provided, said first (A), second (B), fifth (E) and fourth (D) exchange units are connected in series in an absorbent circuit, and at least one of said second (B) and fifth (E) exchange units is connectd both to the exchange unit (A; D) operating in the high temperature range and the exchange unit (C, F) operating in the low temperature range of the same pressure range by an individual working fluid conduit;

(i) at least one of said second (B) and fifth (E) exchange units is connected to operate as rectification means for working fluid generated in the exchange unit (A, D, resp.) operating in the high temperature range of the same pressure range.

4. A multistage heat energy utilizing apparatus (FIG. 5b, FIG. 9) comprising six exchange units (A–F) which are comprised in first and second working fluid circuits (A, B, C, D; C, D, E, F) and at least one absorbent circuit, in which circuits the pressure and temperature levels of the working fluid are changed by supplying or withdrawing available energy, the term "exchange unit" including units operating as generator, condensator, evaporator and absorber, said first and second exchange units operating in a first, relatively high pressure range, and relatively high and low temperature ranges, respectively of this pressure range;

said third and fourth exchange units (C, D) operating in a second, intermediate pressure range, and relatively high and low temeprature ranges, respectively, of this pressure range, and said fifth and sixth exchange units (E, F) operating in a third, relatively low pressure range, and relatively high and low temeprature ranges, respectively of this pressure range;

the working fluid flowing in said first and second working fluid circuits with first (n) and second (m) flow rates, respectively, a positive sign of a flow rate figure indicating a circulation idrection the sense of a heat pump and a negative sign of a flow rate figure indicating circulation of the working fluid in the sense of a heat transformer, characterized by means to operate the apparatus in at least one of the following operating conditions:

(a) n larger than zero, m smaller than zero (FIG. 5d, range 4);

(b) n and m both smaller than zero, excluding the range (range 5 in FIG. 5d) for values of n which are equal or larger than $\mu$; $\mu$ consisting of the values of n which reslut when said third exchange unit (C) and said second exchange unit (B) are thermally coupled for full heat exchange, and excluding those values of m and n, which result, when said forth and fifth exchange units are thermally coupled for full heat exchange;

(c) m larger than zero, n smaller than zero; (range 8 in FIG. 5d);

(d) means for heat exchange is provided between said fifth and fourth exchange unit and at least one of these exchange units is provided with means for heat exchange with a heat carrier medium supplied from an external source;

(e) heat exchange means is provided both between said fifth and fourth exchange units, and between said third and second exchange units, (f) means for heat exchange is provided between said second heat exchange unit (B) and said fifth exchange unit (E').

5. A multistage heat energy utilizing apparatus (FIG. 5c, FIG. 10a) comprising first, second, third and fourth exchange units and a pressure machine unit, said units being comprised in a pressure machine circuit and in an absorber circuit, said absorber circuit including a working fluid circuit (A, B, C, D) and at least one absorbent circuit, the pressure and temperature levels of the working fluid being changed in said circuits by supplying or withdrawing available energy, the term "exchange unit" including units operating as generator, condensator, evaporator and absorber, and the term "pressure meachine" including compressors and expansion machines, the working fluid circulating in said absorber circuit (A, B, C, D) with a first flow rate (m) and the working fluid circulating in said pressure machine circuit (A, C, K) with the second flow rate (n);

a positive sign of m and n defining a circulation of the working fluid in the sense of a heat pump;

wherein the flow rate (m) of the working fluid in said absorber circuit, and the flow rate (n) of the working fluid in said pressure machine circuit are chosen such that the apparatus is adapted to operate with at least one of the following conditions fulfilled:

(a) m and n both larger than zero and m larger than or equal to n;

(b) m smaller than zero; n larger than zero;

(c) m and n both smaller than zero, and at least one of said second and third exchange units being in heat exchange relationship with an external heat exchange medium;

(d) said first to fourth exchange units (A to D) are connected in series in an absorbent circuit;

(e) said first to fourth exchange units (A to D) are connected in series in an absorbent circuit and a pair of exchange units operating in different pressure ranges are in heat-exchange relationship.

6. A multistage heat energy utilizing apparatus comprising a plurality of exchange units which operate in three different pressure ranges and which are comprised in first and second working fluid circuits and at least one absorbent circuit, in which circuits the pressure and temperature levels of the working fluid are changed by supplying and withdrawing available energy, the term "exchange unit" including units operating as generator, condensor, evaporator and absorber;

said first working fluid circuit (A in FIG. 3) comprising first, second, third and fourth exchange units ($A_1$, $A_2$, $A_3$, $A_4$) of which said first unit $A_1$ operates in a relative high temperature range of a first pressure range, which is a relatively high pressure range of said first working fluid circuit, said second unit $A_2$ operates in relatively low temperature range of said first pressure range, said third unit $A_3$ operates in a relatively low temperature range of a second pressure range which is a relatively low pressure range of said first working fluid circuit, and said fourth unit $A_4$ operating in a relatively high temperature range of said second pressure range;

said second working fluid circuit (B) comprising fifth, sixth, seventh and eighth exchange units ($B_1$, $B_2$, $B_3$, $B_4$) of which said fifth unit $B_1$ operates in a relatively high temperature range of a third pressure range which is a relatively high pressure range of said first working fluid circuit, said sixth unit $B_2$ operates in a relatively low temperature range of said third pressure range, said seventh unit $B_3$ operating in a relatively low temperature range of a fourth pressure range which is the relatively low pressure range of said working fluid circuit, and said eighth unit $B_4$ operating in a relatively high temperature range of said fourth pressure range;

said first and second working fluid circuits having one exchange unit in common so that a specific exchange unit operates as exchange unit both in said first and second working fluid circuits, which therefore comprise in total seven exchange units, and wherein means for internal heat exchange is provided between at least two exchange units.

7. The apparatus as claimed in claim 2, further comprising means for internal heat exchange between at least one pair of exchange units.

8. A multistage heat absorber-type energy utilizing apparatus (FIG. 18) comprising first to sixth exchange units (A, B, C, D, E, F), in which the pressure and temperature levels of the working fluid are changed by supplying and withdrawing available energy, the term "exchange unit" including units operating as generator, condensator, evaporator and absorber, characterized by
   means for coupling said first to sixth exchange units in a series circuit so that the same working-fluid flow flows through all of them, and
   means for internal heat exchange between two of said exchange units.

9. A multistage heat energy utilizing apparatus (FIGS. 21a–21c) comprising four exchange units (A, B, C, D) and a pressure machine unit (K), the pressure and temperature levels of a working fluid being changed in said units by supplying and withdrawing available energy (exergy), the term "exchange unit" including units operating as generator (desorber), condensator, evaporator and absorber (resorber), and the term "pressure machine unit" including compressors and expansion machines, characterized in that
   said four exchange units (A, B, C, D) and said pressure machine (K) are connected into a series circuit so that the same working-fluid flow flows through all of them, and that means is provided for internal heat exchange between two of said exchange units.

10. The apparatus as claimed in claim 6, wherein said heat exchange means provides for a complete heat exchange and that means is provided for equalizing the heat balance (FIG. 13).

11. The apparatus as claimed in claim 7, wherein said heat exchange means provides for a complete heat exchange and that means is provided for equalizing the heat balance.

12. The apparatus as claimed in claim 8, wherein said heat exchange means provides for a complete heat exchange and that means is provided for equalizing the heat balance (FIG. 19).

13. The apparatus as claimed in claim 9, wherein said heat exchange means provides for a complete heat exchange and that means is provided for equalizing the heat balance (FIG. 22).

14. A multistage heat energy utilizing apparatus comprising a plurality of exchange units, the term "exchange unit" including units operating as generator, condensator, evaporator and absorber, said exchange units forming first and second absorber circuits, each of which including an exchange unit operating as generator, an exchange unit operating as condensor, an exchange unit operating as evaporator, and an exchange unit operating as absorber,
   further comprising at least one further circuit selected from the group comprising absorber and pressure machine circuits;
   the term "pressure machine" including compressors and expansion machines, all of said circuits being coupled with each other by at least one exchange unit which is common to at least two circuits;
   with the exception of any apparatus from the group of apparatus' comprising (a) apparatus (FIG. 44a) having at least four pairs of exchange units operating in successively lower pressure ranges, each pair comprising an exchange unit operating in a lower temperature range and an exchange unit operating in a higher temperature range of the respective pressure range, wherein the exchange units operating in the lower temperature range of adjacent pressure ranges are coupled with each other, and the exchange units operating in the higher temperature range of adjacent pressure ranges are coupled with each other;

(b) apparatus (FIG. 44b) comprising a pair of exchange units operating in a first, highest pressure range, three exchange units operating in a second pressure range, second and third pairs of exchange units operating in a third and fourth pressure range, respectively said first, second, third and fourth pressure ranges comprise successively lower pressures, each of said first, second and third pairs of exchange units comprising an exchange unit operating in a relatively high temperature range and an exchange unit operating in a relatively low temperature range, and said second pressure range comprising an exchange unit operating in a relatively high temperature range, an exchange unit operating in a relatively low temperature range and an exchange unit operating in an intermediate temperature range, wherein the exchange unit operating in the relatively high temperature range of said first pressure range is connected to said exchange unit operating in said second pressure range and intermediate temperature range; and the exchange units of said second and third pairs which operate in said relatively low temperature range are interconnected, and the exchange units of said second and third pairs which operate in said relatively high temperature range are interconnected;

(c) an apparatus (FIG. 44f) comprising a first pair of exchange units operating in a first, highest pressure range and relatively high and low temperature ranges; three exchange units in each of a second and third successively lower pressure range and relatively low, intermediate and high temperature ranges of the respective pressure range, and a second pair of exchange units operating in a fourth, lowest pressure range and relatively high and low temperature ranges of this pressure range, wherein the exchange units of each pressure range are connected with each other, the exchange units operating in the highest temperature range of said first and second pressure ranges are connected to the exchange unit operating in the intermediate temperature range of the respective lower pressure ranges, and the exchange unit operating in the highest temperature range of said third pressure range is connected to the exchange unit operating in the relatively high temperature range of said fourth pressure range;

(d) apparatus (FIG. 44g) comprising four pairs of exchange units operating in first to fourth, successively lower pressure ranges, respectively, and each pressure range comprising an exchange unit operating in a relatively high temperature range and an exchange unit operating in a relatively low temperature range; the exchange units of each pressure range being connected with each other; the exchange units operating in the high temperature range of each pressure range are connected with each other, and the exchange unit operating in the low temperature range of each pressure range are connected with each other; and wherein means for heat transfer from the exchange unit operating in the low temperature range of said first pressure range to the exchange unit operating in the high temperature range of said second pressure range is provided, and means for heat transfer from the exchange unit operating in the low temperature range of said second pressure range to the exchange unit operating in the high temperature range of said third pressure range is provided;

(e) apparatus (FIG. 44h) comprising three pairs of exchange units operating in first, second and third, successively lower pressure ranges, a seventh exchange unit operating in a fourth, lowest pressure range, an expansion machine connected between the exchange unit operating the higher temperature range of said third pressure range and the exchange unit operating in the fourth, lowest pressure range; means for transferring heat from the exchange unit operating in the low temperature range of said first, highest pressure range to the exchange unit operating in the temperature range of said second pressure range; means for transferring heat from the exchange unit operating in the low temperature range of said second pressure range to the exchange unit operating in the high temperature range of said third pressure range, and means for transferring heat from said seventh exchange unit to the exchange unit operating in the low temperature range of said third pressure range.

15. A multistage heat energy utilizing apparatus (FIGS. 25 and 30) including a first working fluid circuit comprising six exchange units connected in series to form a single working fluid circuit (as shown in FIG. 17), said six exchange units comprising first, second and third pairs of exchange units operating in first, second and third, successively lower pressure ranges; said apparatus further including at least one further working fluid circuit selected from the group comprising an absorber circuit and a pressure machine circuit comprising an individual pressure machine; each circuit comprising at least one exchange unit which also belongs to another circuit so that all of the circuits are connected with each other; with the exception of an apparatus comprised in the group of apparatus' including (a) an apparatus (FIG. 44c) comprising a first pair of exchange units operating in as first, highest pressure range, second, third and at least one further pair of exchange units operating in successively lower pressure ranges, each pair comprising an exchange unit operating in a relatively high temperature range and an exchange unit operating in a relatively low temperature range; wherein the exchange unit of the lower temperature range of said second pressure range is connected to the exchange unit of the higher temperature range of said first pressure range by an absorbent circuit, and the exchange units operating in the lower temperature range of said first, third and any further pressure ranges are coupled with each other and the exchange units operating in the high temperature range of said second, third and any further pressure ranges are coupled with each other, (b) apparatus comprising first, second and third exchange units operating in a relatively high, an intermediate, and a relatively low temperature ranges, respectively, of a first pressure range; forth and fifth exchange units operating in relatively high and relatively low temperature ranges of a second pressure range, which is lower than said first pressure range, and sixth, seventh and eighth exchange units operating in relatively high, intermediate and relatively low temperature ranges, respectively, of a third pressure range, which is lower than said second pressure range, said first, second, seventh and sixth exchange units being connected in series in a first absorption circuit; said second, third, fifth, forth, eighth and seventh exchange units being serially connected in the order named in a second absorption circuit, and all of said first to eighth exchange units being free of means for heat exchange with another of said first to eighth exchange units.

16. A multistage heat energy utilizing apparatus (FIGS. 31 and 34) comprising a plurality of exchange units and at least one pressure machine unit comprised in an absorber circuit and a pressure machine circuit, said circuits comprising at least one exchange unit in common, the term "exchange unit" including units operating as generator, condensator, evaporator, and absorber and the term "pressure machine unit" including compressors and expansion machines;

said apparatus further comprising at least one further circuit selected from the group comprising absorber circuits and pressure machine circuits;

said circuits being coupled with each other by exchange units which are common to at least two of said circuits; with the exception of apparatus (FIG. 44h) comprising three pairs of exchange units operating in first, second and third, successively lower pressure ranges, a seventh exchange unit operating in a fourth, lowest pressure range, an expansion machine connected between the exchange unit operating the higher temperature range of said third pressure range and the exchange unit operating in the fourth, lowest pressure range; means for transferring heat from the exchange unit operating in the low temperature range of said first, highest pressure range to the exchange unit operating in the temperature range of said second pressure range; means for transferring heat from the exchange unit operating in the low temperature range of said second pressure range to the exchange unit operating in the high temperature range of said third pressure range, and means for transferring heat from said seventh exchange unit to the exchange unit operating in the low temperature range of said third pressure range.

17. A multistage heat energy utilizing apparatus (FIG. 28) comprising four exchange units operating in three different pressure ranges, and a pressure machine unit, said exchange units and pressure machine units being connected into series circuit so that the same working fluid flow flows through all of them;

wherein at least one further circuit selected from the group consisting absorber circuits and pressure machine circuits having an individual pressure machine is provided, each further circuit comprising at least one exchange unit which also belongs to another circuit so that all of said circuits are connected with each other.

18. The apparatus as claimed in claim 14 characterized in that it comprises at least one absorber circuit operating on the principle of the heat transformer, and at least one circuit operating on the principle of the heat pump.

19. The apparatus as claimed in claim 15, characterized in that it comprises at least one absorber circuit, operating on the principle of the heat transformer, and at least one circuit operating on the principle of the heat pump.

20. The apparatus as claimed in claim 16, characterized in that it comprises at least one absorber circuit operating on the principle of the heat transformer, and at least one circuit operating on the principle of the heat pump.

21. The apparatus as claimed in claim 17 characterized in that it comprises at least one absorber circuit operating on the principle of the heat transformer, and at least one circuit operating on the principle of the heat pump.

22. The apparatus as claimed in claim 14, wherein said exchange units comprise first to eighth exchange units comprised in three absorber circuits, the first of which comprising said first and second exchange units (A, B) which operate in a first, highest pressure range and a relatively high and a relatively low temperature range, and said third and fourth exchange units (C, D) operating in a second, lower pressure range and relatively high and relatively low temperature ranges of said pressure range; said second circuit comprises said third and fourth exchange units (C, D) and said fifth and sixth exchange units (E, F) which operate in a third, still lower pressure range and relatively high and low temperature ranges of said third pressure range; and said third circuit comprising said fifth and sixth exchange units (E, F) and said seventh and eighth exchange units (G, H) which operate in a fourth, lowest pressure range and relatively high and low temperature ranges of of said fourth pressure range;
said first absorber circuit (A to D) comprises means for heat transfer from said second (B) to said third (C) exchange units, and
said third absorber circuit (E to H) comprises means for heat transfer from said seventh (G) to said sixth (F) exchange units (FIG. 43a).

23. The apparatus as claimed in claim 22, further including a fourth absorber circuit which comprises two exchange units of said first absorber circuit; and means for heat exchange between a pair of exchange units of said fourth absorber circuit (FIG. 43b and FIG. 43c).

24. A multistage heat energy utilizing apparatus comprising third to eighth exchange units which are comprised in first, second, and third absorber circuits and at least one absorbent circuit in which circuits the pressure and temperature levels of the working fluid are changed by supplying and withdrawing available energy, the term "exchange unit" including units operating as generator, condensator, evaporator and absorber;
said first absorber circuit comprising said first and second exchange units which operate in a relatively high and relatively low temperature ranges, respectively of a first, low pressure range and said third and fourth exchange units which operate in an intermediate and a relatively low temperature range of a second, higher pressure range; said second absorber circuit comprising said third and fourth exchange units and said fifth and sixth exchange units which operate in intermediate and relatively low temperature ranges of a third, relatively highest pressure range; said third absorber circuit comprising said third and fifth exchange units and said seventh exchange unit which operates in a relatively high temperature range of said second pressure range, and said eighth exchange unit which operates in a relatively high temperature range of said third relatively high pressure range;
said apparatus further comprising means for heat exchange between said third and sixth exchange units and means for heat exchange between said fifth and seventh exchange units.

25. The apparatus (FIG. 42c, FIG. 42d) as claimed in claim 15, wherein said further circuit is an absorber circuit comprised of a first pair of exchange units operating in said first pressure range, and a second pair of exchange units operating in said third pressure range, one exchange unit of each pair being constituted by an exchange unit of said first working fluid circuit.

26. The apparatus as claimed in claim 15, wherein said first working fluid circuit comprises first and second exchange units operating in relatively high and relatively low temperature ranges of a first, lowest pressure range; said third and fourth operating in relatively high and low temperature ranges of a second pressure range which is higher than said first pressure range; said second and third exchange unit being connected with each other; said fifth and sixth exchange units operating in relatively high and low temperature ranges of a third pressure range which is higher than said second pressure range; said first and fifth exchange units being connected with each other and said fourth and sixth exchange units being connected with each other, and the exchange units operating in the same pressure range being connected with each other so that said first to sixth exchange units form said first working fluid circuit;
said seventh and eighth exchange units operating in relatively high and low temperature ranges of a fourth pressure range which is higher than said third pressure range;
said fifth, sixth, seventh and eighth forming an additional absorber circuit.

27. A multistage heat energy utilizing apparatus comprising a plurality of exchange units which are comprised in at least first and second working fluid circuits and at least one absorbent circuit, in which circuits the pressure and temperature levels of a working fluid are changed by supplying and withdrawing available energy, the term "exchange unit" including units operating as generator, condensator, evaporator and absorber, said first and second absorber circuits having a single exchange unit in common,
the first absorber circuit operating on the principle of the heat pump and the second circuit operating on the principle of the heat transformer.

28. The apparatus as claimed in any of claims 1, 2, or 3 characterized by additional working fluid conduits each comprising a valve to enable a change of the type of the multistage apparatus.

29. A multistage heat energy utilizing apparatus (FIGS. 45a and 45c) comprising first to sixth exchange units which are comprised in first and second working fluid circuits and at least one absorbent circuit in which circuits the pressure and temperature levels of the working fluid are changed by supplying and withdrawing available energy, the term "exchange unit" including units operating as generator, condensator, evaporator, and absorber;

said first circuit comprising said first and second exchange units (A, B) which operate in relatively high and relatively low temperature ranges, respectively of a first, pressure range and said second and third exchange units (C, D) operating in relatively high and relatively low temperature ranges of a second pressure range, which is lower than said first pressure range, and said second circuit comprising said third and fourth exchange units (C, D) and said fifth and sixth exchange units (E, F) which operate in relatively high and relatively low temperature ranges, respectively of a third, lowest pressure range, which is lower than said second pressure range;

wherein means for heat exchange is provided between said second and third exchange units (B, C) and a compressor of ($K_1$) is coupled between an exchange unit of said first pressure range and an exchange unit operating in said second pressure range.

30. A multistage heat energy utilizing apparatus (FIGS. 45a and 45d) comprising first to sixth exchange units which are comprised in first and second working fluid circuits and at least one absorbent circuit in which circuits the pressure and temperature levels of the working fluid are changed by supplying and withdrawing available energy, the term "exchange unit" including units operating as generator, condensator, evaporator, and absorber;

said first circuits comprising said first and second exchange units (A, B) which operate in relatively high and relatively low temperature ranges, respectively of a first pressure range and said second and third exchange units (C, D) operating in relatively high and relatively low temperature ranges of a second, pressure range, which is lower than said first pressure range and said second circuit comprising said third and fourth exchange units (C, D) and said fifth and sixth exchange units (E, F) which operate in relatively high and relatively low temperature ranges, respectively of a third, pressure range which is lower than said second pressure range;

said apparatus further comprising an additional condensor (G) operating in a fourth pressure range which is higher than said first pressure range;

a compressor having an inlet connected to an exchange unit operating in said first pressure range, and an exit connected to said additional condensor; said additional condensor being connected to said second exchange unit (B), and means for heat exchange between said additional condensor (G) and said first exchange unit (A).

31. The apparatus as claimed in claim 29 or 30 further comprising a combustion engine driving said compressor and producing exhaust heat energy and cooling water heat energy; said heat energies being applied to the exchange units (A, C) operating in the first and second pressure range.

32. A multistage heat energy utilizing apparatus comprising first to fourth pairs of exchange units operating in first to fourth, successively lower pressure ranges, respectively and each comprising an exchange unit operating in a relatively high temperature range and an exchange unit operating in a relatively low temperature range of the respective pressure range;

the exchange units of each pressure range being connected with each other; the exchange units operating in the higher temperature ranges of said first to fourth pressure ranges being coupled with each other; the exchange units operating in the lower temperature ranges of said first to fourth pressure ranges being coupled with each other;

wherein means for heat exchange is provided between two exchange units operating in different pressure ranges, and wherein the apparatus comprises no more than one heat exchange means of the group of heat exchange means including (a) means for heat exchange from the exchange unit operating in the low teperature range of the first pressure range to the exchange unit operating in the high temperature range of said second, lower pressure range;

(b) means for heat exchange from the exchange unit operating in the low temperature range of said second pressure range to the exchange unit in the high temperature range of said third pressure range.

33. The apparatus (FIG. 34a) as claimed in claim 14 or 16, wherein said circuits comprise first and second compressor heat pump circuits each including a compressor ($K_1$, $K_2$) and a pair of exchange units (D, E; B, D) of which one is common to both of said first and second compressor heat pump circuits, and further comprising at least one absorber circuit comprising said exchange units of one of said compressor heat pump circuits and two further exchange units.

34. A method of operating a multistage heat energy utilizing apparatus comprising a plurality of exchange units which are comprised in a plurality of working fluid circuits in which the pressure and temperature levels of a working fluid are changed by supplying and withdrawing available energy, the term "exchange unit" including units operating as generator, condensator, evaporator and absorber and wherein the rate of circulation of the working fluid is independently controllable in at least first and second working fluid circuits and said first and second working fluid circuits have one exchange unit in common, characterized in that at least one of the operating parameters of the group of parameters comprising pressure, temperature, working fluid throughput of an exchange unit which is common to both circuits, is varied to regulate the operation of the apparatus.

35. Apparatus according to claim 2 wherein said pressure machine unit is a compressor, said pressure machine circuit comprising an exchange unit coupled to receive gaseous working fluid from said compressor and producing available heat energy, said available heat energy being coupled to another one of said exchange units generating gaseous working fluid supplied to said compressor.

36. Apparatus according to claim 14 or 15, wherein said at least one further circuit is a pressure machine circuit comprising a compressor, said pressure machine circuit comprising an exchange unit coupled to receive gaseous working fluid from said compressor and producing available heat energy, said available heat energy being coupled to another one of said exchange units generating gaseous working fluid supplied to said compressor.

37. Apparatus according to claim 16 or 17 wherein said pressure machine unit is a compressor, said pressure machine circuit comprising an exchange unit coupled to receive gaseous working fluid from said compressor and producing available heat energy, said available heat energy being coupled to another one of said exchange units generating gaseous working fluid supplied to said compressor.

38. Apparatus according to claim 2 or 17 wherein said pressure machine unit is a compressor having inlet and outlet ports receiving gaseous working fluid to be compressed and delivering compressed gaseous working fluid, respectively, the working fluid at at least one of said ports comprising heat of superheating, at least part of said heat of superheating being supplied to an exchange unit of said absorber circuit.

39. Apparatus according to claim 14 wherein said at least one further circuit is a pressure machine circuit comprising a compressor having inlet and outlet ports receiving gaseous working fluid to be compressed and delivering compressed gaseous working fluid, respectively, the working fluid at at least one of said ports comprising heat of superheating, at least part of said heat of superheating being supplied to an exchange unit of one of said absorber circuits.

40. Apparatus according to claim 15 wherein said at least one further circuit is a pressure machine circuit comprising a compressor having inlet and outlet ports receiving gaseous working fluid to be compressed and delivering compressed gaseous working fluid, respectively, the working fluid at at least one of said ports comprising heat of superheating, at least part of said heat of superheating being supplied to an exchange unit of said absorber circuit.

41. Apparatus according to claim 16, wherein the pressure machine unit is a compressor having inlet and outlet ports receiving gaseous working fluid to be compressed and delivering compressed gaseous working fluid, respectively, the working fluid at at least one of said ports comprising heat of superheating, at least part of said heat of superheating being supplied to an exchange unit of one of said absorber circuits.

42. Apparatus according to claim 2 or 5, wherein said pressure machine unit is an expansion machine receiving gaseous working fluid, and said gaseous working fluid being superheated by available heat energy generated in an exchange unit of said absorber circuit.

43. Apparatus according to claim 14 wherein said at least one further circuit is a pressure machine circuit comprising an expansion machine receiving gaseous working fluid, and said gaseous working fluid being superheated by available heat energy generated in an exchange unit of one of said absorber circuits.

44. Apparatus according to claim 15, wherein said at least one further circuit is a pressure machine circuit comprising an expansion machine receiving gaseous working fluid, and said gaseous working fluid being superheated by available heat energy generated in an exchange unit of said absorber circuit.

45. Apparatus according to claim 16 or 17, wherein said pressure machine unit is an expansion machine receiving gaseous working fluid and said gaseous working fluid being superheated by available heat energy generated in an exchange unit of said absorber circuit.

* * * * *

UNITED STATES PATENT AND TRADEMARK OFFICE
CERTIFICATE OF CORRECTION

PATENT NO. : 4,531,374

DATED : July 30, 1985

INVENTOR(S) : Georg ALEFELD

It is certified that error appears in the above-identified patent and that said Letters Patent is hereby corrected as shown below:

Claim 2, col. 41, line 22, change "absorberand" to --absorber and--.

Claim 3, col. 42, line 56, change "(FIG. 7)" to --(D, Fig. 7)--.

Claim 4, col. 43, line 23, change "temeprature" to --temperature--

Claim 4, col. 43, line 28, change "idrection" to --direction in--.

After the end of the descriptive portion of the specification, col. 39, line 14, please add the three tables, Table 1, Table 2, Table 3, as per attached sheet.

Signed and Sealed this

Seventh Day of October, 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,531,374

DATED : July 30, 1985

INVENTOR(S) : Georg ALEFELD

It is certified that error appears in the above-identified patent and that said Letters Patent is hereby corrected as shown below:

TABLE 1

| Operating Range | | 1 | 2 | 3 | 4 | 5 | 6 | 7 | 8 | |
|---|---|---|---|---|---|---|---|---|---|---|
| Net Heat | $Q_3$ | + | + | + | + | − | − | − | − | W |
| | $Q_2$ | + | − | − | − | − | + | + | + | $Q_2$ |
| | $Q_1$ | − | − | + | + | + | + | − | − | $Q_1$ |
| | $Q_0$ | + | + | + | − | − | − | − | + | $Q_0$ |

TABLE 2

| Operating State | Working Fluid Flows | Driving Heat Power | Useful Heat Output | Useful Heat Temperature |
|---|---|---|---|---|
| = 3 | n=m/2 | $Q_A$=n=m/2 | $Q_C+Q_E$=m+(m−n)=3/2 m | 1/3 $(2T_C+T_E)$ |
| = 2 | n=m | $Q_A$=n=m | $Q_C+Q_D$=m+n=2m | 1/2 $(2T_C+T_D)$ |
| = 3/2 | n=2m | $Q_A$=n=2m | $Q_B+Q_D$=(n−m)+n=3m | 1/3 $(T_B+2T_D)$ |

TABLE 3

Operating Range:

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | |
|---|---|---|---|---|---|---|---|---|---|---|---|---|---|---|---|---|---|---|---|---|---|---|---|
| $Q_4$ | + | + | + | + | + | + | + | + | + | + | + | − | − | − | − | − | − | − | − | − | − | − | W |
| $Q_3$ | + | + | + | + | − | − | − | − | − | − | − | − | − | − | − | + | + | + | + | + | + | + | $Q_3$ |
| $Q_2$ | + | − | − | − | − | + | + | + | − | − | + | − | + | + | + | + | − | − | − | + | + | − | $Q_2$ |
| $Q_1$ | − | − | + | + | + | + | − | − | − | + | + | + | + | − | − | − | − | + | + | + | − | − | $Q_1$ |
| $Q_0$ | + | + | + | − | − | − | − | + | + | + | + | − | − | − | + | + | + | + | − | − | − | − | $Q_0$ |

UNITED STATES PATENT AND TRADEMARK OFFICE
CERTIFICATE OF CORRECTION

PATENT NO. : 4,531,374

DATED : July 30, 1985

INVENTOR(S) : Georg ALEFELD

It is certified that error appears in the above-identified patent and that said Letters Patent is hereby corrected as shown below:

Column 43, line 39, (claim 4) change "reslut" to -- result --
44, lines 14 and 15 (claim 5) change to read:
-- (a) m and n both larger than zero and n larger than m --.

Signed and Sealed this

Thirteenth Day of October, 1987

Attest:

DONALD J. QUIGG

*Attesting Officer*  *Commissioner of Patents and Trademarks*